US012591114B2

(12) United States Patent
Zhang et al.

(10) Patent No.: US 12,591,114 B2
(45) Date of Patent: Mar. 31, 2026

(54) OPTICAL LENS ASSEMBLY AND ELECTRONIC DEVICE

(71) Applicant: NINGBO SUNNY AUTOMOTIVE OPTECH CO., LTD, Ningbo (CN)

(72) Inventors: Ludong Zhang, Ningbo (CN); Ye Yao, Ningbo (CN); Dongfang Wang, Ningbo (CN); Bo Yao, Ningbo (CN)

(73) Assignee: Ningbo Sunny Automotive Optech Co., Ltd., Zhejiang (CN)

( * ) Notice: Subject to any disclaimer, the term of this patent is extended or adjusted under 35 U.S.C. 154(b) by 356 days.

(21) Appl. No.: 18/326,553

(22) Filed: May 31, 2023

(65) Prior Publication Data

US 2023/0367104 A1     Nov. 16, 2023

Related U.S. Application Data

(63) Continuation-in-part of application No. PCT/CN2021/135070, filed on Dec. 2, 2021.

(30) Foreign Application Priority Data

Dec. 25, 2020    (CN) .......................... 202011560293.0
Jul. 1, 2021    (CN) .......................... 202110744979.3

(51) Int. Cl.
*G02B 13/00*      (2006.01)
*G02B 9/64*      (2006.01)
(52) U.S. Cl.
CPC ........... *G02B 13/0045* (2013.01); *G02B 9/64* (2013.01); *G02B 13/006* (2013.01)
(58) Field of Classification Search
None
See application file for complete search history.

(56) References Cited

U.S. PATENT DOCUMENTS

2014/0139931 A1    5/2014   Kubota
2020/0150386 A1*   5/2020   Wei ..................... G02B 13/0045
(Continued)

FOREIGN PATENT DOCUMENTS

CN      106597648 A  *  4/2017  ......... G02B 13/0045
CN      108919459 A     11/2018
(Continued)

OTHER PUBLICATIONS

CN202110744979 CN Search Report, Translated, May 27, 2025 (Year: 2025).*

(Continued)

*Primary Examiner* — Shan Liu
(74) *Attorney, Agent, or Firm* — Sughrue Mion, PLLC

(57)      ABSTRACT

An optical lens and an electronic device comprising same. The optical lens sequentially comprises, from an object side to an image side along an optical axis: a first lens (L1) having a negative focal power, an object side surface (S1) of the first lens being concave; a second lens (L2) having a positive focal power, an object side surface (S3, S4) of the second lens being convex; a third lens (L3) having a positive focal power, an object side surface (S6) of the third lens being convex, and an image side surface (S7) of the third lens being convex; a fourth lens (L4) having a positive focal power, an object side surface (S8) of the fourth lens being convex; a fifth lens (L5) having a negative focal power, an image side surface (S10, S9) of the fifth lens being concave; a sixth lens (L6) having a focal power; and a seventh lens (L7) having a negative focal power, an image-side surface of the fifth lens being a concave surface.

31 Claims, 7 Drawing Sheets

(56)          References Cited

U.S. PATENT DOCUMENTS

| | | | | |
|---|---|---|---|---|
| 2020/0249434 A1* | 8/2020 | Lin | ........................ | G02B 13/18 |
| 2021/0318521 A1* | 10/2021 | Wang | ....................... | G02B 9/64 |

FOREIGN PATENT DOCUMENTS

| | | |
|---|---|---|
| CN | 208705559 U | 4/2019 |
| CN | 110515175 A | 11/2019 |
| CN | 110824676 A | 2/2020 |
| CN | 111198438 A | 5/2020 |
| CN | 111308671 A | 6/2020 |
| CN | 211857034 U | 11/2020 |
| JP | 2017-228832 A | 12/2017 |
| TW | 1646368 B | 1/2019 |

OTHER PUBLICATIONS

International Search Report for PCT/CN2021/135070 dated Feb. 25, 2022.
Office Action issued May 27, 2025 in Chinese Patent Application No. 202110744979.3.

\* cited by examiner

OPTICAL LENS ASSEMBLY AND ELECTRONIC DEVICE

CROSS-REFERENCE

This patent application is a continuation of International Application No. PCT/CN2021/135070, filed on Dec. 2, 2021, which claims the priority from Chinese Patent Application No. 202011560293.0, filed on Dec. 25, 2020 and entitled "Optical Lens Assembly and Electronic Device," and the priority from Chinese Patent Application No. 202110744979.3, filed on Jul. 1, 2021 and entitled "Optical Lens Assembly and Electronic Device." All of the aforementioned applications are hereby incorporated by reference in their entireties.

TECHNICAL FIELD

The present disclosure relates to the field of optical element, and more specifically to an optical lens assembly and an electronic device.

BACKGROUND

In recent years, with the rapid development of automobile auxiliary driving systems, optical lens assemblies have been more and more widely applied in automobiles. For example, in many fields such as smart phones, security monitoring, automobile auxiliary driving, intelligent detection and virtual reality, the optical lens assemblies play an irreplaceable role. At the same time, users have higher and higher requirements on the pixels of the optical lens assemblies. In order to meet the application requirements for vehicle-mounted lens assemblies, more and more lens assembly manufacturers have begun to study how to improve the ability of vehicle-mounted front-view lens assemblies for recognizing traffic lights. In addition, for safety reasons, the optical lens assemblies used as the vehicle-mounted front-view lens assemblies are required to have high imaging performance at the same time.

Thanks to the rapid development of the automobile auxiliary driving systems in recent years, optical lens assemblies have been more and more widely applied in automobiles, and the requirements on the pixels of vehicle-mounted lens assemblies are getting higher and higher. At the same time, with the continuous development of autonomous driving vehicle technology, more and more companies have begun to study front-view lens assemblies with good capabilities for recognizing traffic lights. In order to accurately recognize traffic light signals, such optical lens assemblies are required to have high chromatic aberration requirements. In addition, for safety reasons, the optical lens assemblies used as front-view lens assemblies are required to have very high performance requirements. However, the existing common lens assemblies have the following problems in use. For example, the ghost image produced by the reflection by a lens surface makes it easy to induce a vehicle-mounted chip to generate a false alarm signal, which causes the automobile auxiliary driving system to respond incorrectly, thereby greatly affecting the driving safety. Moreover, the low relative illumination and nonuniform imaging of the common lens assemblies will make the light energy received by the edge area of the chip low. In cloudy days and other situations, when the light energy is lower than the trigger threshold of the chip, it is easy to make an alarm missed, which poses a threat to personal safety. Therefore, it is very necessary to eliminate ghost images and improve the relative illumination of optical lens assemblies. Furthermore, due to the use environment and placement positions of the front-view lens assemblies, the lens assemblies are required to have both the miniaturization performance and the high-resolution performance that are slightly conflicting.

At present, in order to improve the resolving power of the existing vehicle-mounted optical lens assemblies, most lens assembly manufacturers usually increase the number of lenses to improve the resolving power of a lens assembly, but this will affect the miniaturization characteristic of the lens assembly to a certain extent. In addition, considering the special application scenarios of the vehicle-mounted lens assemblies, the optical lens assemblies used as the vehicle-mounted front-view lens assemblies are further required to have excellent performance in terms of chromatic aberration, such that the lens assemblies can accurately recognize traffic lights, which helps to drive vehicles safely.

Therefore, the current market is in need of an optical lens assembly with the characteristics such as high resolution, miniaturization, low costs, good chromatic aberrations, and good performance, which can meet the requirement when being applied as the front-view lens assembly of a vehicle.

SUMMARY

A first aspect of the present disclosure provides an optical lens assembly. The optical lens assembly comprises, sequentially along an optical axis from an object side to an image side: a first lens, having a negative refractive power, an object-side surface of the first lens being a concave surface, and an image-side surface of the first lens being a concave surface; a second lens, having a positive refractive power, an object-side surface of the second lens being a convex surface; a third lens, having a positive refractive power, an object-side surface of the third lens being a convex surface, and an image-side surface of the third lens being a convex surface; a fourth lens, having a positive refractive power, an object-side surface of the fourth lens being a convex surface; a fifth lens, having a negative refractive power, an image-side surface of the fifth lens being a concave surface; a sixth lens, having a positive refractive power, an object-side surface of the sixth lens being a convex surface; and a seventh lens, having a negative refractive power.

In an implementation, an image-side surface of the second lens is a concave surface.

In an implementation, the image-side surface of the second lens is a convex surface.

In an implementation, an image-side surface of the fourth lens is a concave surface.

In an implementation, the image-side surface of the fourth lens is a convex surface.

In an implementation, an object-side surface of the fifth lens is a convex surface.

In an implementation, the object-side surface of the fifth lens is a concave surface.

In an implementation, an image-side surface of the sixth lens is a concave surface.

In an implementation, the image-side surface of the sixth lens is a convex surface.

In an implementation, an object-side surface of the seventh lens is a concave surface, and an image-side surface of the seventh lens is a convex surface.

In an implementation, the object-side surface of the seventh lens is a concave or convex surface, and the image-side surface of the seventh lens is a concave surface.

In an implementation, the fourth lens and the fifth lens are cemented to form a cemented lens.

3

In an implementation, the second lens and the seventh lens have aspheric surfaces.

In an implementation, the optical lens assembly further comprises a diaphragm disposed between the second lens and the third lens.

In an implementation, the optical lens assembly further comprises a diaphragm disposed between the first lens and the second lens.

In an implementation, a distance TTL on the optical axis from a center of the object-side surface of the first lens to an image plane of the optical lens assembly and a total effective focal length F of the optical lens assembly satisfy: TTL/F≤2.5.

In an implementation, a distance TTL on the optical axis from a center of the object-side surface of the first lens to an image plane of the optical lens assembly, a maximal field-of-view FOV of the optical lens assembly, and an image height H corresponding to the maximal field-of-view of the optical lens assembly satisfy: TTL/H/FOV≤0.7.

In an implementation, an abbe number VD3 of the third lens and an abbe number VD4 of the fourth lens satisfy: VD3+VD4≥110.

In an implementation, a maximal field-of-view FOV of the optical lens assembly, a total effective focal length F of the optical lens assembly, and an image height H corresponding to the maximal field-of-view of the optical lens assembly satisfy: (FOV F)/H≥50°.

In an implementation, a distance BFL on the optical axis from a center of the image-side surface of the seventh lens to an image plane of the optical lens assembly and a distance TTL from a center of the object-side surface of the first lens to the image plane of the optical lens assembly on the optical axis satisfy: BFL/TTL≥0.07.

In an implementation, an effective focal length F4 of the fourth lens and an effective focal length F5 of the fifth lens satisfy: 1≤|F4/F5|≤2.

In an implementation, an effective focal length F3 of the third lens and a total effective focal length F of the optical lens assembly satisfy: 1≤|F3/F|≤2.

In an implementation, an effective focal length F45 of a cemented lens formed by cementing the fourth lens and the fifth lens and a total effective focal length F of the optical lens assembly satisfy: 1≤|F45/F|≤10.

In an implementation, the fourth lens and the fifth lens are cemented to form a cemented lens, and the optical lens assembly satisfies: 1≤dn/dm≤2, where dn is a center thickness of a lens having a maximal center thickness in the second lens, the third lens, and the cemented lens; and dm is a center thickness of a lens having a minimal center thickness in the second lens, the third lens, and the cemented lens.

In an implementation, a radius of curvature R6 of the object-side surface of the third lens and a radius of curvature R7 of the image-side surface of the third lens satisfy: 0.5≤|R6/R7|≤2.

In an implementation, a radius of curvature R1 of the object-side surface of the first lens, a radius of curvature R2 of the image-side surface of the first lens, and a center thickness d1 of the first lens on the optical axis satisfy: 0.1≤|R1/(R2+d1)|≤1.

In an implementation, a total effective focal length F of the optical lens assembly and an entrance pupil diameter ENPD of the optical lens assembly satisfy: F/ENPD≤2.

In an implementation, a semi-diameter D41 of a maximal aperture of the object-side surface of the fourth lens corresponding to the maximal field-of-view of the optical lens assembly and a distance SAG41 from an intersection point of the object-side surface of the fourth lens and the optical axis to the maximal aperture of the object-side surface of the fourth lens on the optical axis satisfy: arctan(SAG41/D41)≤30.

In an implementation, a total effective focal length F of the optical lens assembly and the radius of curvature R1 of the object-side surface of the first lens satisfy: 0.5≤R1/F≤2.

In an implementation, a center thickness d4 of the fourth lens on the optical axis, a center thickness d5 of the fifth lens on the optical axis, and a distance TTL on the optical axis from a center of the object-side surface of the first lens to an image plane of the optical lens assembly satisfy: (d4+d5)/TTL≤0.3.

In an implementation, a maximal field-of-view θ of the optical lens assembly with a radian as a unit, a total effective focal length F of the optical lens assembly, and an image height H corresponding to the maximal field-of-view of the optical lens assembly satisfy: |(H−F×θ)/(F×θ)|≤0.2.

A second aspect of the present disclosure provide an optical lens assembly. The optical lens assembly comprises, sequentially along an optical axis from an object side to an image side: a first lens, having a negative refractive power; a second lens, having a positive refractive power; a third lens, having a positive refractive power; a fourth lens, having a positive refractive power; a fifth lens, having a negative refractive power; a sixth lens, having a positive refractive power; and a seventh lens, having a negative refractive power, where a distance BFL on the optical axis from a center of an image-side surface of the seventh lens to an image plane of the optical lens assembly and a distance TTL on the optical axis from a center of an object-side surface of the first lens to the image plane of the optical lens assembly satisfy: BFL/TTL≥0.07.

A third aspect of the present disclosure provide an optical lens assembly. The optical lens assembly comprises, sequentially along an optical axis from an object side to an image side: a first lens, having a negative refractive power, a first-side surface of the first lens being a concave surface, and a second-side surface of the first lens being a concave surface; a second lens, having a positive refractive power, a first-side surface of the second lens being a convex surface; a third lens, having a positive refractive power, a first-side surface of the third lens being a convex surface, and a second-side surface of the third lens being a convex surface; a fourth lens, having a positive refractive power, a first-side surface of the fourth lens being a convex surface; a fifth lens, having a negative refractive power, a second-side surface of the fifth lens being a concave surface; a sixth lens, having a refractive power, a first-side surface of the sixth lens being a convex surface, and a second-side surface of the sixth lens being a concave surface; and a seventh lens, having a negative refractive power, a second-side surface of the seventh lens being a concave surface.

In an implementation, the second-side surface of the second lens is a concave surface.

In an implementation, a second-side surface of a second lens is a convex surface.

In an implementation, a second-side surface of the fourth lens is a concave surface.

In an implementation, a second-side surface of the fourth lens is a convex surface.

In an implementation, a first-side surface of the fifth lens is a convex surface.

In an implementation, a first-side surface of the fifth lens is a concave surface.

In an implementation, a first-side surface of the seventh lens is a concave surface.

In an implementation, a first-side surface of the seventh lens is a convex surface.

In an implementation, the second lens has an aspheric surface.

In an implementation, the seventh lens has an aspheric surface.

In an implementation, the fourth lens, the fifth lens, and the sixth lens are cemented to form a cemented lens.

In an implementation, the optical lens assembly further comprises a diaphragm disposed between the second lens and the third lens.

In an implementation, the second-side surface of the seventh lens has at least one inflection point.

In an implementation, a distance TTL on the optical axis from a center of the first-side surface of the first lens to an image plane of the optical lens assembly and a total effective focal length F of the optical lens assembly satisfy: $TTL/F \leq 2.5$.

In an implementation, an abbe number $Vd3$ of the third lens and an abbe number $Vd4$ of the fourth lens satisfy: $Vd3+Vd4 \geq 100$.

In an implementation, a sagittal height $SAG61$ at a maximal aperture of the first-side surface of the sixth lens, a diameter $D61$ of the maximal aperture of the first-side surface of the sixth lens, a sagittal height $SAG62$ at a maximal aperture of the second-side surface of the sixth lens, and a diameter $D62$ of the maximal aperture of the second-side surface of the sixth lens satisfy: $0.2 \leq (SAG61/D61)/(SAG62/D62) \leq 2.5$.

In an implementation, an effective focal length $F4$ of the fourth lens and an effective focal length $F5$ of the fifth lens satisfy: $|F4/F5| \leq 2.5$.

In an implementation, a center thickness $d4$ of the fourth lens on the optical axis, a center thickness $d5$ of the fifth lens on the optical axis, a center thickness $d6$ of the sixth lens on the optical axis, and a distance TTL on the optical axis from a center of the first-side surface of the first lens to an image plane of the optical lens assembly satisfy: $0.1 \leq (d4+d5+d6)/TTL \leq 0.8$.

In an implementation, a distance BFL on the optical axis from a center of the second-side surface of the seventh lens to an image plane of the optical lens assembly and a distance TTL on the optical axis from a center of the first-side surface of the first lens to the image plane of the optical lens assembly satisfy: $BFL/TTL \geq 0.05$.

In an implementation, a radius of curvature $R6$ of the first-side surface of the third lens and a radius of curvature $R7$ of the second-side surface of the third lens satisfy: $|R6/R7| \leq 1.3$.

In an implementation, a maximal field-of-view FOV of the optical lens assembly, a total effective focal length F of the optical lens assembly, and an image height H corresponding to the maximal field-of-view of the optical lens assembly satisfy: $(FOV \cdot F)/H \geq 45$.

In an implementation, a total effective focal length F of the optical lens assembly and an entrance pupil diameter EPD of the optical lens assembly satisfy: $1 \leq F/EPD \leq 2$.

In an implementation, a diameter D of a maximal aperture of the first-side surface of the first lens corresponding to the maximal field-of-view of the optical lens assembly, an image height H corresponding to the maximal field-of-view of the optical lens assembly, and a radian value $\theta$ corresponding to the maximal field-of-view of the optical lens assembly satisfy: $D/H/\theta \leq 5$.

In an implementation, a combined focal length $F45$ of the fourth lens and the fifth lens, and a total effective focal length F of the optical lens assembly satisfy: $|F45/F| \leq 12$.

In an implementation, a combined focal length $F456$ of the fourth lens, the fifth lens and the sixth lens, and the total effective focal length F of the optical lens assembly satisfy: $|F456/F| \geq 2$.

In an implementation, a distance $Ti10$ on the optical axis from a center of the first-side surface of the sixth lens to an image plane of the optical lens assembly, and a distance TTL on the optical axis from a center of the first-side surface of the first lens to the image plane of the optical lens assembly satisfy: $0.2 \leq Ti10/TTL \leq 0.6$.

In an implementation, a center thickness $d7$ of the seventh lens on the optical axis, and a distance TTL on the optical axis from a center of the first-side surface of the first lens to an image plane of the optical lens assembly satisfy: $0.05 \leq d7/TTL \leq 0.2$.

In an implementation, a spacing distance $d46$ on the optical axis from a center of the second-side surface of the fourth lens to a center of the first-side surface of the sixth lens and a distance TTL on the optical axis from a center of the first-side surface of the first lens to an image plane of the optical lens assembly satisfy: $d46/TTL \leq 0.05$.

In an implementation, a radian value $\theta1$ of an angle between an incident ray of a central chief ray of an edge field of view of the optical lens assembly before reaching the sixth lens and the optical axis, and a radian value $\theta2$ of an angle between an emergent ray of the central chief ray at the edge field of view of the optical lens assembly after passing the sixth lens and the optical axis satisfy: $\theta2/\theta1 \leq 2$.

In an implementation, an effective focal length $F6$ of the sixth lens and a total effective focal length F of the optical lens assembly satisfy: $2.1 \leq |F6/F| \leq 10$.

In an implementation, a refractive index $N4$ of the fourth lens, a refractive index $N5$ of the fifth lens, and a refractive index $N6$ of the sixth lens satisfy: $1 \leq (N6-N4)/(N5-N4) \leq 2$.

In an implementation, a center thickness $d4$ of the fourth lens on the optical axis, a center thickness $d5$ of the fifth lens on the optical axis, a center thickness $d6$ of the sixth lens on the optical axis, and a distance T from a center of the first-side surface of the fourth lens to a center of the second-side surface of the sixth lens on the optical axis, satisfy: $T \leq 0.03+d4+d5+d6$.

A fourth aspect of the present disclosure provide an optical lens assembly. The optical lens assembly includes, sequentially along an optical axis from a first side to a second side: a first lens, having a negative refractive power; a second lens, having a positive refractive power; a third lens, having a positive refractive power; a fourth lens, having a positive refractive power; a fifth lens, having a negative refractive power; a sixth lens, having a refractive power; and a seventh lens, having a negative refractive power, where the fourth lens, the fifth lens, and the sixth lens are cemented to form a cemented lens.

A fifth aspect of the present disclosure provides an electronic device. The electronic device includes the optical lens assembly provided by any embodiment of the present disclosure and an imaging element used to convert an optical image formed by the optical lens assembly into an electrical signal.

The present disclosure uses seven lenses. By optimizing the shapes, refractive powers, etc. of the lenses, the optical lens assembly has at least one beneficial effect such as high resolution, miniaturization, high illumination, low costs, good chromatic aberrations, good temperature performance, a small front-end diameter, a long back focal distance, a small CRA and a good imaging quality, and thus, the optical lens assembly can well meet the requirement when being applied as vehicle-mounted front-view lens assemblies.

7

BRIEF DESCRIPTION OF THE DRAWINGS

In combination with the accompanying drawings, other features, objectives and advantages of the present disclosure will become more apparent through the following detailed description for non-limiting embodiments. In the accompanying drawings.

Figure 1:
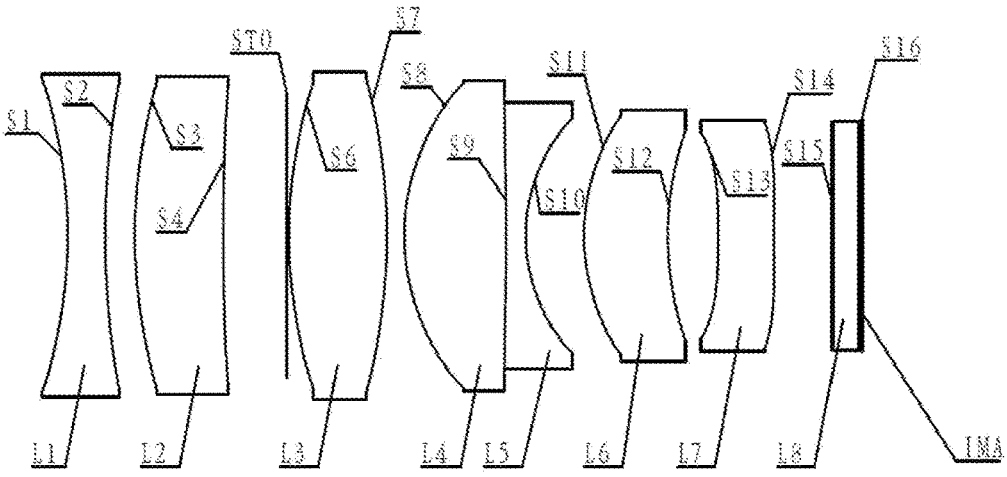
FIG. 1 is a schematic structural diagram of an optical lens assembly according to Embodiment 1 of the present disclosure.

8 reaching a sixth lens and an optical axis and a radian value $\theta2$ of an angle between an emergent ray of the central chief ray at the edge field of view of the optical lens assembly after reaching the sixth lens and the optical axis, according to embodiments of the present disclosure.

DETAILED DESCRIPTION OF EMBODIMENTS

For a better understanding of the present disclosure, various aspects of the present disclosure will be described in more detail with reference to the accompanying drawings. It should be understood that the detailed description is merely an illustration for the example implementations of the present disclosure, rather than a limitation to the scope of the present disclosure in any way. Throughout the specification, the same reference numerals designate the same elements. The expression "and/or" includes any and all combinations of one or more of the associated listed items.

It should be noted that, in the specification, the expressions such as "first," "second" and "third" are only used to distinguish one feature from another, rather than represent any limitations to the features. Thus, the first lens discussed below may also be referred to as the second lens or the third lens without departing from the teachings of the present disclosure.

In the accompanying drawings, the thicknesses, sizes and shapes of the lenses are slightly exaggerated for the convenience of explanation. Particularly, the shapes of spherical surfaces or aspheric surfaces shown in the accompanying drawings are shown by examples. That is, the shapes of the spherical surfaces or the aspheric surfaces are not limited to the shapes of the spherical surfaces or the aspheric surfaces shown in the accompanying drawings. The accompanying drawings are merely illustrative and not strictly drawn to scale.

Herein, a paraxial area refers to an area near an optical axis. If a lens surface is a convex surface and the position of the convex surface is not defined, it represents that the lens surface is a convex surface at least at the paraxial area. If the lens surface is a concave surface and the position of the concave surface is not defined, it represents that the lens surface is a concave surface at least at the paraxial area. A surface of each lens that is closest to a photographed object is referred to as the object-side surface of the lens, and a surface of the each lens that is closest to an image side is referred to as the image-side surface of the lens.

It should be understood that the optical lens assembly provided in embodiments of the present disclosure can be used for photography or projection. When the optical lens assembly provided in embodiments of the present disclosure is used for a camera lens assembly, the "first side" mentioned herein may refer to the object side, and the "second side" may refer to the image side. When the optical lens assembly provided in embodiments of the present disclosure is used for a projection lens assembly or a radar transmission lens assembly, the "first side" mentioned herein may refer to the imaging side, and the "second side" may refer to the image source side.

It should be further understood that the terms "comprise," "comprising," "include," "including," "having," "contain" and/or "containing," when used in the specification, specify the presence of stated features, elements and/or components, but do not exclude the presence or addition of one or more other features, elements, components and/or combinations thereof. In addition, expressions such as "at least one of," when preceding a list of listed features, modify the entire list of features rather than an individual element in the list.

Further, the use of "may," when describing the implementations of the present disclosure, represents "one or more implementations of the present disclosure." Also, the term "exemplary" is intended to refer to an example or illustration.

Unless otherwise defined, all terms (including technical and scientific terms) used herein have the same meaning as commonly understood by those of ordinary skill in the art to which embodiments of the present disclosure belongs. It should be further understood that terms (e.g., those defined in commonly used dictionaries) should be interpreted as having a meaning that is consistent with their meaning in the context of the relevant art and will not be interpreted in an idealized or overly formal sense unless expressly so defined herein.

It should be noted that embodiments in the present disclosure and the features in the embodiments may be combined with each other on a non-conflict basis. Embodiments of the present disclosure will be described below in detail with reference to the accompanying drawings.

Features, principles and other aspects of the present disclosure are described below in detail.

In exemplary implementations, an optical lens assembly includes, for example, seven lenses (i.e., a first lens, a second lens, a third lens, a fourth lens, a fifth lens, a sixth lens, and a seventh lens) having refractive powers. The seven lenses are arranged in sequence along an optical axis from an object side to an image side.

In an exemplary implementation, the optical lens assembly may further include a photosensitive element disposed on an image plane. Alternatively, the photosensitive element disposed on the image plane may be a charge coupled device (CCD) or complementary metal-oxide semiconductor element (CMOS).

In an exemplary implementation, the first lens may have a negative refractive power. The first lens may have a concave-concave shape. The settings for the refractive power and shape of the first lens not only can make light enter the rear optical system accurately and smoothly, which improves the resolution quality, but also can collect the light in a large field of view as much as possible, which increases the amount of light enters the optical system. The first lens may be a spherical lens. When the first lens is a spherical lens, it may be easy to plate a waterproof film on the first lens, and at the same time, the processing cost can also be reduced.

In an exemplary implementation, the second lens may have a positive refractive power. The second lens may have a convex-concave or dual-convex shape. The settings for the refractive power and shape of the second lens are conducive to converging light and thus reducing the diameter and length of the barrel of the optical lens assembly, thereby achieving miniaturization. Preferably, the second lens may be an aspheric lens.

In an exemplary implementation, the third lens may have a positive refractive power. The third lens may have a dual-convex shape. The settings for the refractive power and shape of the third lens are conducive to converging light and thus reducing the diameter and length of the barrel of the optical lens assembly, thereby achieving miniaturization.

In an exemplary implementation, the fourth lens may have a positive refractive power. The fourth lens may have a convex-concave or convex-convex shape. The settings for the refractive power and shape of the fourth lens make the abbe number large, which is conducive to correcting the dispersion of the system and balancing the aberrations of the system. The convex-concave shape of the lens is conducive to the processability, and when the first surface of the lens is a convex surface, it is easy to converge light, thereby reducing the diameter.

In an exemplary implementation, the fifth lens may have a negative refractive power. The fifth lens may have a convex-concave or concave-concave shape. The fifth lens may adopt a material with a high refractive index, which can make the structure more compact. In addition, the convex-concave shape of the lens is conducive to the processability, and when the first surface of the lens is a convex surface, it is easy to converge light, thereby reducing the diameter.

In an exemplary implementation, the sixth lens may have a positive refractive power. The sixth lens may have a convex-concave or dual-convex shape. The settings for the refractive power and shape of the sixth lens are conducive to converging light and reducing the diameter and length of the barrel of the optical lens assembly, thereby achieving miniaturization.

In an exemplary implementation, the sixth lens may have a positive or negative refractive power. The sixth lens may have a convex-concave shape. The radii of curvature of the two surfaces of the sixth lens are close, which is conducive to the smooth propagation of light and helps to reduce the sensitivity of the system.

In an exemplary implementation, the seventh lens may have a negative refractive power. The seventh lens may have a concave-convex, convex-concave, or dual-concave shape. Preferably, the seventh lens has an aspheric surface. The settings for the refractive power and shape of the seventh lens are conducive to smoothing the trend of the light from the front part and improving the resolution quality.

In an exemplary implementation, the seventh lens may have a negative refractive power. The seventh lens may have a concave-concave or convex-concave shape. The settings for the refractive power and shape of the seventh lens can balance the aberrations of the system, which is conducive to smoothing the trend of the light from the front part and conducive to the resolution. Moreover, the convex-concave shape of the lens is conducive to the processability. Preferably, the seventh lens may have an aspheric surface, which can effectively correct aberrations and further improve the resolution, thereby making the illumination of the image plane more uniform.

In an exemplary implementation, the optical lens assembly according to an embodiment of the present disclosure may satisfy: TTL/F≤2.5. Here, TTL is a distance on the optical axis from a center of an object-side surface of the first lens to the image plane of the optical lens assembly, and F is a total effective focal length of the optical lens assembly. More particularly, TTL and F may further satisfy: TTL/F≤2.2. Satisfying TTL/F≤2.5 can effectively restrict the length of the lens assembly, which is conducive to achieving the miniaturization of the lens assembly.

In an exemplary implementation, the optical lens assembly according to an embodiment of the present disclosure may satisfy: TTL/H/FOV≤0.7. Here, TTL is the distance on the optical axis from the center of the object-side surface of the first lens to the image plane of the optical lens assembly, FOV is a maximal field-of-view of the optical lens assembly, and H is an image height corresponding to the maximal field-of-view of the optical lens assembly. More particularly, TTL, H and FOV may further satisfy: TTL/H/FOV≤0.55. Satisfying TTL/H/FOV≤0.7 can effectively restrict the length of the lens assembly without changing the image plane and image height of the lens assembly, thereby achieving the miniaturization of the lens assembly.

In an exemplary implementation, the optical lens assembly according to an embodiment of the present disclosure may satisfy: VD3+VD4≥110. Here, VD3 is an abbe number of the third lens and VD4 is an abbe number of the fourth lens. More particularly, VD3 and VD4 may further satisfy: VD3+VD4≥120. Satisfying VD3+VD4≥110 helps to correct chromatic aberrations and improve the resolution.

In an exemplary implementation, the optical lens assembly according to an embodiment of the present disclosure may satisfy: 50≤VD3≤120. Here, VD3 is the abbe number of the third lens. More particularly, VD3 may further satisfy: 60≤VD3≤100. Satisfying 50≤VD3≤120 helps to correct chromatic aberrations and improve the resolution.

In an exemplary implementation, the optical lens assembly according to an embodiment of the present disclosure may satisfy: 40≤VD4≤120. Here, VD4 is the abbe number of the fourth lens. More particularly, VD4 may further satisfy: 45≤VD4≤100. Satisfying 40≤VD4≤120 helps to correct chromatic aberrations and improve the resolution.

In an exemplary implementation, the optical lens assembly according to an embodiment of the present disclosure may satisfy: (FOV×F)/H≥50°. Here, FOV is the maximal field-of-view of the optical lens assembly, F is the total effective focal length of the optical lens assembly, and H is the image height corresponding to the maximal field-of-view of the optical lens assembly. More particularly, FOV, F and H may further satisfy: (FOV×F)/H≥55°. When (FOV×F)/H≥50° is satisfied, it is conducive to achieving large angular resolution, and at the same time, it is conducive to meeting the characteristics such as telephoto and a large field-of-view.

In an exemplary implementation, the optical lens assembly according to an embodiment of the present disclosure may satisfy: BFL/TTL≥0.07. Here, BFL is a distance on the optical axis from a center of an image-side surface of the seventh lens to the image plane of the optical lens assembly, and TTL is the distance on the optical axis from the center of the object-side surface of the first lens to the image plane of the optical lens assembly. More particularly, BFL and TTL may further satisfy: BFL/TTL≥0.075. When BFL/TTL≥0.07 is satisfied, it is not only conducive to making the back focal length long on the basis of the realization of miniaturization, which is beneficial to the assembling of modules, but also conducive to making the length of the lens assembly short, to make the structure of the lens assembly compact, thereby reducing the sensitivity of the lens for MTF, improving the production yield and reducing the production cost.

In an exemplary implementation, the optical lens assembly according to an embodiment of the present disclosure may satisfy: 1≤|F4/F5|≤2. Here, F4 is an effective focal length of the fourth lens, and F5 is an effective focal length of the fifth lens. More particularly, F4 and F5 may further satisfy: 1.4≤|F4/F5|≤1.9. Satisfying 1≤|F4/F5|≤2 helps to smooth the transition of light and correct chromatic aberrations.

In an exemplary implementation, the optical lens assembly according to an embodiment of the present disclosure may satisfy: 1≤|F3/F|≤2. Here, F3 is an effective focal length of the third lens, and F is the total effective focal length of the optical lens assembly. More particularly, F3 and F may further satisfy: 1≤|F3/F|≤1.5. Satisfying 1≤|F3/F|≤2 helps to better adjust chromatic aberrations and improve the resolution.

In an exemplary implementation, the optical lens assembly according to an embodiment of the present disclosure may satisfy: 1≤|F45/F|≤10. Here, F45 is an effective focal length of a cemented lens formed by cementing the fourth lens and the fifth lens, and F is the total effective focal length of the optical lens assembly. More particularly, F45 and F may further satisfy: 2≤|F45/F|≤8. Satisfying 1≤|F45/F|≤10 helps more light to enter smoothly, thereby improving the illumination.

In an exemplary implementation, the optical lens assembly according to an embodiment of the present disclosure may satisfy: 1≤dn/dm≤2. Here, the fourth lens and the fifth lens are cemented to form the cemented lens; dn is a center thickness of a lens having a maximal center thickness in the second lens, the third lens and the cemented lens; and dm is a center thickness of a lens having a minimal center thickness in the second lens, the third lens and the cemented lens. More particularly, dn and dm may further satisfy: 1.3≤dn/dm≤1.8. Satisfying 1≤dn/dm≤2 helps to make the overall light deflection change of the optical lens assembly under high and low temperatures small and the temperature performance better.

In an exemplary implementation, the optical lens assembly according to an embodiment of the present disclosure may satisfy: 0.5≤|R6/R7|≤2. Here, R6 is a radius of curvature of an object-side surface of the third lens, and R7 is a radius of curvature of an image-side surface of the third lens. More particularly, R6 and R7 may further satisfy: 0.8≤|R6/R7|≤1.9. Satisfying 0.5≤|R6/R7|≤2 can correct the aberration of the optical lens assembly and reduce the tolerance sensitivity of the optical lens assembly.

In an exemplary implementation, the optical lens assembly according to an embodiment of the present disclosure may satisfy: 0.1≤|R1/(R2+d1)|≤1. Here, R1 is a radius of curvature of the object-side surface of the first lens, R2 is a radius of curvature of an image-side surface of the first lens, and d1 is a center thickness of the first lens on the optical axis. More particularly, R1, R2 and d1 may further satisfy: 0.3≤|R1/(R2+d1)|≤0.8. When 0.1≤|R1/(R2+d1)|≤1 is satisfied, there may be an optical path difference between the peripheral ray and the central ray of the first lens, which is conducive to diverging the central ray to cause the ray to enter the rear optical system, and which is conducive to reducing the diameter of the front end of the lens assembly to reduce the size, thereby achieving the miniaturization and reducing costs.

In an exemplary implementation, the optical lens assembly according to an embodiment of the present disclosure may satisfy: F/ENPD≤2. Here, F is the total effective focal length of the optical lens assembly, and ENPD is an entrance pupil diameter of the optical lens assembly. More particularly, F and ENPD may further satisfy: F/ENPD≤1.8. Satisfying F/ENPD≤2 helps to improve the relative illumination.

In an exemplary implementation, the optical lens assembly according to an embodiment of the present disclosure may satisfy: arctan(SAG41/D41)≤30. Here, D41 is a semi-diameter of a maximal aperture of an object-side surface of the fourth lens corresponding to the maximal field-of-view of the optical lens assembly, and SAG41 is a distance on the optical axis from an intersection point of the object-side surface of the fourth lens and the optical axis to the maximal aperture of the object-side surface of the fourth lens. More particularly, SAG41 and D41 may further satisfy: arctan(SAG41/D41)≤24. Satisfying arctan(SAG41/D41)≤30 helps to reduce ghost images.

In an exemplary implementation, the optical lens assembly according to an embodiment of the present disclosure may satisfy: 0.5≤R1/F≤2. Here, F is the total effective focal length of the optical lens assembly, and R1 is the radius of curvature of the object-side surface of the first lens. More particularly, R1 and F may further satisfy: $0.9 \le R1/F \le 1.5$. Satisfying $0.5 \le R1/F \le 2$ is conducive to improving the relative illumination of the lens assembly.

In an exemplary implementation, the optical lens assembly according to an embodiment of the present disclosure may satisfy: $(d4+d5)/TTL \le 0.3$. Here, d4 is a center thickness of the fourth lens on the optical axis, d5 is a center thickness of the fifth lens on the optical axis, and TTL is the distance on the optical axis from the center of the object-side surface of the first lens to the image plane of the optical lens assembly. More particularly, d4, d5 and TTL may further satisfy: $(d4+d5)/TTL \le 0.2$. Satisfying $(d4+d5)/TTL \le 0.3$ is conducive to improving the relative illumination.

In an exemplary implementation, the optical lens assembly according to an embodiment of the present disclosure may satisfy: $|(H-F \times \theta)/(F \times \theta)| \le 0.2$. Here, $\theta$ is a maximal field-of-view of the optical lens assembly with a radian as a unit, F is the total effective focal length of the optical lens assembly, and H is the image height corresponding to the maximal field-of-view of the optical lens assembly. More particularly, H, F and $\theta$ may further satisfy: $|(H-F \times \theta)/(F \times \theta)| \le 0.18$. When $|(H-F \times \theta)/(F \times \theta)| \le 0.2$ is satisfied, the focal length of the lens assembly can be increased to highlight the imaging effect of the central area of the image plane of the lens assembly without changing the field-of-view of the lens assembly and the size of the image plane.

In an exemplary implementation, a diaphragm used to restrict light beams may be disposed between the second lens and the third lens or between the first lens and the second lens, to further improve the imaging quality of the optical lens assembly. Disposing the diaphragm between the second lens and the third lens or between the first lens and the second lens is conducive to effectively converging the light beams entering the optical lens assembly, thereby reducing the diameter of the lens. In an implementation of the present disclosure, the diaphragm may be disposed near the image-side surface of the first lens, or near the object-side surface of the second lens, or near the image-side surface of the second lens, or near the object-side surface of the third lens. However, it should be noted that the positions of the diaphragm disclosed here are only examples, rather than limitations. In alternative implementations, the diaphragm may be disposed at other positions according to actual needs.

In an exemplary implementation, the optical lens assembly according to an embodiment of the present disclosure may further include an optical filter and/or a protective glass disposed between the seventh lens and the image plane, to filter light with different wavelengths and prevent the elements (e.g., chips) on the image side of the optical lens assembly from being damaged.

As known to those skilled in the art, the cemented lens can be used to reduce or eliminate chromatic aberrations to the greatest extent. The use of the cemented lens in the optical lens assembly can improve the imaging quality and reduce the reflection loss of light energy, thereby achieving high resolution and improving the image clarity of the lens assembly. In addition, the use of the cemented lens can simplify the assembling procedures in the process of manufacturing the lens assembly.

In an exemplary implementation, the fourth lens and the fifth lens can be cemented to form a cemented lens. The fourth lens having a positive refractive power, a convex object-side surface and a convex image-side surface and the fifth lens having a negative refractive power, a concave object-side surface and a concave image-side surface are cemented, or the fourth lens having a positive refractive power, a convex object-side surface and a concave image-side surface and the fifth lens having a negative refractive power, a convex object-side surface and a concave image-side surface are cemented, which helps the light passing through the fourth lens smoothly transit to the image plane and which is conducive to reducing the total length of the lens assembly and correcting various aberrations of the optical lens assembly, thereby improving the resolution of the system and optimizing the optical performance such as distortion and a CRA under the premise that the compact structure of the optical lens assembly is achieved.

The cementing approach between the above lenses has at least one of the following advantages: reducing the chromatic aberrations of the lenses, reducing a tolerance sensitivity, and balancing the overall chromatic aberration of the system through residual chromatic aberrations; reducing the spacing distance between the two lenses, thereby reducing the total length of the system; reducing the assembly component between the lenses, thereby reducing the procedures and cost; reducing the tolerance sensitivity problem of a lens unit caused by the tilt/eccentricity in the assembling process, thereby improving the production yield; reducing the loss in the amount of light caused by the reflection between the lenses, thereby improving illumination; and further reducing a field curvature, thereby effectively correcting the off-axis point aberration of the optical lens assembly. Such cementing design shares the overall chromatic aberration correction of the system, and thus, the aberrations are effectively corrected to improve the resolution. The cementing design makes the optical system compact as a whole, thereby meeting the miniaturization requirement.

In an exemplary implementation, the first lens, the third lens, the fourth lens, the fifth lens, and the sixth lens can be spherical lenses, and the second lens and the seventh lens can be aspheric lenses. Particularly, in order to improve the resolution quality of the optical system, the first lens, the second lens, the third lens, the fourth lens, the fifth lens, the sixth lens and the seventh lens can all be aspheric lenses. An aspheric lens is characterized in that the curvature continuously changes from the center of the lens to the periphery of the lens. Different from a spherical lens having a constant curvature from the center of the lens to the periphery of the lens, the aspheric lens has a better radius-of-curvature characteristic, and has advantages of improving the distortion aberration and improving the astigmatic aberration. The use of the aspheric lens can eliminate as much as possible the aberrations that occur during the imaging, thereby improving the imaging quality. The setting of the aspheric lens helps to correct the aberrations of the system, thereby improving the resolution.

Through the reasonable settings for the shapes and refractive powers of the lenses, in the situation where only seven lenses are used, the optical lens assembly according to the above implementations of the present disclosure enables the optical system to achieve at least one beneficial effect such as small chromatic aberrations, high resolution (which can be up to 8 million pixels or more), miniaturization, a small front-end diameter, a long back focal distance and a good imaging quality. At the same time, the optical system also takes into account the low-cost requirements for a small size, a low sensitivity and a high production yield of the lens assembly. The optical lens assembly further has a small CRA, and thus can not only prevent the light from hitting the lens barrel when exiting from the rear end to produce stray light, but also can well match the vehicle-mounted chip, such that the optical lens assembly will not appear the phenomenon of color cast or vignetting. At the same time, the optical lens assembly has good temperature adaptability performance, a small change in imaging effects under high and low temperature environments and a stable imaging quality, which is conducive to the use of the optical lens assembly in most environments.

The optical lens assembly according to the above implementations of the present disclosure is provided with the cemented lens to share the overall chromatic aberration correction of the system, which is not only conducive to correcting the aberration of the system, improving the resolution quality of the system and reducing the problem of matching sensitivity, but also conducive to making the overall structure of the optical system compact and meeting the miniaturization requirement.

In an exemplary implementation, the first to seventh lenses in the optical lens assembly may all be made of glass. The optical lens assembly made of glass can suppress the deviation of the back focus of the optical lens assembly caused by a temperature change, to improve the stability of the system. At the same time, the use of the glass material can avoid the influence on the normal use of the lens assembly due to the blurred image of the lens assembly caused by the change of the high and low temperatures in the use environment. Particularly, when the resolution quality and the reliability are focused on, the first to seventh lenses may all be glass aspherical lenses. Clearly, in application scenarios where there are low requirements for the temperature stability, the first to seventh lenses in the optical lens assembly can alternatively all be made of plastic. Using the plastic to make the optical lens assembly can effectively reduce the production cost. Clearly, the first to seventh lenses in the optical lens assembly can alternatively be jointly made of plastic and glass.

In an exemplary implementation, the fourth lens, the fifth lens, and the sixth lens can be cemented to form a cemented lens, and the cemented lens can share the overall chromatic aberration correction of the system and effectively correct aberrations to improve the resolution, and can also make the optical system compact as a whole, which is conducive to meeting the miniaturization requirement. In addition, the cementing can reduce the impact of the tolerance of a single part to improve the overall performance. At the same time, the cementing can eliminate the air cavity between the fifth lens and the sixth lens, which prevents the light from being reflected back and forth in the air cavity, and thus, the risk of ghost images can be effectively reduced.

In an exemplary implementation, the optical lens assembly may further include a diaphragm disposed between the second lens and the third lens. Disposing the diaphragm behind the second lens can help to increase emergent rays, which is conducive to ensuring the light amount. In implementations of the present disclosure, the diaphragm may be disposed near the second-side surface of the second lens, or near the first-side surface of the third lens, or at a position near the middle between the second lens and the third lens. However, it should be noted that the positions of the diaphragm disclosed here are only examples, rather than limitations. In alternative implementations, the diaphragm may be disposed at other positions according to actual needs.

In an exemplary implementation, a second-side surface of the seventh lens may have at least one inflection point, which is conducive to correcting the aberration of the system and improving the resolving power of the system.

In an exemplary implementation, the optical lens assembly according to an embodiment of the present disclosure may satisfy: TTL/F≤2.5. Here, TTL is a distance on the optical axis from a center of a first-side surface of the first lens to the image plane of the optical lens assembly, and F is a total effective focal length of the optical lens assembly. More particularly, TTL and F may further satisfy: TTL/F≤2.2. Satisfying TTL/F≤2.5 is conducive to restricting the size of the lens assembly, thereby achieving the miniaturization of the lens assembly.

In an exemplary implementation, the optical lens assembly according to an embodiment of the present disclosure may satisfy: Vd3+Vd4≥100. Here, Vd3 is an abbe number of the third lens, and Vd4 is an abbe number of the fourth lens. More particularly, Vd3 and Vd4 may further satisfy: Vd3+Vd4≥120. Satisfying Vd3+Vd4≥100 can help to further limit the deflection capability of the lenses for the light from a certain object point, to correct the chromatic aberration of the imaging lens assembly, which makes the image formed after the light passes through the imaging lens assembly more realistic.

In an exemplary implementation, the optical lens assembly according to an embodiment of the present disclosure may satisfy: 0.2≤(SAG61/D61)/(SAG62/D62)≤2.5. Here, SAG61 is a sagittal height at a maximal aperture of a first-side surface of the sixth lens, D61 is a diameter of the maximal aperture of the first-side surface of the sixth lens, SAG62 is a sagittal height at a maximal aperture of a second-side surface of the sixth lens, and D62 is a diameter of the maximal aperture of the second-side surface of the sixth lens. More particularly, SAG61, D61, SAG62 and D62 may further satisfy: 0.5≤(SAG61/D61)/(SAG62/D62)≤2. When 0.2≤(SAG61/D61)/(SAG62/D62)≤2.5 is satisfied, the shapes of the first-side surface and the second-side surface of the sixth lens are similar, which can be conducive to the smooth transition of the peripheral light and the reduction of the sensitivity of the lens.

In an exemplary implementation, the optical lens assembly according to an embodiment of the present disclosure may satisfy: |F4/F5|≤2.5. Here, F4 is an effective focal length of the fourth lens, and F5 is an effective focal length of the fifth lens. More particularly, F4 and F5 may further satisfy: |F4/F5|≤2. When |F4/F5|≤2.5 is satisfied, the focal lengths of the fourth lens and the fifth lens in the cemented part are similar, which is conducive to the smooth transition of light, the correction of chromatic aberrations and the improvement of the imaging quality, and can effectively improve the thermal compensation of the lens assembly.

In an exemplary implementation, the optical lens assembly according to an embodiment of the present disclosure may satisfy: 0.1≤(d4+d5+d6)/TTL≤0.8. Here, d4 is a center thickness of the fourth lens on the optical axis, d5 is a center thickness of the fifth lens on the optical axis, d6 is a center thickness of the sixth lens on the optical axis, and TTL is the distance on the optical axis from the center of the first-side surface of the first lens to the image plane of the optical lens assembly. More particularly, d4, d5, d6 and TTL may further satisfy: 0.2≤(d4+d5+d6)/TTL≤0.4. When 0.1≤(d4+d5+d6)/TTL≤0.8 is satisfied, the reasonable setting for the focal length of the cemented lens will help more light to enter smoothly, which is conducive to improving the illumination.

In an exemplary implementation, the optical lens assembly according to an embodiment of the present disclosure may satisfy: BFL/TTL≥0.05. Here, BFL is a distance on the optical axis from a center of the second-side surface of the seventh lens to the image plane of the optical lens assembly, and TTL is the distance on the optical axis from the center of the first-side surface of the first lens to the image plane of the optical lens assembly. More particularly, BFL and TTL may further satisfy: BFL/TTL≥0.1. Satisfying BFL/

TTL≥0.05 can make the optical lens assembly have the characteristic of long back focal length, which is conducive to the assembling.

In an exemplary implementation, the optical lens assembly according to an embodiment of the present disclosure may satisfy: $|R6/R7|≤1.3$. Here, R6 is a radius of curvature of a first-side surface of the third lens, and R7 is a radius of curvature of a second-side surface of the third lens. More particularly, R6 and R7 may further satisfy: $|R6/R7|≤1.2$. Satisfying $|R6/R7|≤1.3$ makes the lens symmetrical, which is conducive to correcting spherical aberrations to improve the imaging quality, and which can facilitate the assembling.

In an exemplary implementation, the optical lens assembly according to an embodiment of the present disclosure may satisfy: $(FOV×F)/H≥45$. Here, FOV is a maximal field-of-view of the optical lens assembly, F is the total effective focal length of the optical lens assembly, and H is an image height corresponding to the maximal field-of-view of the optical lens assembly. More particularly, FOV, F and H may further satisfy: $(FOV×F)/H≥50$. Satisfying $(FOV×F)/H≥45$ can be conducive to the realization of small distortion and conducive to simultaneously satisfying the telephoto and the large field-of-view.

In an exemplary implementation, the optical lens assembly according to an embodiment of the present disclosure may satisfy: $1≤F/EPD≤2$. Here, F is the total effective focal length of the optical lens assembly, and EPD is an entrance pupil diameter of the optical lens assembly. More particularly, F and EPD may further satisfy: $1.5≤F/EPD≤1.8$. When $1≤F/EPD≤2$ is satisfied, the entrance pupil diameter is large, which can help to improve the relative illumination.

In an exemplary implementation, the optical lens assembly according to an embodiment of the present disclosure may satisfy: $D/H/θ≤5$. Here, D is a maximal aperture of the first-side surface of the first lens corresponding to the maximal field-of-view of the optical lens assembly, H is an image height corresponding to the maximal field-of-view of the optical lens assembly, and θ is a radian value corresponding to the maximal field-of-view of the optical lens assembly. More particularly, D, H and θ may further satisfy: $D/H/θ≤3$. By satisfying $D/H/θ≤5$, the small diameter of the front end of the lens assembly can be realized, which is conducive to the miniaturization of the lens assembly.

In an exemplary implementation, the optical lens assembly according to an embodiment of the present disclosure may satisfy: $|F45/F|≤12$. Here, F45 is a combined focal length of the fourth lens and the fifth lens, and F is the total effective focal length of the optical lens assembly. More particularly, F45 and F may further satisfy: $|F45/F|≤10$. Satisfying $|F45/F|≤12$, the first two lenses (i.e., the fourth lens and the fifth lens) in the cemented part converge light, which can make the structure more compact and make the follow-up light trend smooth, which is conducive to the miniaturization and high resolution of the lens assembly.

In an exemplary implementation, the optical lens assembly according to an embodiment of the present disclosure may satisfy: $|F456/F|≥2$. Here, F456 is a combined focal length of the fourth lens, the fifth lens and the sixth lens, and F is the total effective focal length of the optical lens assembly. More particularly, F456 and F may further satisfy: $|F456/F|≥2.5$. When $|F456/F|≥2$ is satisfied, the reasonable setting for the focal length of the cemented lens will help more light to enter smoothly, which is conducive to improving the illumination.

In an exemplary implementation, the optical lens assembly according to an embodiment of the present disclosure may satisfy: $0.2≤Ti10/TTL≤0.6$. Here, Ti10 is a distance on the optical axis from a center of the first-side surface of the sixth lens to the image plane of the optical lens assembly, and TTL is the distance on the optical axis from the center of the first-side surface of the first lens to the image plane of the optical lens assembly. More particularly, Ti10 and TTL may further satisfy: $0.3≤Ti10/TTL≤0.5$. Satisfying $0.2≤Ti10/TTL≤0.6$ can make the sixth lens farther away from the image plane, which can help to eliminate ghost images.

In an exemplary implementation, the optical lens assembly according to an embodiment of the present disclosure may satisfy: $0.05≤d7/TTL≤0.2$. Here, d7 is a center thickness of the seventh lens on the optical axis, and TTL is the distance on the optical axis from the center of the first-side surface of the first lens to the image plane of the optical lens assembly. More particularly, d7 and TTL may further satisfy: $0.07≤d7/TTL≤0.15$. Satisfying $0.05≤d7/TTL≤0.2$, the thicker last lens (i.e., the seventh lens) can make the deflection of light smooth, which is conducive to improving the relative illumination. At the same time, the lens can share the turning pressure of the third lens to relieve the sensitivity and weight of the third lens, and can also balance aberrations to improve the resolution.

In an exemplary implementation, the optical lens assembly according to an embodiment of the present disclosure may satisfy: $d46/TTL≤0.05$. Here, d46 is a spacing distance on the optical axis from a center of a second-side surface of the fourth lens to the center of the first-side surface of the sixth lens, and TTL is the distance on the optical axis from the center of the first-side surface of the first lens to the image plane of the optical lens assembly. More particularly, d46 and TTL may further satisfy: $d46/TTL≤0.04$. When $d46/TTL≤0.05$ is satisfied, the distance between the fourth lens and the sixth lens is shortened, which is conducive to reducing the ghost image problem caused by the close curvatures of the two surfaces, and at the same time, the air spacing can be reduced, thereby reducing the size of the lens assembly.

Figure 20:
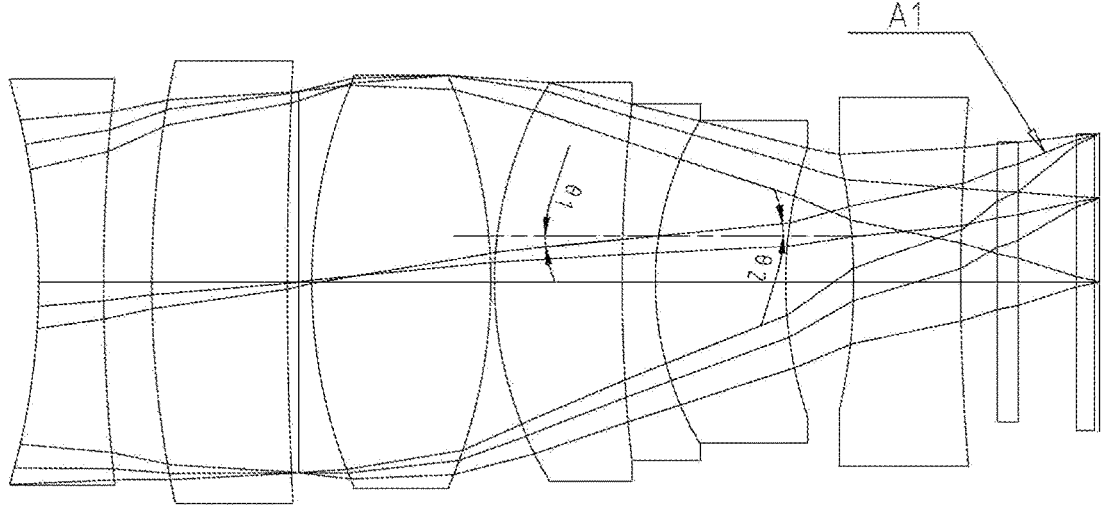
FIG. 20 is a schematic diagram of a radian value $\theta1$ of an angle between an incident ray of a central chief ray at an edge field of view of the optical lens assembly before

In an exemplary implementation, the optical lens assembly according to an embodiment of the present disclosure may satisfy: $θ2/θ1≤2$. Here, θ1 is a radian value of an angle between an incident ray of a central chief ray of an edge field of view of the optical lens assembly before reaching the sixth lens and the optical axis, and θ2 is a radian value of an angle between an emergent ray of the central chief ray of the edge field of view of the optical lens assembly after passing through the sixth lens and the optical axis. As shown in FIG. 20, A1 in FIG. 20 denotes the central chief ray of the edge field of view of the optical lens assembly. More particularly, θ1 and θ2 may further satisfy: $θ2/θ1≤1.5$. Satisfying $θ2/θ1≤2$ can make the light trend smooth, which is conducive to the smooth transition of light, the reduction of sensitive items of the lens and the improvement of illumination.

In an exemplary implementation, the optical lens assembly according to an embodiment of the present disclosure may satisfy: $2.1≤|F6/F|≤10$. Here, F6 is an effective focal length of the sixth lens, and F is the total effective focal length of the optical lens assembly. More particularly, F6 and F may further satisfy: $2.1≤|F6/F|≤8$. When $2.1≤|F6/F|≤10$ is satisfied, the reasonable distribution for the focal length of the cemented lens can reduce the loss of light energy, which is conducive to improving the illumination and correcting aberrations at the same time, thereby improving the resolution.

In an exemplary implementation, the optical lens assembly according to an embodiment of the present disclosure may satisfy: $1 \leq (N6-N4)/(N5-N4) \leq 2$. Here, N4 is a refractive index of the fourth lens, N5 is a refractive index of the fifth lens, and N6 is a refractive index of the sixth lens. More particularly, N4, N5 and N6 may further satisfy: $1 \leq (N6-N4)/(N5-N4) \leq 1.8$. When $1 \leq (N6-N4)/(N5-N4) \leq 2$ is satisfied, the refractive index of the fourth lens, the refractive index of the fifth lens, and the refractive index of the sixth lens are similar, which can make the light trend smooth and reduce the refractive index sensitivity of the lenses, and at the same time which can be conducive to balancing aberrations, thereby improving the resolution.

In an exemplary implementation, the optical lens assembly according to an embodiment of the present disclosure may satisfy: $T \leq 0.03+d4+d5+d6$. Here, d4 is the center thickness of the fourth lens on the optical axis, d5 is the center thickness of the fifth lens on the optical axis, d6 is the center thickness of the sixth lens on the optical axis, and T is a distance on the optical axis from a center of a first-side surface of the fourth lens to a center of the second-side surface of the sixth lens. More particularly, d4, d5, d6 and T may further satisfy: $T \leq 0.02+d4+d5+d6$.

In an exemplary implementation, the optical lens assembly according to an embodiment of the present disclosure may further include an optical filter and/or a protective glass disposed between the seventh lens and the image plane, to filter light with different wavelengths and prevent the elements (e.g., chips) on the second side of the optical lens assembly from being damaged.

In an exemplary implementation, the first lens can be a spherical lens, the second lens can be an aspheric lens, the third lens, the fourth lens, the fifth lens, and the sixth lens can be spherical lenses, and the seventh lens can be an aspheric lens. The present disclosure does not specifically limit the specific numbers of spherical lenses and aspheric lenses, and the number of aspheric lenses can be increased when the resolution quality is focused on. Particularly, in order to improve the resolution quality of the optical system, the first lens, the second lens, the third lens, the fourth lens, the fifth lens, the sixth lens and the seventh lens can all be aspheric lenses. An aspheric lens is characterized in that the curvature continuously changes from the center of the lens to the periphery of the lens. Different from a spherical lens having a constant curvature from the center of the lens to the periphery of the lens, the aspheric lens has a better radius-of-curvature characteristic, and has advantages of improving the distortion aberration and improving the astigmatic aberration. The use of the aspheric lens can eliminate as much as possible the aberrations that occur during the imaging, thereby improving the imaging quality. The setting of the aspheric lens helps to correct the aberrations of the system, thereby improving the resolution.

In an exemplary implementation, the first lens, the second lens, the third lens, the fourth lens, the fifth lens, the sixth lens and the seventh lens may all be glass lenses. The optical lens assembly made of glass can suppress the deviation of the back focus of the optical lens assembly caused by a temperature change, to improve the stability of the system. At the same time, the use of the glass material can avoid the influence on the normal use of the lens assembly due to the blurred image of the lens assembly caused by the change of the high and low temperatures in the use environment. Particularly, when the temperature performance and the resolution quality are the focused on, the first to seventh lenses may all be glass aspherical lenses. In application scenarios where there are low requirements for the temperature stability, the first to seventh lenses in the optical lens assembly can alternatively all be made of plastic. Using the plastic to make the optical lens assembly can effectively reduce the production cost. Clearly, the first to seventh lenses in the optical lens assembly can alternatively be jointly made of plastic and glass.

Through the reasonable settings for the shapes and refractive powers of the lenses, the optical lens assembly according to the above implementations of the present disclosure enables the optical system to achieve at least one beneficial effect such as high resolution, miniaturization, low costs, good chromatic aberrations, a long back focal distance and a good imaging quality, and thus, the optical lens assembly can well meet the requirement when being applied as vehicle-mounted front-view lens assemblies. Specifically, by adopting the approach of cementing three lenses, the optical lens assembly according to the above implementations of the present disclosure eliminates the additional ghost image generated by the reflection by the lens surface, to ensure the accuracy of the signal received by the vehicle-mounted chip. Also, the cementing of the three lenses makes it easy to reduce matching sensitive items. In addition, through the proper setting for the position of the diaphragm, the selection for a large entrance pupil diameter, the reasonable matching of materials of the lenses, the reasonable setting for the refractive powers of the lenses, etc., it is possible to achieve a good match with the vehicle-mounted chip, resulting in uniform imaging, high relative illumination, and no color cast and vignetting phenomena. Moreover, through the aspherical lenses, the reasonable setting for the refractive powers, etc., the optical system uses only seven lenses to meet the requirements for both miniaturization and high resolution. Through the reasonable distribution of the refractive power of the system, a small change in imaging effects under high and low temperatures and a stable imaging quality can further be achieved, and thus, the lens assembly is suitable for the use in most environments of vehicles. Moreover, the low tolerance sensitivity can reduce the difficulty of processing and assembling, thereby reducing the cost of the lens assembly.

However, it should be understood by those skilled in the art that the various results and advantages described in the present specification may be obtained by changing the number of the lenses constituting the optical lens assembly without departing from the technical solution claimed by the present disclosure. For example, although the optical lens assembly having seven lenses is described as an example in the implementations, the optical lens assembly is not limited to including the seven lenses. If desired, the optical lens assembly may also include other numbers of lenses.

Specific embodiments of the optical lens assembly that may be applicable to the above implementations are further described below with reference to the accompanying drawings.

Embodiment 1

An optical lens assembly according to Embodiment 1 of the present disclosure is described below with reference to FIG. 1. FIG. 1 is a schematic structural diagram of the optical lens assembly according to Embodiment 1 of the present disclosure.

As shown in FIG. 1, the optical lens assembly includes, sequentially along an optical axis from an object side to an image side, a first lens L1, a second lens L2, a third lens L3, a fourth lens L4, a fifth lens L5, a sixth lens L6, and a seventh lens L7.

The first lens L1 is a dual-concave lens having a negative refractive power, an object-side surface S1 of the first lens L1 is a concave surface, and an image-side surface S2 of the first lens L1 is a concave surface. The second lens L2 is a convex-concave lens having a positive refractive power, an object-side surface S3 of the second lens L2 is a convex surface, and an image-side surface S4 of the second lens L2 is a concave surface. The third lens L3 is a dual-convex lens having a positive refractive power, an object-side surface S6 of the third lens L3 is a convex surface, and an image-side surface S7 of the third lens L3 is a convex surface. The fourth lens L4 is a dual-convex lens having a positive refractive power, an object-side surface S8 of the fourth lens L4 is a convex surface, and an image-side surface S9 of the fourth lens L4 is a convex surface. The fifth lens L5 is a dual-concave lens having a negative refractive power, an object-side surface S9 of the fifth lens L5 is a concave surface, and an image-side surface S10 of the fifth lens L5 is a concave surface. The sixth lens L6 is a convex-concave lens having a positive refractive power, an object-side surface S11 of the sixth lens L6 is a convex surface, and an image-side surface S12 of the sixth lens L6 is a concave surface. The seventh lens L7 is a dual-concave lens having a negative refractive power, an object-side surface S13 of the seventh lens L7 is a concave surface, and an image-side surface S14 of the seventh lens L7 is a concave surface. The fourth lens L4 and the fifth lens L5 can be cemented to form a cemented lens.

The optical lens assembly may further include a diaphragm STO, and the diaphragm STO may be disposed between the second lens L2 and the third lens L3 to improve the imaging quality. For example, the diaphragm STO may be disposed at a position near the object-side surface S6 of the third lens L3 and between the second lens L2 and the third lens L3.

Alternatively, the optical lens assembly may further include an optical filter L8 having an object-side surface S15 and an image-side surface S16 and/or a protective glass L8'. The optical filter L8 may be used to correct color deviations, and the protective glass L8' may be used to protect an image sensing chip IMA at an image plane. Light from an object sequentially passes through the surfaces S1-S16 and finally forms an image on the image plane.

Table 1 shows a radius of curvature R, a thickness/distance d (it should be understood that the thickness/distance d in the row of S1 refers to the center thickness d1 of the first lens L1, the thickness/distance d in the row of S2 refers to the spacing distance d12 between the first lens L1 and the second lens L2, and so on), a refractive index ND and an abbe number VD of each lens of the optical lens assembly in Embodiment 1.

TABLE 1

| surface number | radius of curvature R (mm) | thickness/distance d (mm) | refractive index ND | abbe number VD |
|---|---|---|---|---|
| S1 | −19.5884 | 1.5000 | 1.63 | 35.71 |
| S2 | 33.9260 | 1.1679 | | |
| S3 | 20.4750 | 3.5000 | 1.69 | 31.08 |
| S4 | 130.3176 | 2.4829 | | |
| STO | infinite | 0.1000 | | |
| S6 | 19.5461 | 3.8588 | 1.62 | 60.37 |
| S7 | −23.9112 | 0.7123 | | |
| S8 | 8.9847 | 4.0000 | 1.62 | 63.41 |
| S9 | −231.9778 | 0.8000 | 1.69 | 31.16 |
| S10 | 6.8501 | 2.2786 | | |
| S11 | 8.4199 | 3.3079 | 1.62 | 63.41 |
| S12 | 12.5241 | 1.9915 | | |
| S13 | −46.0151 | 2.2000 | 1.69 | 31.08 |
| S14 | 81.6951 | 2.2998 | | |
| S15 | infinite | 1.0500 | 1.52 | 64.21 |
| S16 | infinite | 0.1250 | | |
| IMA | infinite | | | |

In Embodiment 1, the second lens L2 and the seventh lens L7 may be aspheric lenses, and the first lens L1, the third lens L3, the fourth lens L4, the fifth lens L5, and the sixth lens L6 may be spherical lenses. The surface type x of each aspheric lens may be defined using, but not limited to, the following formula:

$$x = \frac{ch^2}{1 + \sqrt{1 - (k+1)c^2h^2}} + \sum A_i h^i. \tag{1}$$

Here, x is the sag—the axis-component of the displacement of a point on the aspheric surface from the aspheric vertex, when the point on the aspheric surface is at height h from the optical axis; c is the paraxial curvature of the aspheric surface, and c=1/R (i.e., the paraxial curvature c is the reciprocal of the radius of curvature R in Table 1 above); k is the conic coefficient; and Ai is the correction coefficient of an i-th order of the aspheric surface. Table 2 below gives the conic coefficients k and the high-order coefficients A4, A6, A8, A10, A12, A14 and A16 applicable to the aspheric surfaces S3, S4, S13 and S14 in Embodiment 1.

TABLE 2

| surface number | k | A4 | A6 | A8 | A10 | A12 | A14 | A16 |
|---|---|---|---|---|---|---|---|---|
| S3 | / | −3.7105E−05 | 1.6207E−07 | −2.3982E−08 | 8.6145E−10 | −1.5626E−11 | 1.1394E−13 | / |
| S4 | / | 4.7170E−05 | 6.5744E−08 | −3.7075E−09 | 1.4165E−10 | −3.2150E−12 | 3.1006E−14 | / |
| S13 | 99.0000 | −1.5203E−03 | −3.4714E−05 | 7.4417E−06 | −1.0749E−06 | 8.8882E−08 | −3.7695E−09 | 6.5359E−11 |
| S14 | −62.8703 | −1.1346E−03 | −5.0952E−05 | 9.6905E−06 | −1.0188E−06 | 6.2823E−08 | −2.0529E−09 | 2.7405E−11 |

Embodiment 2

Figure 2:
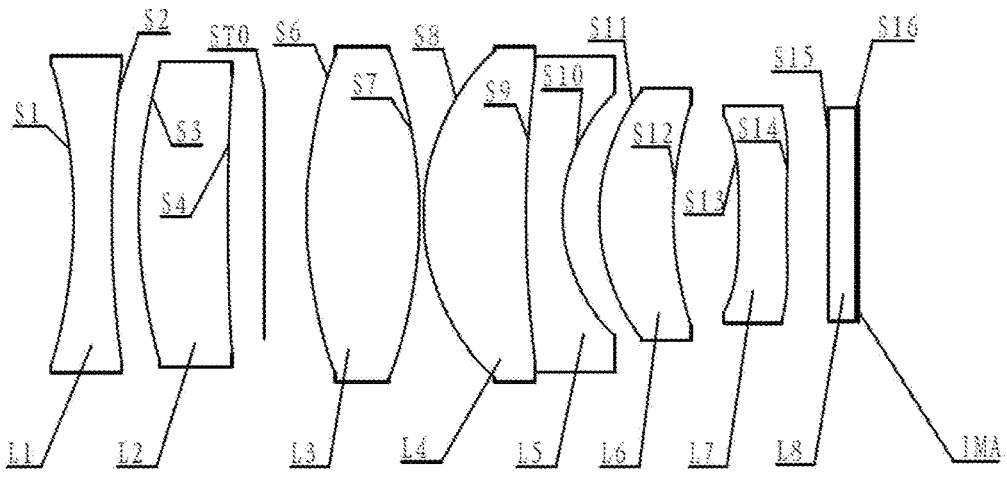
FIG. 2 is a schematic structural diagram of an optical lens assembly according to Embodiment 2 of the present disclosure.

An optical lens assembly according to Embodiment 2 of the present disclosure is described below with reference to FIG. 2. In this embodiment, for the sake of brevity, some descriptions similar to those in Embodiment 1 will be omitted. FIG. 2 is a schematic structural diagram of the optical lens assembly according to Embodiment 2 of the present disclosure.

As shown in FIG. 2, the optical lens assembly includes, sequentially along an optical axis from an object side to an image side, a first lens L1, a second lens L2, a third lens L3, a fourth lens L4, a fifth lens L5, a sixth lens L6 and a seventh lens L7.

The first lens L1 is a dual-concave lens having a negative refractive power, an object-side surface S1 of the first lens L1 is a concave surface, and an image-side surface S2 of the first lens L1 is a concave surface. The second lens L2 is a convex-concave lens having a positive refractive power, an object-side surface S3 of the second lens L2 is a convex surface, and an image-side surface S4 of the second lens L2 is a concave surface. The third lens L3 is a dual-convex lens having a positive refractive power, an object-side surface S6 of the third lens L3 is a convex surface, and an image-side surface S7 of the third lens L3 is a convex surface. The fourth lens L4 is a convex-concave lens having a positive refractive power, an object-side surface S8 of the fourth lens L4 is a convex surface, and an image-side surface S9 of the fourth lens L4 is a concave surface. The fifth lens L5 is a convex-concave lens having a negative refractive power, an Table 3 shows a radius of curvature R, a thickness/distance d, a refractive index ND and an abbe number VD of each lens of the optical lens assembly in Embodiment 2. Table 4 shows the conic coefficients and the high-order coefficients applicable to the aspheric surfaces in Embodiment 2. Here, the surface type of each aspheric surface may be defined using the formula (1) given in Embodiment 1.

TABLE 3

| surface number | radius of curvature R (mm) | thickness/distance d (mm) | refractive index ND | abbe number VD |
|---|---|---|---|---|
| S1 | −20.1913 | 1.5000 | 1.63 | 35.71 |
| S2 | 43.4901 | 1.0568 | | |
| S3 | 19.9373 | 3.5000 | 1.69 | 31.08 |
| S4 | 150.0000 | 1.4161 | | |
| STO | infinite | 0.1000 | | |
| S6 | 18.0000 | 4.3982 | 1.44 | 95.10 |
| S7 | −18.0000 | 0.1915 | | |
| S8 | 8.7534 | 4.0000 | 1.62 | 60.37 |
| S9 | 46.7841 | 1.4216 | 1.69 | 31.16 |
| S10 | 6.5301 | 1.4381 | | |
| S11 | 7.9309 | 2.8895 | 1.69 | 53.35 |
| S12 | 13.7310 | 2.5645 | | |
| S13 | −57.7828 | 1.8706 | 1.70 | 30.05 |
| S14 | 31.5296 | 1.6339 | | |
| S15 | infinite | 1.0500 | 1.52 | 64.21 |
| S16 | infinite | 0.1250 | | |
| IMA | infinite | | | |

TABLE 4

| surface number | k | A4 | A6 | A8 | A10 | A12 | A14 | A16 |
|---|---|---|---|---|---|---|---|---|
| S3 | / | −2.0471E−05 | 7.5344E−07 | −5.0240E−08 | 1.7146E−09 | −2.8399E−11 | 1.6874E−13 | / |
| S4 | / | 6.7666E−05 | 5.0176E−07 | −1.6310E−08 | 4.3557E−10 | −2.1257E−12 | −5.0188E−14 | / |
| S13 | 99.0000 | −2.0570E−03 | −2.5626E−05 | 6.8082E−06 | −1.0087E−06 | 8.2449E−08 | −3.3965E−09 | 5.5732E−11 |
| S14 | −62.8703 | −1.3845E−03 | −4.5932E−05 | 9.6159E−06 | −1.0199E−06 | 6.3437E−08 | −2.0854E−09 | 2.7892E−11 | object-side surface S9 of the fifth lens L5 is a convex surface, and an image-side surface S10 of the fifth lens L5 is a concave surface. The sixth lens L6 is a convex-concave lens having a positive refractive power, an object-side surface S11 of the sixth lens L6 is a convex surface, and an image-side surface S12 of the sixth lens L6 is a concave surface. The seventh lens L7 is a dual-concave lens having a negative refractive power, an object-side surface S13 of the seventh lens L7 is a concave surface, and an image-side surface S14 of the seventh lens L7 is a concave surface. The fourth lens L4 and the fifth lens L5 can be cemented to form a cemented lens.

The optical lens assembly may further include a diaphragm STO, and the diaphragm STO may be disposed between the second lens L2 and the third lens L3 to improve the imaging quality. For example, the diaphragm STO may be disposed at a position near the object-side surface S6 of the third lens L3 between the second lens L2 and the third lens L3.

Alternatively, the optical lens assembly may further include an optical filter L8 having an object-side surface S15 and an image-side surface S16 and/or a protective glass L8'. The optical filter L8 may be used to correct color deviations, and the protective glass L8' may be used to protect an image sensing chip IMA at an image plane. Light from an object sequentially passes through the surfaces S1-S16 and finally forms an image on the image plane.

Embodiment 3

Figure 3:
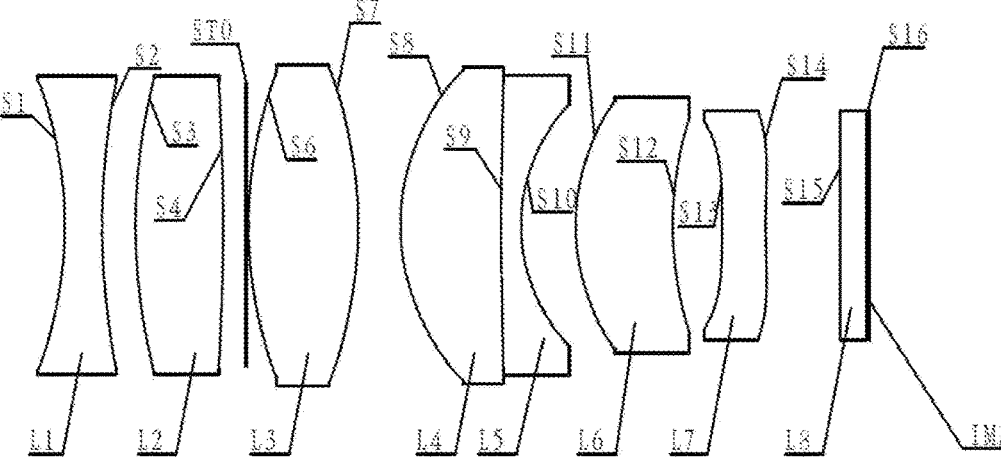
FIG. 3 is a schematic structural diagram of an optical lens assembly according to Embodiment 3 of the present disclosure.

An optical lens assembly according to Embodiment 3 of the present disclosure is described below with reference to FIG. 3. FIG. 3 is a schematic structural diagram of the optical lens assembly according to Embodiment 3 of the present disclosure.

As shown in FIG. 3, the optical lens assembly includes, sequentially along an optical axis from an object side to an image side, a first lens L1, a second lens L2, a third lens L3, a fourth lens L4, a fifth lens L5, a sixth lens L6 and a seventh lens L7.

The first lens L1 is a dual-concave lens having a negative refractive power, an object-side surface S1 of the first lens L1 is a concave surface, and an image-side surface S2 of the first lens L1 is a concave surface. The second lens L2 is a dual-convex lens having a positive refractive power, an object-side surface S3 of the second lens L2 is a convex surface, and an image-side surface S4 of the second lens L2 is a convex surface. The third lens L3 is a dual-convex lens having a positive refractive power, an object-side surface S6 of the third lens L3 is a convex surface, and an image-side surface S7 of the third lens L3 is a convex surface. The fourth lens L4 is a convex-concave lens having a positive refractive power, an object-side surface S8 of the fourth lens L4 is a convex surface, and an image-side surface S9 of the fourth lens L4 is a concave surface. The fifth lens L5 is a convex-concave lens having a negative refractive power, an object-side surface S9 of the fifth lens L5 is a convex surface, and an image-side surface S10 of the fifth lens L5 is a concave surface. The sixth lens L6 is a convex-concave lens having a positive refractive power, an object-side surface S11 of the sixth lens L6 is a convex surface, and an image-side surface S12 of the sixth lens L6 is a concave surface. The seventh lens L7 is a dual-concave lens having a negative refractive power, an object-side surface S13 of the seventh lens L7 is a concave surface, and an image-side surface S14 of the seventh lens L7 is a concave surface. The fourth lens L4 and the fifth lens L5 can be cemented to form a cemented lens.

The optical lens assembly may further include a diaphragm STO, and the diaphragm STO may be disposed between the second lens L2 and the third lens L3 to improve the imaging quality. For example, the diaphragm STO may be disposed at a position near the object-side surface S6 of the third lens L3 between the second lens L2 and the third lens L3.

Alternatively, the optical lens assembly may further include an optical filter L8 having an object-side surface S15 and an image-side surface S16 and/or a protective glass L8'. The optical filter L8 may be used to correct color deviations, and the protective glass L8' may be used to protect an image sensing chip IMA at an image plane. Light from an object sequentially passes through the surfaces S1-S16 and finally forms an image on the image plane.

Table 5 shows a radius of curvature R, a thickness/distance d, a refractive index ND and an abbe number VD of each lens of the optical lens assembly in Embodiment 3. Table 6 shows the conic coefficients and the high-order coefficients applicable to the aspheric surfaces in Embodiment 3. Here, the surface type of each aspheric surface may be defined using the formula (1) given in Embodiment 1.

TABLE 5

| surface number | radius of curvature R (mm) | thickness/distance d (mm) | refractive index ND | abbe number VD |
|---|---|---|---|---|
| S1 | −16.1545 | 1.5000 | 1.64 | 34.47 |
| S2 | 29.3143 | 1.3250 | | |
| S3 | 22.4413 | 3.5000 | 1.69 | 31.08 |
| S4 | −70.5212 | 0.9161 | | |
| STO | infinite | 0.1000 | | |
| S6 | 17.6650 | 4.3217 | 1.44 | 95.10 |
| S7 | −17.6650 | 1.7245 | | |
| S8 | 8.9136 | 4.0000 | 1.58 | 59.46 |
| S9 | 194.9548 | 0.8000 | 1.69 | 31.16 |
| S10 | 7.0895 | 2.1460 | | |
| S11 | 8.6147 | 3.8638 | 1.68 | 55.56 |
| S12 | 14.0321 | 1.9701 | | |
| S13 | −76.4746 | 1.7330 | 1.69 | 31.08 |
| S14 | 32.1216 | 2.9441 | | |
| S15 | infinite | 1.0500 | 1.52 | 64.21 |
| S16 | infinite | 0.1250 | | |
| IMA | infinite | | | |

Embodiment 4

Figure 4:
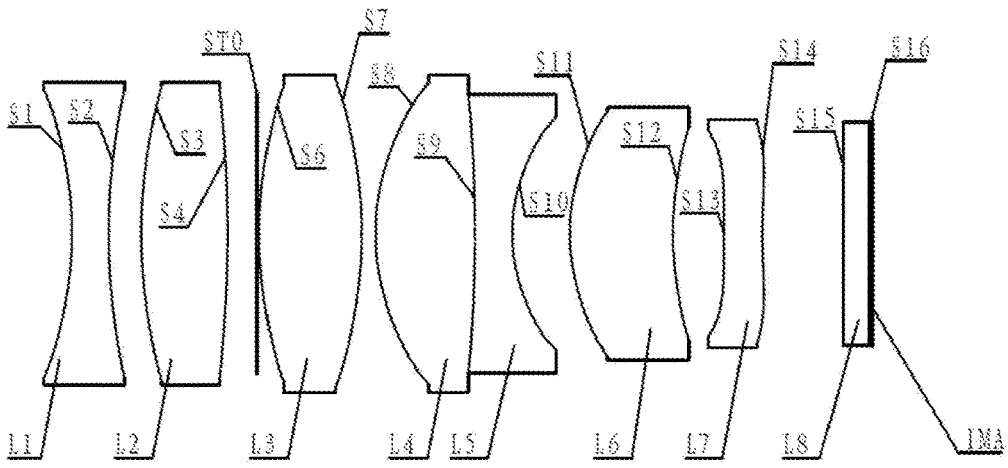
FIG. 4 is a schematic structural diagram of an optical lens assembly according to Embodiment 4 of the present disclosure.

An optical lens assembly according to Embodiment 4 of the present disclosure is described below with reference to FIG. 4. FIG. 4 is a schematic structural diagram of the optical lens assembly according to Embodiment 4 of the present disclosure.

As shown in FIG. 4, the optical lens assembly includes, sequentially along an optical axis from an object side to an image side, a first lens L1, a second lens L2, a third lens L3, a fourth lens L4, a fifth lens L5, a sixth lens L6 and a seventh lens L7.

The first lens L1 is a dual-concave lens having a negative refractive power, an object-side surface S1 of the first lens L1 is a concave surface, and an image-side surface S2 of the first lens L1 is a concave surface. The second lens L2 is a dual-convex lens having a positive refractive power, an object-side surface S3 of the second lens L2 is a convex surface, and an image-side surface S4 of the second lens L2 is a convex surface. The third lens L3 is a dual-convex lens having a positive refractive power, an object-side surface S6 of the third lens L3 is a convex surface, and an image-side surface S7 of the third lens L3 is a convex surface. The fourth lens L4 is a dual-convex lens having a positive refractive power, an object-side surface S8 of the fourth lens L4 is a convex surface, and an image-side surface S9 of the fourth lens L4 is a convex surface. The fifth lens L5 is a dual-concave lens having a negative refractive power, an object-side surface S9 of the fifth lens L5 is a concave surface, and an image-side surface S10 of the fifth lens L5 is a concave surface. The sixth lens L6 is a convex-concave lens having a positive refractive power, an object-side surface S11 of the sixth lens L6 is a convex surface, and an image-side surface S12 of the sixth lens L6 is a concave surface. The seventh lens L7 is a convex-concave lens having a negative refractive power, an object-side surface S13 of the seventh lens L7 is a convex surface, and an image-side surface S14 of the seventh lens L7 is a concave surface. The fourth lens L4 and the fifth lens L5 can be cemented to form a cemented lens.

The optical lens assembly may further include a diaphragm STO, and the diaphragm STO may be disposed between the second lens L2 and the third lens L3 to improve the imaging quality. For example, the diaphragm STO may be disposed at a position near the object-side surface S6 of the third lens L3 between the second lens L2 and the third lens L3.

Alternatively, the optical lens assembly may further include an optical filter L8 having an object-side surface S15 and an image-side surface S16 and/or a protective glass L8'. The optical filter L8 may be used to correct color deviations, and the protective glass L8' may be used to protect an image sensing chip IMA at an image plane. Light from an object sequentially passes through the surfaces S1-S16 and finally forms an image on the image plane.

TABLE 6

| surface number | k | A4 | A6 | A8 | A10 | A12 | A14 | A16 |
|---|---|---|---|---|---|---|---|---|
| S3 | / | −3.8271E−05 | 5.9776E−07 | −3.4406E−08 | 8.7411E−10 | −5.8120E−12 | −4.3626E−14 | / |
| S4 | / | 4.1503E−05 | 2.7181E−07 | 1.4009E−08 | −1.1311E−09 | 3.6539E−11 | −3.9143E−13 | / |
| S13 | 99.0000 | −2.0074E−03 | −2.9249E−05 | 6.1365E−06 | −8.2939E−07 | 6.4084E−08 | −2.5213E−09 | 3.9531E−11 |
| S14 | −62.8703 | −1.2996E−03 | −5.0610E−05 | 9.4551E−06 | −9.5569E−07 | 5.7514E−08 | −1.8419E−09 | 2.4052E−11 |

Table 7 shows a radius of curvature R, a thickness/distance d, a refractive index ND and an abbe number VD of each lens of the optical lens assembly in Embodiment 4. Table 8 shows the conic coefficients and the high-order coefficients applicable to the aspheric surfaces in Embodiment 4. Here, the surface type of each aspheric surface may be defined using the formula (1) given in Embodiment 1.

TABLE 7

| surface number | radius of curvature R (mm) | thickness/distance d (mm) | refractive index ND | abbe number VD |
|---|---|---|---|---|
| S1 | −15.6523 | 1.5000 | 1.64 | 34.47 |
| S2 | 26.7265 | 1.3125 | | |
| S3 | 20.7151 | 3.5000 | 1.67 | 32.18 |
| S4 | −47.3250 | 1.1765 | | |
| STO | infinite | 0.1000 | | |
| S6 | 19.0000 | 4.1094 | 1.44 | 95.10 |
| S7 | −19.0000 | 0.5906 | | |
| S8 | 9.7932 | 4.0000 | 1.59 | 61.25 |
| S9 | −60.9188 | 1.5279 | 1.69 | 31.16 |
| S10 | 7.2950 | 2.3062 | | |
| S11 | 8.8675 | 4.1664 | 1.69 | 53.35 |
| S12 | 14.8577 | 2.0614 | | |
| S13 | 384.7739 | 1.5491 | 1.69 | 31.08 |
| S14 | 25.0833 | 3.2535 | | |
| S15 | infinite | 1.0500 | 1.52 | 64.21 |
| S16 | infinite | 0.1250 | | |
| IMA | infinite | | | |

TABLE 8

| surface number | k | A4 | A6 | A8 | A10 | A12 | A14 | A16 |
|---|---|---|---|---|---|---|---|---|
| S3 | / | −4.9659E−05 | 6.1691E−07 | −4.0306E−08 | 1.2912E−09 | −1.8951E−11 | 1.0017E−13 | / |
| S4 | / | 2.3164E−05 | 3.3249E−07 | −6.3657E−09 | −2.4718E−11 | 7.1529E−12 | −1.0220E−13 | / |
| S13 | 99.0000 | −2.0017E−03 | −3.2448E−05 | 6.4981E−06 | −8.5155E−07 | 5.9474E−08 | −2.1615E−09 | 3.0716E−11 |
| S14 | −62.8703 | −1.1026E−03 | −7.2596E−05 | 1.0862E−05 | −1.0210E−06 | 5.8817E−08 | −1.8065E−09 | 2.2476E−11 |

Embodiment 5

Figure 5:
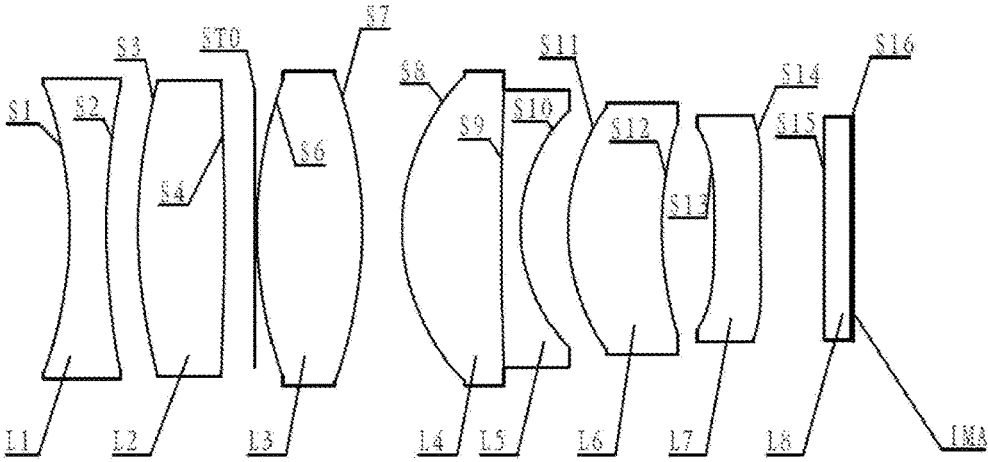
FIG. 5 is a schematic structural diagram of an optical lens assembly according to Embodiment 5 of the present disclosure.

An optical lens assembly according to Embodiment 5 of the present disclosure is described below with reference to FIG. 5. FIG. 5 is a schematic structural diagram of the optical lens assembly according to Embodiment 5 of the present disclosure.

As shown in FIG. 5, the optical lens assembly includes, sequentially along an optical axis from an object side to an image side, a first lens L1, a second lens L2, a third lens L3, a fourth lens L4, a fifth lens L5, a sixth lens L6 and a seventh lens L7.

The first lens L1 is a dual-concave lens having a negative refractive power, an object-side surface S1 of the first lens L1 is a concave surface, and an image-side surface S2 of the first lens L1 is a concave surface. The second lens L2 is a dual-convex lens having a positive refractive power, an object-side surface S3 of the second lens L2 is a convex surface, and an image-side surface S4 of the second lens L2 is a convex surface. The third lens L3 is a dual-convex lens having a positive refractive power, an object-side surface S6 of the third lens L3 is a convex surface, and an image-side surface S7 of the third lens L3 is a convex surface. The fourth lens L4 is a convex-concave lens having a positive refractive power, an object-side surface S8 of the fourth lens L4 is a convex surface, and an image-side surface S9 of the fourth lens L4 is a concave surface. The fifth lens L5 is a convex-concave lens having a negative refractive power, an object-side surface S9 of the fifth lens L5 is a convex surface, and an image-side surface S10 of the fifth lens L5 is a concave surface. The sixth lens L6 is a convex-concave lens having a positive refractive power, an object-side surface S11 of the sixth lens L6 is a convex surface, and an image-side surface S12 of the sixth lens L6 is a concave surface. The seventh lens L7 is a dual-concave lens having a negative refractive power, an object-side surface S13 of the seventh lens L7 is a concave surface, and an image-side surface S14 of the seventh lens L7 is a concave surface. The fourth lens L4 and the fifth lens L5 can be cemented to form a cemented lens.

The optical lens assembly may further include a diaphragm STO, and the diaphragm STO may be disposed between the second lens L2 and the third lens L3 to improve the imaging quality. For example, the diaphragm STO may be disposed at a position near the object-side surface S6 of the third lens L3 between the second lens L2 and the third lens L3.

Alternatively, the optical lens assembly may further include an optical filter L8 having an object-side surface S15 and an image-side surface S16 and/or a protective glass L8'. The optical filter L8 may be used to correct color deviations, and the protective glass L8' may be used to protect an image sensing chip IMA at an image plane. Light from an object sequentially passes through the surfaces S1-S16 and finally forms an image on the image plane.

Table 9 shows a radius of curvature R, a thickness/distance d, a refractive index ND and an abbe number VD of each lens of the optical lens assembly in Embodiment 5. Table 10 shows the conic coefficients and the high-order coefficients applicable to the aspheric surfaces in Embodiment 5. Here, the surface type of each aspheric surface may be defined using the formula (1) given in Embodiment 1.

TABLE 9

| surface number | radius of curvature R (mm) | thickness/distance d (mm) | refractive index ND | abbe number VD |
|---|---|---|---|---|
| S1 | −16.6256 | 1.5000 | 1.63 | 35.71 |
| S2 | 29.7756 | 1.2734 | | |
| S3 | 21.3393 | 3.5000 | 1.69 | 31.08 |
| S4 | −88.4857 | 1.2183 | | |
| STO | infinite | 0.1000 | | |
| S6 | 18.0000 | 4.2152 | 1.44 | 95.10 |
| S7 | −18.0000 | 1.6403 | | |
| S8 | 8.7651 | 4.0000 | 1.59 | 61.25 |
| S9 | 150.0000 | 0.8000 | 1.69 | 31.16 |
| S10 | 6.8706 | 1.8891 | | |
| S11 | 8.5672 | 3.7863 | 1.69 | 53.35 |
| S12 | 14.4137 | 2.1266 | | |
| S13 | −71.5241 | 1.8506 | 1.69 | 31.08 |
| S14 | 32.9097 | 2.5880 | | |
| S15 | infinite | 1.0500 | 1.52 | 64.21 |
| S16 | infinite | 0.1250 | | |
| IMA | infinite | | | |

TABLE 10

| surface number | k | A4 | A6 | A8 | A10 | A12 | A14 | A16 |
|---|---|---|---|---|---|---|---|---|
| S3 | / | −3.7510E−05 | 5.9171E−07 | −4.6538E−08 | 1.0496E−09 | −1.2080E−11 | 2.7220E−14 | / |
| S4 | / | 4.2985E−05 | 3.4428E−07 | 2.6962E−09 | −5.5635E−10 | 2.0465E−11 | −2.3853E−13 | / |
| S13 | 100.0000 | −1.9210E−03 | −2.6859E−05 | 5.6963E−06 | −8.0102E−07 | 6.2995E−08 | −2.5115E−09 | 3.9842E−11 |
| S14 | −62.8703 | −1.2608E−03 | −4.8323E−05 | 8.9504E−06 | −9.1359E−07 | 5.5212E−08 | −1.7712E−09 | 2.3152E−11 |

Embodiment 6

Figure 6:
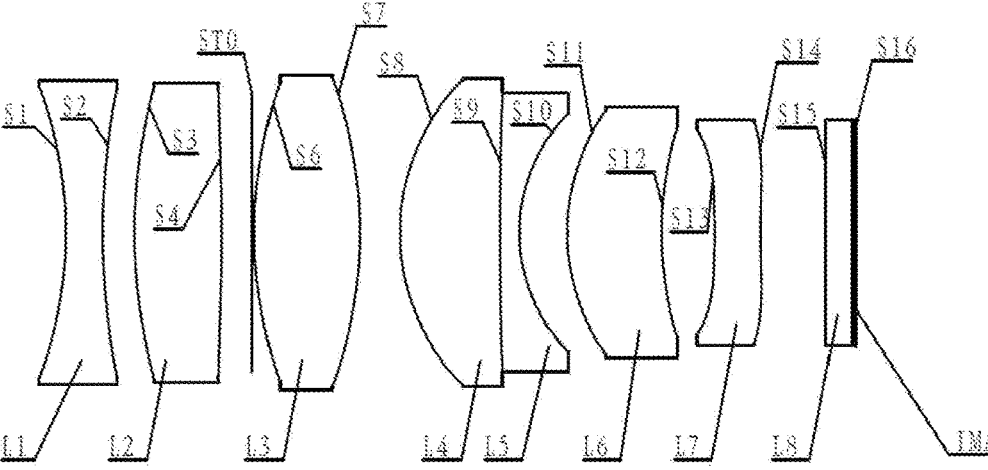
FIG. 6 is a schematic structural diagram of an optical lens assembly according to Embodiment 6 of the present disclosure.

An optical lens assembly according to Embodiment 6 of the present disclosure is described below with reference to FIG. 6. FIG. 6 is a schematic structural diagram of the optical lens assembly according to Embodiment 6 of the present disclosure.

As shown in FIG. 6, the optical lens assembly includes, sequentially along an optical axis from an object side to an image side, a first lens L1, a second lens L2, a third lens L3, a fourth lens L4, a fifth lens L5, a sixth lens L6 and a seventh lens L7.

The first lens L1 is a dual-concave lens having a negative refractive power, an object-side surface S1 of the first lens L1 is a concave surface, and an image-side surface S2 of the first lens L1 is a concave surface. The second lens L2 is a dual-convex lens having a positive refractive power, an object-side surface S3 of the second lens L2 is a convex surface, and an image-side surface S4 of the second lens L2 is a convex surface. The third lens L3 is a dual-convex lens having a positive refractive power, an object-side surface S6 of the third lens L3 is a convex surface, and an image-side surface S7 of the third lens L3 is a convex surface. The fourth lens L4 is a dual-convex lens having a positive refractive power, an object-side surface S8 of the fourth lens L4 is a convex surface, and an image-side surface S9 of the fourth lens L4 is a convex surface. The fifth lens L5 is a dual-concave lens having a negative refractive power, an object-side surface S9 of the fifth lens L5 is a concave surface, and an image-side surface S10 of the fifth lens L5 is a concave surface. The sixth lens L6 is a convex-concave lens having a positive refractive power, an object-side surface S11 of the sixth lens L6 is a convex surface, and an image-side surface S12 of the sixth lens L6 is a concave surface. The seventh lens L7 is a concave-convex lens having a negative refractive power, an object-side surface Alternatively, the optical lens assembly may further include an optical filter L8 having an object-side surface S15 and an image-side surface S16 and/or a protective glass L8'. The optical filter L8 may be used to correct color deviations, and the protective glass L8' may be used to protect an image sensing chip IMA at an image plane. Light from an object sequentially passes through the surfaces S1-S16 and finally forms an image on the image plane.

Table 11 shows a radius of curvature R, a thickness/distance d, a refractive index ND and an abbe number VD of each lens of the optical lens assembly in Embodiment 6. Table 12 shows the conic coefficients and the high-order coefficients applicable to the aspheric surfaces in Embodiment 6. Here, the surface type of each aspheric surface may be defined using the formula (1) given in Embodiment 1.

TABLE 11

| surface number | radius of curvature R (mm) | thickness/distance d (mm) | refractive index ND | abbe number VD |
|---|---|---|---|---|
| S1 | −15.1107 | 1.5000 | 1.63 | 35.71 |
| S2 | 46.3570 | 1.3874 | | |
| S3 | 22.6421 | 3.5000 | 1.67 | 32.20 |
| S4 | −35.2366 | 1.1558 | | |
| STO | infinite | 0.1000 | | |
| S6 | 16.6267 | 5.7519 | 1.44 | 95.10 |
| S7 | −17.5069 | 0.1000 | | |
| S8 | 9.6130 | 4.0000 | 1.62 | 47.10 |
| S9 | −20.3233 | 1.2951 | 1.70 | 30.05 |
| S10 | 5.8578 | 0.6775 | | |
| S11 | 8.7266 | 5.2150 | 1.68 | 55.50 |
| S12 | 12.2257 | 1.4002 | | |
| S13 | −49.0957 | 2.2000 | 1.99 | 16.50 |
| S14 | −150.0000 | 1.1480 | | |
| S15 | infinite | 1.0500 | 1.44 | 95.10 |
| S16 | infinite | 0.1250 | | |
| IMA | infinite | | | |

TABLE 12

| surface number | k | A4 | A6 | A8 | A10 | A12 | A14 | A16 |
|---|---|---|---|---|---|---|---|---|
| S3 | / | −5.1020E−05 | 7.5329E−07 | −4.2666E−08 | 1.5382E−09 | −2.4485E−11 | 1.4318E−13 | / |
| S4 | / | 3.5745E−05 | 4.1950E−07 | 3.4460E−09 | −3.6341E−10 | 1.5691E−11 | −1.9184E−13 | / |
| S13 | 99.0000 | −7.1476E−04 | −5.5994E−05 | 1.2995E−05 | −1.9445E−06 | 1.6857E−07 | −7.5975E−09 | 1.3956E−10 |
| S14 | −62.8703 | −3.7632E−04 | −1.2259E−04 | 2.0800E−05 | −2.2269E−06 | 1.3943E−07 | −4.6330E−09 | 6.1740E−11 |

S13 of the seventh lens L7 is a concave surface, and an image-side surface S14 of the seventh lens L7 is a convex surface. The fourth lens L4 and the fifth lens L5 can be cemented to form a cemented lens.

The optical lens assembly may further include a diaphragm STO, and the diaphragm STO may be disposed between the second lens L2 and the third lens L3 to improve the imaging quality. For example, the diaphragm STO may be disposed at a position near the object-side surface S6 of the third lens L3 between the second lens L2 and the third lens L3.

Embodiment 7

Figure 7:
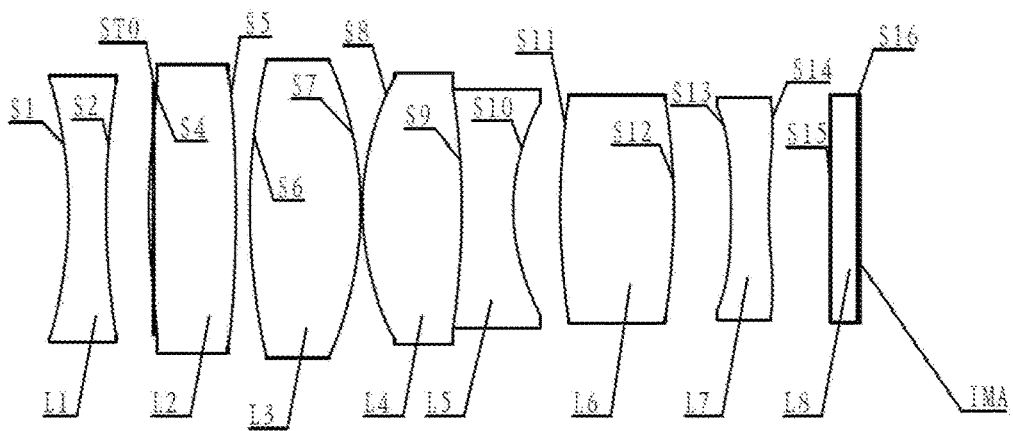
FIG. 7 is a schematic structural diagram of an optical lens assembly according to Embodiment 7 of the present disclosure.

An optical lens assembly according to Embodiment 7 of the present disclosure is described below with reference to FIG. 7. FIG. 7 is a schematic structural diagram of the optical lens assembly according to Embodiment 7 of the present disclosure.

As shown in FIG. 7, the optical lens assembly includes, sequentially along an optical axis from an object side to an image side, a first lens L1, a second lens L2, a third lens L3, a fourth lens L4, a fifth lens L5, a sixth lens L6 and a seventh lens L7.

The first lens L1 is a dual-concave lens having a negative refractive power, an object-side surface S1 of the first lens L1 is a concave surface, and an image-side surface S2 of the first lens L1 is a concave surface. The second lens L2 is a dual-convex lens having a positive refractive power, an object-side surface S3 of the second lens L2 is a convex surface, and an image-side surface S4 of the second lens L2 is a convex surface. The third lens L3 is a dual-convex lens having a positive refractive power, an object-side surface S6 of the third lens L3 is a convex surface, and an image-side surface S7 of the third lens L3 is a convex surface. The fourth lens L4 is a dual-convex lens having a positive refractive power, an object-side surface S8 of the fourth lens L4 is a convex surface, and an image-side surface S9 of the fourth lens L4 is a convex surface. The fifth lens L5 is a dual-concave lens having a negative refractive power, an object-side surface S9 of the fifth lens L5 is a concave surface, and an image-side surface S10 of the fifth lens L5 is a concave surface. The sixth lens L6 is a dual-convex lens having a positive refractive power, an object-side surface S11 of the sixth lens L6 is a convex surface, and an image-side surface S12 of the sixth lens L6 is a convex surface. The seventh lens L7 is a dual-concave having a negative refractive power, an object-side surface S13 of the

TABLE 13

| surface number | radius of curvature R (mm) | thickness/distance d (mm) | refractive index ND | abbe number VD |
|---|---|---|---|---|
| S1 | −17.8873 | 1.5000 | 1.63 | 35.71 |
| S2 | 31.4007 | 1.9000 | | |
| STO | infinite | −0.2000 | | |
| S4 | 26.4443 | 3.4437 | 1.69 | 31.08 |
| S5 | −61.4510 | 0.5675 | | |
| S6 | 26.9499 | 4.3896 | 1.60 | 65.55 |
| S7 | −14.5099 | 0.1000 | | |
| S8 | 11.2892 | 3.9410 | 1.50 | 81.59 |
| S9 | −32.3560 | 2.0422 | 1.69 | 31.16 |
| S10 | 8.8194 | 1.8673 | | |
| S11 | 30.0718 | 4.5099 | 1.74 | 44.90 |
| S12 | −27.8809 | 2.2839 | | |
| S13 | −45.4324 | 1.5000 | 1.69 | 31.08 |
| S14 | 16.6348 | 2.4404 | | |
| S15 | infinite | 1.0500 | 1.52 | 64.21 |
| S16 | infinite | 0.1250 | | |
| IMA | infinite | | | |

TABLE 14

| surface number | k | A4 | A6 | A8 | A10 | A12 | A14 | A16 |
|---|---|---|---|---|---|---|---|---|
| S4 | −0.0825 | −1.8105E−04 | −8.2560E−07 | −1.2030E−07 | 4.1156E−09 | −9.1497E−11 | 7.4049E−13 | / |
| S5 | −0.0170 | −2.9465E−05 | −2.2046E−07 | −8.1492E−08 | 2.7871E−09 | −5.3169E−11 | 4.3644E−13 | / |
| S13 | 99.0000 | −1.2704E−03 | −2.6943E−05 | 7.5046E−06 | −8.5132E−07 | 5.5618E−08 | −1.9359E−09 | 3.0544E−11 |
| S14 | −70.0000 | 2.6044E−04 | −1.9687E−04 | 2.3243E−05 | −1.8904E−06 | 9.5294E−08 | −2.7333E−09 | 3.5524E−11 | seventh lens L7 is a concave surface, and an image-side surface S14 of the seventh lens L7 is a concave surface. The fourth lens L4 and the fifth lens L5 can be cemented to form a cemented lens.

The optical lens assembly may further include a diaphragm STO, and the diaphragm STO may be disposed between the second lens L2 and the third lens L3 to improve the imaging quality. For example, the diaphragm STO may be disposed at a position near the object-side surface S6 of the third lens L3 between the second lens L2 and the third lens L3.

Alternatively, the optical lens assembly may further include an optical filter L8 having an object-side surface S15 and an image-side surface S16 and/or a protective glass L8'. The optical filter L8 may be used to correct color deviations, and the protective glass L8' may be used to protect an image sensing chip IMA at an image plane. Light from an object sequentially passes through the surfaces S1-S16 and finally forms an image on the image plane.

Table 13 shows a radius of curvature R, a thickness/distance d, a refractive index ND and an abbe number VD of each lens of the optical lens assembly in Embodiment 7. Table 14 shows the conic coefficients and the high-order coefficients applicable to the aspheric surfaces in Embodiment 7. Here, the surface type of each aspheric surface may be defined using the formula (1) given in Embodiment 1.

Embodiment 8

Figure 8:
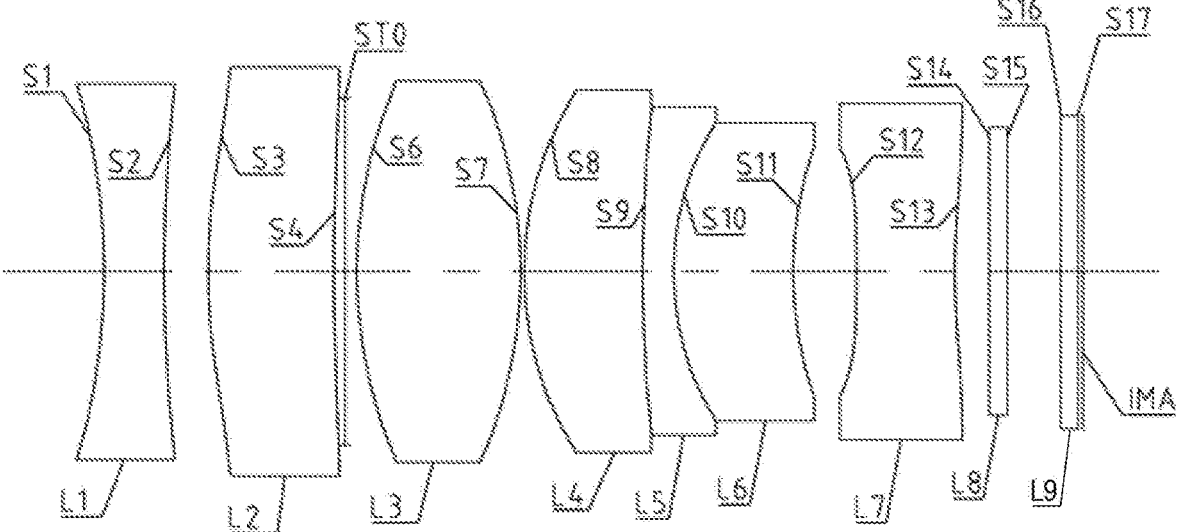
FIG. 8 is a schematic structural diagram of an optical lens assembly according to Embodiment 8 of the present disclosure.

An optical lens assembly according to Embodiment 8 of the present disclosure is described below with reference to FIG. 8. FIG. 8 is a schematic structural diagram of the optical lens assembly according to Embodiment 8 of the present disclosure.

As shown in FIG. 8, the optical lens assembly includes, sequentially along an optical axis from a first side to a second side, a first lens L1, a second lens L2, a third lens L3, a fourth lens L4, a fifth lens L5, a sixth lens L6 and a seventh lens L7.

The first lens L1 is a concave-concave lens having a negative refractive power, a first-side surface S1 of the first lens L1 is a concave surface, and a second-side surface S2 of the first lens L1 is a concave surface. The second lens L2 is a convex-concave lens having a positive refractive power, a first-side surface S3 of the second lens L2 is a convex surface, and a second-side surface S4 of the second lens L2 is a concave surface. The third lens L3 is a convex-convex lens having a positive refractive power, a first-side surface S6 of the third lens L3 is a convex surface, and a second-side surface S7 of the third lens L3 is a convex surface. The fourth lens L4 is a convex-concave lens having a positive refractive power, a first-side surface S8 of the fourth lens L4 is a convex surface, and a second-side surface S9 of the fourth lens L4 is a concave surface. The fifth lens L5 is a convex-concave lens having a negative refractive power, a first-side surface S9 of the fifth lens L5 is a convex surface, and a second-side surface S10 of the fifth lens L5 is a concave surface. The sixth lens L6 is a convex-concave lens having a positive refractive power, a first-side surface S10 of the sixth lens L6 is a convex surface, and a second-side surface S11 of the sixth lens L6 is a concave surface. The seventh lens L7 is a concave-concave lens having a negative refractive power, a first-side surface S12 of the seventh lens L7 is a concave surface, and a second-side surface S13 of the seventh lens L7 is a concave surface.

The optical lens assembly may further include a diaphragm STO, and the diaphragm STO may be disposed between the second lens L2 and the third lens L3 to increase emergent rays, thereby ensuring the light amount. For example, the diaphragm STO may be disposed at a position near the second-side surface S4 of the second lens L2 between the second lens L2 and the third lens L3.

Alternatively, the optical lens assembly may further include an optical filter L8 having a first-side surface S14 and a second-side surface S15, and the optical filter L8 may be used to correct color deviations. Alternatively, the optical lens assembly may further include a protective glass L9 having a first-side surface S16 and a second-side surface S17, and the protective glass L9 may be used to protect an image sensing chip IMA at an image plane and/or an image source plane. When the optical lens assembly is used for photography, light from an object sequentially passes through the surfaces S1-S17 and finally forms an image on the image plane. When the optical lens assembly is used for projection, light from the image source plane sequentially passes through the surfaces from S17 to S1 and is finally projected to a target object (not shown).

Table 15 shows a radius of curvature R, a thickness/distance d (it should be understood that the thickness/distance d in the row of S1 refers to the center thickness d1 of the first lens L1, the thickness/distance d in the row of S2 refers to the spacing distance d12 between the first lens L1 and the second lens L2, and so on), a refractive index N and an abbe number Vd of each lens of the optical lens assembly in Embodiment 8.

TABLE 15

| surface number | radius of curvature R (mm) | thickness/ distance d (mm) | refractive index N | abbe number Vd |
|---|---|---|---|---|
| S1 | −19.5627 | 1.7534 | 1.63 | 35.71 |
| S2 | 50.5661 | 1.3000 | | |
| S3 | 19.2849 | 3.6768 | 1.68 | 31.09 |
| S4 | 70.1367 | 0.3124 | | |
| STO | infinite | 0.3501 | | |
| S6 | 14.1410 | 4.8294 | 1.44 | 95.10 |
| S7 | −14.1410 | 0.1000 | | |
| S8 | 10.3861 | 3.4683 | 1.59 | 61.25 |
| S9 | 44.4133 | 0.9000 | 1.69 | 31.16 |
| S10 | 8.5607 | 3.5122 | 1.69 | 53.35 |
| S11 | 11.4416 | 1.8560 | | |
| S12 | −91.6396 | 2.8916 | 1.68 | 31.09 |
| S13 | 18.1821 | 1.0000 | | |
| S14 | infinite | 0.5500 | 1.52 | 64.21 |
| S15 | infinite | 1.5749 | | |
| S16 | infinite | 0.5000 | 1.52 | 64.21 |
| S17 | infinite | 0.1250 | | |
| IMA | infinite | | | |

In Embodiment 8, the first-side surface S3 and the second-side surface S4 of the second lens L2 and the first-side surface S12 and the second-side surface S13 of the seventh lens L7 may be aspheric surfaces. The surface type of each aspheric lens may be defined using the formula (1) given in Embodiment 1.

Table 16 below gives the conic coefficients k and the high-order coefficients A4, A6, A8, A10, A12, A14 and A16 applicable to the aspheric surfaces S3, S4, S12 and S13 in Embodiment 8.

TABLE 16

| surface number | k | A4 | A6 | A8 | A10 | A12 | A14 | A16 |
|---|---|---|---|---|---|---|---|---|
| S3 | −1.9883 | −7.8123E−05 | −4.2778E−06 | −1.7038E−10 | 1.8096E−09 | −8.7209E−12 | −2.8868E−12 | 5.7061E−14 |
| S4 | −126.1065 | 5.1660E−05 | −4.4125E−06 | 5.7603E−08 | −1.4782E−09 | 9.8617E−11 | −2.6412E−12 | 2.0821E−14 |
| S12 | 111.7484 | −2.1236E−03 | 4.6351E−06 | −2.6601E−06 | 1.7262E−07 | 2.3326E−09 | −4.2426E−10 | 7.1339E−12 |
| S13 | 0.4386 | −1.1904E−03 | −9.9344E−06 | 4.8754E−06 | −4.7095E−07 | 2.4134E−08 | −5.2654E−10 | 2.7616E−12 |

Embodiment 9

Figure 9:
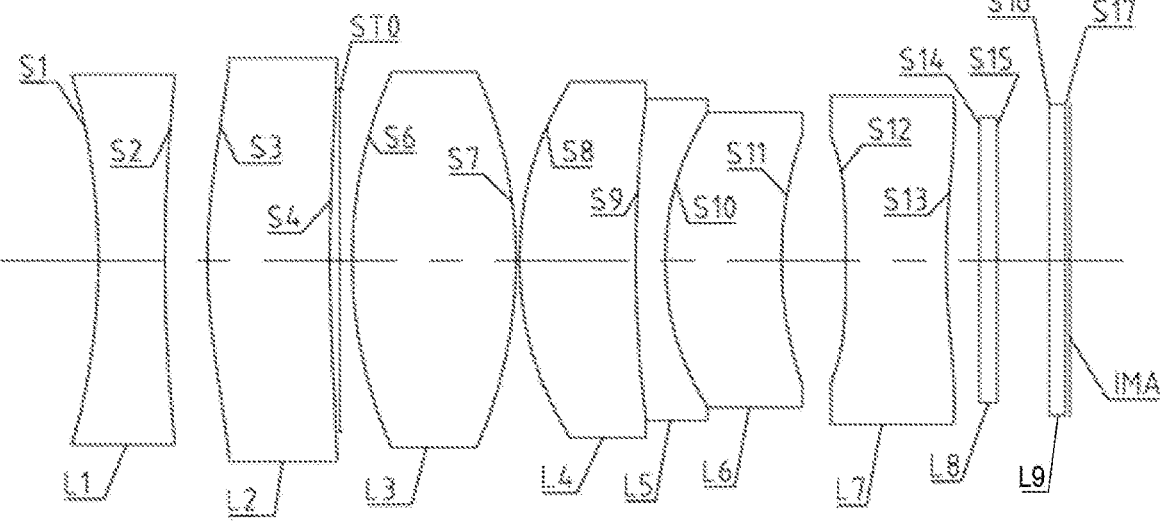
FIG. 9 is a schematic structural diagram of an optical lens assembly according to Embodiment 9 of the present disclosure.

An optical lens assembly according to Embodiment 9 of the present disclosure is described below with reference to FIG. 9. In this embodiment and the following embodiments, for the sake of brevity, some descriptions similar to those in Embodiment 1 will be omitted. FIG. 9 is a schematic structural diagram of the optical lens assembly according to Embodiment 9 of the present disclosure.

As shown in FIG. 9, the optical lens assembly includes, sequentially along an optical axis from a first side to a second side, a first lens L1, a second lens L2, a third lens L3, a fourth lens L4, a fifth lens L5, a sixth lens L6 and a seventh lens L7.

The first lens L1 is a concave-concave lens having a negative refractive power, a first-side surface S1 of the first lens L1 is a concave surface, and a second-side surface S2 of the first lens L1 is a concave surface. The second lens L2 is a convex-concave lens having a positive refractive power, a first-side surface S3 of the second lens L2 is a convex surface, and a second-side surface S4 of the second lens L2 is a concave surface. The third lens L3 is a convex-convex lens having a positive refractive power, a first-side surface S6 of the third lens L3 is a convex surface, and a second-side surface S7 of the third lens L3 is a convex surface. The fourth lens L4 is a convex-concave lens having a positive refractive power, a first-side surface S8 of the fourth lens L4 is a convex surface, and a second-side surface S9 of the fourth lens L4 is a concave surface. The fifth lens L5 is a convex-concave lens having a negative refractive power, a first-side surface S9 of the fifth lens L5 is a convex surface, and a second-side surface S10 of the fifth lens L5 is a concave surface. The sixth lens L6 is a convex-concave lens having a positive refractive power, a first-side surface S10 of the sixth lens L6 is a convex surface, and a second-side photography, light from an object sequentially passes through the surfaces S1-S17 and finally forms an image on the image plane. When the optical lens assembly is used for projection, light from the image source plane sequentially passes through the surfaces from S17 to S1 and is finally projected to a target object (not shown).

Table 17 shows a radius of curvature R, a thickness/distance d, a refractive index N and an abbe number Vd of each lens of the optical lens assembly in Embodiment 9. Table 18 shows the conic coefficients and the high-order coefficients applicable to the aspheric surfaces in Embodiment 9. Here, the surface type of each aspheric surface may be defined using the formula (1) given in Embodiment 1.

TABLE 17

| surface number | radius of curvature R (mm) | thickness/ distance d (mm) | refractive index N | abbe number Vd |
|---|---|---|---|---|
| S1 | −19.6921 | 1.9977 | 1.63 | 35.71 |
| S2 | 50.7814 | 1.3000 | | |
| S3 | 19.3855 | 3.6768 | 1.68 | 31.09 |
| S4 | 58.8695 | 0.3124 | | |
| STO | infinite | 0.3501 | | |
| S6 | 14.2056 | 4.9617 | 1.44 | 95.10 |
| S7 | −14.2056 | 0.1000 | | |
| S8 | 10.3555 | 3.4962 | 1.59 | 61.25 |
| S9 | 36.5383 | 0.9000 | 1.69 | 31.16 |
| S10 | 8.5607 | 3.5122 | 1.69 | 53.35 |
| S11 | 11.6616 | 1.9201 | | |
| S12 | −115.0595 | 3.0478 | 1.68 | 31.09 |
| S13 | 18.1402 | 1.0000 | | |
| S14 | infinite | 0.5500 | 1.52 | 64.21 |
| S15 | infinite | 1.5534 | | |
| S16 | infinite | 0.5000 | 1.52 | 64.21 |
| S17 | infinite | 0.1250 | | |
| IMA | infinite | | | |

TABLE 18

| surface number | k | A4 | A6 | A8 | A10 | A12 | A14 | A16 |
|---|---|---|---|---|---|---|---|---|
| S3 | −2.1907 | −8.0339E−05 | −4.2526E−06 | 1.1678E−09 | 1.8612E−09 | −7.1812E−12 | −2.7891E−12 | 6.1277E−14 |
| S4 | −114.2484 | 5.3348E−05 | −4.3750E−06 | 5.9617E−08 | −1.3891E−09 | 1.0210E−10 | −2.5134E−12 | 2.5355E−14 |
| S12 | 111.7484 | −1.9511E−03 | 1.1417E−05 | −2.7185E−06 | 1.4740E−07 | 9.2394E−10 | −4.5250E−10 | 1.1557E−11 |
| S13 | 3.8345 | −1.1148E−03 | −9.1450E−06 | 4.8271E−06 | −4.7667E−07 | 2.3900E−08 | −5.2999E−10 | 2.9502E−12 | surface S11 of the sixth lens L6 is a concave surface. The seventh lens L7 is a concave-concave having a negative refractive power, a first-side surface S12 of the seventh lens L7 is a concave surface, and a second-side surface S13 of the seventh lens L7 is a concave surface.

The optical lens assembly may further include a diaphragm STO, and the diaphragm STO may be disposed between the second lens L2 and the third lens L3 to increase emergent rays, thereby ensuring the light amount. For example, the diaphragm STO may be disposed at a position near the second-side surface S4 of the second lens L2 between the second lens L2 and the third lens L3.

Alternatively, the optical lens assembly may further include an optical filter L8 having a first-side surface S14 and a second-side surface S15, and the optical filter L8 may be used to correct color deviations. Alternatively, the optical lens assembly may further include a protective glass L9 having a first-side surface S16 and a second-side surface S17, and the protective glass L9 may be used to protect an image sensing chip IMA at an image plane and/or an image source plane. When the optical lens assembly is used for

Embodiment 10

Figures 10, 11, 12:
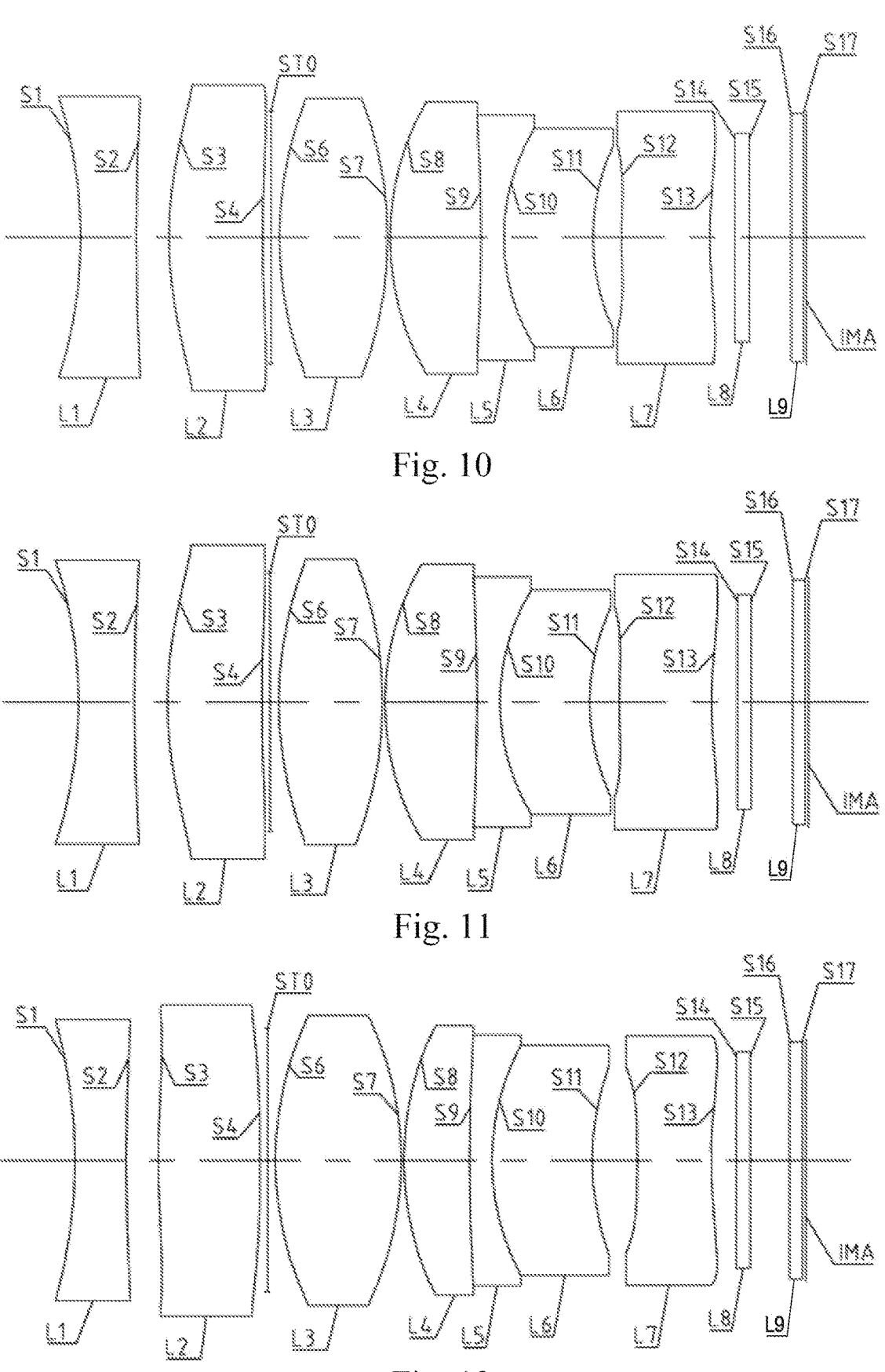
FIG. 10 is a schematic structural diagram of an optical lens assembly according to Embodiment 10 of the present disclosure.
FIG. 11 is a schematic structural diagram of an optical lens assembly according to Embodiment 11 of the present disclosure.
FIG. 12 is a schematic structural diagram of an optical lens assembly according to Embodiment 12 of the present disclosure.

An optical lens assembly according to Embodiment 10 of the present disclosure is described below with reference to FIG. 10. FIG. 10 is a schematic structural diagram of the optical lens assembly according to Embodiment 10 of the present disclosure.

As shown in FIG. 10, the optical lens assembly includes, sequentially along an optical axis from a first side to a second side, a first lens L1, a second lens L2, a third lens L3, a fourth lens L4, a fifth lens L5, a sixth lens L6 and a seventh lens L7.

The first lens L1 is a concave-concave lens having a negative refractive power, a first-side surface S1 of the first lens L1 is a concave surface, and a second-side surface S2 of the first lens L1 is a concave surface. The second lens L2 is a convex-concave lens having a positive refractive power, a first-side surface S3 of the second lens L2 is a convex surface, and a second-side surface S4 of the second lens L2 is a concave surface. The third lens L3 is a convex-convex lens having a positive refractive power, a first-side surface S6 of the third lens L3 is a convex surface, and a second-side surface S7 of the third lens L3 is a convex surface. The fourth lens L4 is a convex-convex lens having a positive refractive power, a first-side surface S8 of the fourth lens L4 is a convex surface, and a second-side surface S9 of the fourth lens L4 is a convex surface. The fifth lens L5 is a concave-concave lens having a negative refractive power, a first-side surface S9 of the fifth lens L5 is a concave surface, and a second-side surface S10 of the fifth lens L5 is a concave surface. The sixth lens L6 is a convex-concave lens having a positive refractive power, a first-side surface S10 of the sixth lens L6 is a convex surface, and a second-side surface S11 of the sixth lens L6 is a concave surface. The seventh lens L7 is a convex-concave lens having a negative refractive power, a first-side surface S12 of the seventh lens L7 is a convex surface, and a second-side surface S13 of the seventh lens L7 is a concave surface.

The optical lens assembly may further include a diaphragm STO, and the diaphragm STO may be disposed between the second lens L2 and the third lens L3 to increase emergent rays, thereby ensuring the light amount. For example, the diaphragm STO may be disposed at a position near the second-side surface S4 of the second lens L2 between the second lens L2 and the third lens L3.

Alternatively, the optical lens assembly may further include an optical filter L8 having a first-side surface S14 and a second-side surface S15, and the optical filter L8 may be used to correct color deviations. Alternatively, the optical lens assembly may further include a protective glass L9 having a first-side surface S16 and a second-side surface S17, and the protective glass L9 may be used to protect an image sensing chip IMA at an image plane and/or an image source plane. When the optical lens assembly is used for photography, light from an object sequentially passes through the surfaces S1-S17 and finally forms an image on the image plane. When the optical lens assembly is used for projection, light from the image source plane sequentially passes through the surfaces from S17 to S1 and is finally projected to a target object (not shown).

Table 19 shows a radius of curvature R, a thickness/distance d, a refractive index N and an abbe number Vd of each lens of the optical lens assembly in Embodiment 10. Table 20 shows the conic coefficients and the high-order coefficients applicable to the aspheric surfaces in Embodiment 10. Here, the surface type of each aspheric surface may be defined using the formula (1) given in Embodiment 1.

TABLE 19

| surface number | radius of curvature R (mm) | thickness/ distance d (mm) | refractive index N | abbe number Vd |
| --- | --- | --- | --- | --- |
| S1 | −18.2122 | 2.1900 | 1.63 | 35.71 |
| S2 | 91.5896 | 1.3000 | | |
| S3 | 15.9609 | 3.6768 | 1.68 | 31.09 |
| S4 | 82.1044 | 0.3124 | | |

TABLE 19-continued

| surface number | radius of curvature R (mm) | thickness/ distance d (mm) | refractive index N | abbe number Vd |
| --- | --- | --- | --- | --- |
| STO | infinite | 0.3501 | | |
| S6 | 15.3499 | 4.2661 | 1.44 | 95.10 |
| S7 | −15.3499 | 0.1000 | | |
| S8 | 11.0263 | 3.5722 | 1.59 | 61.25 |
| S9 | −74.0451 | 0.9000 | 1.69 | 31.16 |
| S10 | 8.5607 | 3.5122 | 1.69 | 53.35 |
| S11 | 8.7445 | 1.1390 | | |
| S12 | 42.8310 | 3.4567 | 1.68 | 31.09 |
| S13 | 19.5997 | 1.0000 | | |
| S14 | infinite | 0.5500 | 1.52 | 64.21 |
| S15 | infinite | 1.6433 | | |
| S16 | infinite | 0.5000 | 1.52 | 64.21 |
| S17 | infinite | 0.1250 | | |
| IMA | infinite | | | |

TABLE 20

| surface number | k | A4 | A6 | A8 | A10 | A12 | A14 | A16 |
| --- | --- | --- | --- | --- | --- | --- | --- | --- |
| S3 | −1.2503 | −5.2305E−05 | −3.6383E−06 | 1.0506E−08 | 1.1058E−09 | −1.7647E−11 | −1.8172E−12 | 4.2628E−14 |
| S4 | −19.4584 | 6.0849E−05 | −5.0579E−06 | 1.0785E−07 | −1.1556E−09 | 2.8820E−11 | −5.5564E−12 | 9.5713E−14 |
| S12 | 111.7484 | −1.7463E−03 | −2.3651E−06 | −4.7823E−06 | 1.9787E−07 | 4.8069E−09 | −9.0659E−10 | 2.0359E−11 |
| S13 | 8.7661 | −8.1164E−04 | −5.0789E−05 | 6.4219E−06 | −5.2170E−07 | 2.2554E−08 | −4.0630E−10 | 1.2723E−12 |

Embodiment 11

An optical lens assembly according to Embodiment 11 of the present disclosure is described below with reference to FIG. 11. FIG. 11 is a schematic structural diagram of the optical lens assembly according to Embodiment 11 of the present disclosure.

As shown in FIG. 11, the optical lens assembly includes, sequentially along an optical axis from a first side to a second side, a first lens L1, a second lens L2, a third lens L3, a fourth lens L4, a fifth lens L5, a sixth lens L6 and a seventh lens L7.

The first lens L1 is a concave-concave lens having a negative refractive power, a first-side surface S1 of the first lens L1 is a concave surface, and a second-side surface S2 of the first lens L1 is a concave surface. The second lens L2 is a convex-concave lens having a positive refractive power, a first-side surface S3 of the second lens L2 is a convex surface, and a second-side surface S4 of the second lens L2 is a concave surface. The third lens L3 is a convex-convex lens having a positive refractive power, a first-side surface S6 of the third lens L3 is a convex surface, and a second-side surface S7 of the third lens L3 is a convex surface. The fourth lens L4 is a convex-convex lens having a positive refractive power, a first-side surface S8 of the fourth lens L4 is a convex surface, and a second-side surface S9 of the fourth lens L4 is a convex surface. The fifth lens L5 is a concave-concave lens having a negative refractive power, a first-side surface S9 of the fifth lens L5 is a concave surface, and a second-side surface S10 of the fifth lens L5 is a concave surface. The sixth lens L6 is a convex-concave lens having a positive refractive power, a first-side surface S10 of the sixth lens L6 is a convex surface, and a second-side surface S11 of the sixth lens L6 is a concave surface. The seventh lens L7 is a convex-concave lens having a negative refractive power, a first-side surface S12 of the seventh lens L7 is a convex surface, and a second-side surface S13 of the seventh lens L7 is a concave surface.

The optical lens assembly may further include a diaphragm STO, and the diaphragm STO may be disposed between the second lens L2 and the third lens L3 to increase emergent rays, thereby ensuring the light amount. For example, the diaphragm STO may be disposed at a position near the second-side surface S4 of the second lens L2 between the second lens L2 and the third lens L3.

Alternatively, the optical lens assembly may further include an optical filter L8 having a first-side surface S14 and a second-side surface S15, and the optical filter L8 may be used to correct color deviations. Alternatively, the optical lens assembly may further include a protective glass L9 having a first-side surface S16 and a second-side surface S17, and the protective glass L9 may be used to protect an image sensing chip IMA at an image plane and/or an image source plane. When the optical lens assembly is used for photography, light from an object sequentially passes through the surfaces S1-S17 and finally forms an image on the image plane. When the optical lens assembly is used for projection, light from the image source plane sequentially passes through the surfaces from S17 to S1 and is finally projected to a target object (not shown).

Table 21 shows a radius of curvature R, a thickness/distance d, a refractive index N and an abbe number Vd of each lens of the optical lens assembly in Embodiment 11. Table 22 shows the conic coefficients and the high-order coefficients applicable to the aspheric surfaces in Embodiment 11. Here, the surface type of each aspheric surface may be defined using the formula (1) given in Embodiment 1.

TABLE 21

| surface number | radius of curvature R (mm) | thickness/ distance d (mm) | refractive index N | abbe number Vd |
|---|---|---|---|---|
| S1 | −17.5430 | 2.1900 | 1.63 | 35.71 |
| S2 | 88.2265 | 1.3000 | | |
| S3 | 15.9139 | 3.6768 | 1.68 | 31.09 |
| S4 | 83.5400 | 0.3124 | | |
| STO | infinite | 0.3501 | | |
| S6 | 15.3266 | 4.0659 | 1.44 | 95.10 |
| S7 | −15.3266 | 0.1000 | | |
| S8 | 10.9973 | 3.5900 | 1.59 | 61.25 |
| S9 | −80.4208 | 0.9000 | 1.69 | 31.16 |
| S10 | 8.5607 | 3.5122 | 1.69 | 53.35 |
| S11 | 8.8341 | 1.1668 | | |
| S12 | 42.5869 | 3.5939 | 1.68 | 31.09 |
| S13 | 18.7052 | 1.0000 | | |
| S14 | infinite | 0.5500 | 1.52 | 64.21 |
| S15 | infinite | 1.6211 | | |
| S16 | infinite | 0.5000 | 1.52 | 64.21 |
| S17 | infinite | 0.1250 | | |
| IMA | infinite | | | |

Embodiment 12

An optical lens assembly according to Embodiment 12 of the present disclosure is described below with reference to FIG. 12. FIG. 12 is a schematic structural diagram of the optical lens assembly according to Embodiment 12 of the present disclosure.

As shown in FIG. 12, the optical lens assembly includes, sequentially along an optical axis from a first side to a second side, a first lens L1, a second lens L2, a third lens L3, a fourth lens L4, a fifth lens L5, a sixth lens L6 and a seventh lens L7.

The first lens L1 is a concave-concave lens having a negative refractive power, a first-side surface S1 of the first lens L1 is a concave surface, and a second-side surface S2 of the first lens L1 is a concave surface. The second lens L2 is a convex-convex lens having a positive refractive power, a first-side surface S3 of the second lens L2 is a convex surface, and a second-side surface S4 of the second lens L2 is a convex surface. The third lens L3 is a convex-convex lens having a positive refractive power, a first-side surface S6 of the third lens L3 is a convex surface, and a second-side surface S7 of the third lens L3 is a convex surface. The fourth lens L4 is a convex-concave lens having a positive refractive power, a first-side surface S8 of the fourth lens L4 is a convex surface, and a second-side surface S9 of the fourth lens L4 is a concave surface. The fifth lens L5 is a convex-concave lens having a negative refractive power, a first-side surface S9 of the fifth lens L5 is a convex surface, and a second-side surface S10 of the fifth lens L5 is a concave surface. The sixth lens L6 is a convex-concave lens having a positive refractive power, a first-side surface S10 of the sixth lens L6 is a convex surface, and a second-side surface S11 of the sixth lens L6 is a concave surface. The seventh lens L7 is a concave-concave lens having a negative refractive power, a first-side surface S12 of the seventh lens L7 is a concave surface, and a second-side surface S13 of the seventh lens L7 is a concave surface.

The optical lens assembly may further include a diaphragm STO, and the diaphragm STO may be disposed between the second lens L2 and the third lens L3 to increase emergent rays, thereby ensuring the light amount. For example, the diaphragm STO may be disposed at a position near the middle between the second lens L2 and the third lens L3.

Alternatively, the optical lens assembly may further include an optical filter L8 having a first-side surface S14 and a second-side surface S15, and the optical filter L8 may be used to correct color deviations. Alternatively, the optical lens assembly may further include a protective glass L9 having a first-side surface S16 and a second-side surface S17, and the protective glass L9 may be used to protect an image sensing chip IMA at an image plane and/or an image source plane. When the optical lens assembly is used for photography, light from an object sequentially passes through the surfaces S1-S17 and finally forms an image on the image plane. When the optical lens assembly is used for

TABLE 22

| surface number | k | A4 | A6 | A8 | A10 | A12 | A14 | A16 |
|---|---|---|---|---|---|---|---|---|
| S3 | −1.1813 | −5.0216E−05 | −3.5999E−06 | 1.1111E−08 | 1.1125E−09 | −1.7696E−11 | −1.8265E−12 | 4.1969E−14 |
| S4 | −25.0730 | 5.9839E−05 | −5.0378E−06 | 1.0997E−07 | −1.0455E−09 | 3.3510E−11 | −5.3830E−12 | 1.0101E−13 |
| S12 | 111.7484 | −1.7139E−03 | −1.4895E−06 | −4.7634E−06 | 1.9798E−07 | 4.7660E−09 | −9.1351E−10 | 1.9392E−11 |
| S13 | 8.8839 | −8.0227E−04 | −5.0540E−05 | 6.4224E−06 | −5.2212E−07 | 2.2518E−08 | −4.0837E−10 | 1.1992E−12 | projection, light from the image source plane sequentially passes through the surfaces from S17 to S1 and is finally projected to a target object (not shown).

Table 23 shows a radius of curvature R, a thickness/distance d, a refractive index N and an abbe number Vd of each lens of the optical lens assembly in Embodiment 12. Table 24 shows the conic coefficients and the high-order coefficients applicable to the aspheric surfaces in Embodiment 12. Here, the surface type of each aspheric surface may be defined using the formula (1) given in Embodiment 1.

TABLE 23

| surface number | radius of curvature R (mm) | thickness/ distance d (mm) | refractive index N | abbe number Vd |
|---|---|---|---|---|
| S1 | −21.0378 | 2.0356 | 1.63 | 35.71 |
| S2 | 90.3590 | 1.3000 | | |
| S3 | 39.6428 | 4.0336 | 1.68 | 31.09 |
| S4 | −81.6552 | 0.3124 | | |
| STO | infinite | 0.3030 | | |
| S6 | 13.3886 | 5.0337 | 1.44 | 95.10 |
| S7 | −13.3886 | 0.1000 | | |
| S8 | 12.1937 | 2.5963 | 1.59 | 61.25 |
| S9 | 72.4279 | 0.9000 | 1.69 | 31.16 |
| S10 | 9.7320 | 4.0157 | 1.69 | 53.35 |
| S11 | 10.9907 | 1.7947 | | |
| S12 | −96.0347 | 2.9347 | 1.68 | 31.09 |
| S13 | 18.6062 | 1.0000 | | |
| S14 | infinite | 0.5500 | 1.52 | 64.21 |
| S15 | infinite | 1.5990 | | |
| S16 | infinite | 0.5000 | 1.52 | 64.21 |
| S17 | infinite | 0.1250 | | |
| IMA | infinite | | | | refractive power, a first-side surface S8 of the fourth lens L4 is a convex surface, and a second-side surface S9 of the fourth lens L4 is a concave surface. The fifth lens L5 is a convex-concave lens having a negative refractive power, a first-side surface S9 of the fifth lens L5 is a convex surface, and a second-side surface S10 of the fifth lens L5 is a concave surface. The sixth lens L6 is a convex-concave lens having a positive refractive power, a first-side surface S10 of the sixth lens L6 is a convex surface, and a second-side surface S11 of the sixth lens L6 is a concave surface. The seventh lens L7 is a concave-concave lens having a negative refractive power, a first-side surface S12 of the seventh lens L7 is a concave surface, and a second-side surface S13 of the seventh lens L7 is a concave surface.

The optical lens assembly may further include a diaphragm STO, and the diaphragm STO may be disposed between the second lens L2 and the third lens L3 to increase emergent rays, thereby ensuring the light amount. For example, the diaphragm STO may be disposed at a position near the middle between the second lens L2 and the third lens L3.

Alternatively, the optical lens assembly may further include an optical filter L8 having a first-side surface S14 and a second-side surface S15, and the optical filter L8 may be used to correct color deviations. Alternatively, the optical lens assembly may further include a protective glass L9 having a first-side surface S16 and a second-side surface S17, and the protective glass L9 may be used to protect an image sensing chip IMA at an image plane and/or an image source plane. When the optical lens assembly is used for photography, light from an object sequentially passes through the surfaces S1-S17 and finally forms an image on

TABLE 24

| surface number | k | A4 | A6 | A8 | A10 | A12 | A14 | A16 |
|---|---|---|---|---|---|---|---|---|
| S3 | −2.14E+01 | −1.4330E−04 | −6.2796E−06 | 9.1669E−08 | −2.5156E−11 | −6.3307E−11 | 6.2426E−13 | 3.6010E−14 |
| S4 | 90.3151 | −4.0975E−05 | −3.5927E−06 | 1.3933E−07 | −2.9167E−09 | 4.8797E−11 | −8.5504E−13 | 2.4389E−14 |
| S12 | 90.6595 | −1.9270E−03 | 2.9788E−05 | −6.1005E−06 | 3.0942E−07 | 9.8562E−09 | −1.4336E−09 | 2.8091E−11 |
| S13 | 9.4064 | −1.1456E−03 | −1.7175E−05 | 5.2293E−06 | −5.1668E−07 | 2.5392E−08 | −4.9374E−10 | −6.3824E−13 |

Embodiment 13

Figure 13:
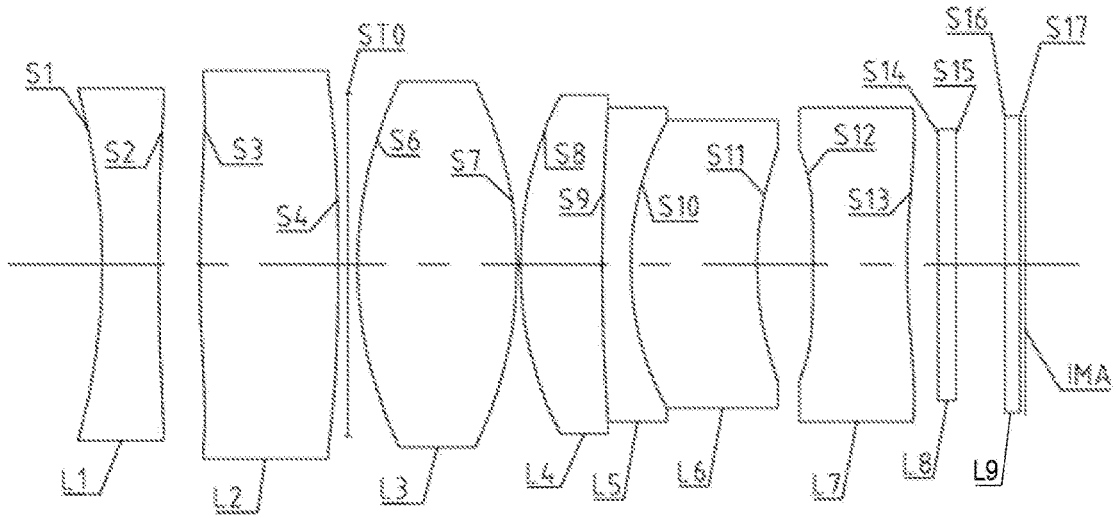
FIG. 13 is a schematic structural diagram of an optical lens assembly according to Embodiment 13 of the present disclosure.

An optical lens assembly according to Embodiment 13 of the present disclosure is described below with reference to FIG. 13. FIG. 13 is a schematic structural diagram of the optical lens assembly according to Embodiment 13 of the present disclosure.

As shown in FIG. 13, the optical lens assembly includes, sequentially along an optical axis from a first side to a second side, a first lens L1, a second lens L2, a third lens L3, a fourth lens L4, a fifth lens L5, a sixth lens L6 and a seventh lens L7.

The first lens L1 is a concave-concave lens having a negative refractive power, a first-side surface S1 of the first lens L1 is a concave surface, and a second-side surface S2 of the first lens L1 is a concave surface. The second lens L2 is a convex-convex lens having a positive refractive power, a first-side surface S3 of the second lens L2 is a convex surface, and a second-side surface S4 of the second lens L2 is a convex surface. The third lens L3 is a convex-convex lens having a positive refractive power, a first-side surface S6 of the third lens L3 is a convex surface, and a second-side surface S7 of the third lens L3 is a convex surface. The fourth lens L4 is a convex-concave lens having a positive the image plane. When the optical lens assembly is used for projection, light from the image source plane sequentially passes through the surfaces from S17 to S1 and is finally projected to a target object (not shown).

Table 25 shows a radius of curvature R, a thickness/distance d, a refractive index N and an abbe number Vd of each lens of the optical lens assembly in Embodiment 13. Table 26 shows the conic coefficients and the high-order coefficients applicable to the aspheric surfaces in Embodiment 13. Here, the surface type of each aspheric surface may be defined using the formula (1) given in Embodiment 1.

TABLE 25

| surface number | radius of curvature R (mm) | thickness/ distance d (mm) | refractive index N | abbe number Vd |
|---|---|---|---|---|
| S1 | −20.9581 | 1.7881 | 1.63 | 35.71 |
| S2 | 92.2112 | 1.3000 | | |
| S3 | 40.2022 | 4.3666 | 1.68 | 31.09 |
| S4 | −82.3384 | 0.3124 | | |
| STO | infinite | 0.3030 | | |
| S6 | 13.4062 | 5.0580 | 1.44 | 95.10 |
| S7 | −13.4062 | 0.1000 | | |
| S8 | 12.2341 | 2.5808 | 1.59 | 61.25 |

TABLE 25-continued

| surface number | radius of curvature R (mm) | thickness/ distance d (mm) | refractive index N | abbe number Vd |
|---|---|---|---|---|
| S9 | 72.4279 | 0.9000 | 1.69 | 31.16 |
| S10 | 9.7957 | 4.0023 | 1.69 | 53.35 |
| S11 | 10.8460 | 1.7836 | | |
| S12 | −90.0012 | 2.9486 | 1.68 | 31.09 |
| S13 | 18.3105 | 1.0000 | | |
| S14 | infinite | 0.5500 | 1.52 | 64.21 |
| S15 | infinite | 1.5584 | | |
| S16 | infinite | 0.5000 | 1.52 | 64.21 |
| S17 | infinite | 0.1250 | | |
| IMA | infinite | | | | emergent rays, thereby ensuring the light amount. For example, the diaphragm STO may be disposed at a position near the middle between the second lens L2 and the third lens L3.

Alternatively, the optical lens assembly may further include an optical filter L8 having a first-side surface S14 and a second-side surface S15, and the optical filter L8 may be used to correct color deviations. Alternatively, the optical lens assembly may further include a protective glass L9 having a first-side surface S16 and a second-side surface S17, and the protective glass L9 may be used to protect an image sensing chip IMA at an image plane and/or an image source plane. When the optical lens assembly is used for photography, light from an object sequentially passes through the surfaces S1-S17 and finally forms an image on

TABLE 26

| surface number | k | A4 | A6 | A8 | A10 | A12 | A14 | A16 |
|---|---|---|---|---|---|---|---|---|
| S3 | −5.7771 | −1.2627E−04 | −6.5743E−06 | 8.4729E−08 | 1.0802E−10 | −5.2545E−11 | 7.7215E−13 | 1.7635E−14 |
| S4 | 143.0531 | −4.3451E−05 | −2.8959E−06 | 1.5907E−07 | −2.5967E−09 | 4.9007E−11 | −1.1080E−12 | 9.3629E−15 |
| S12 | 111.7484 | −1.7822E−03 | 1.9339E−05 | −6.3505E−06 | 3.1841E−07 | 1.1122E−08 | −1.3752E−09 | 2.5376E−11 |
| S13 | 8.9881 | −1.2525E−03 | −1.0655E−05 | 5.0871E−06 | −5.3065E−07 | 2.4910E−08 | −4.8680E−10 | 2.1057E−12 |

Embodiment 14

Figure 14:
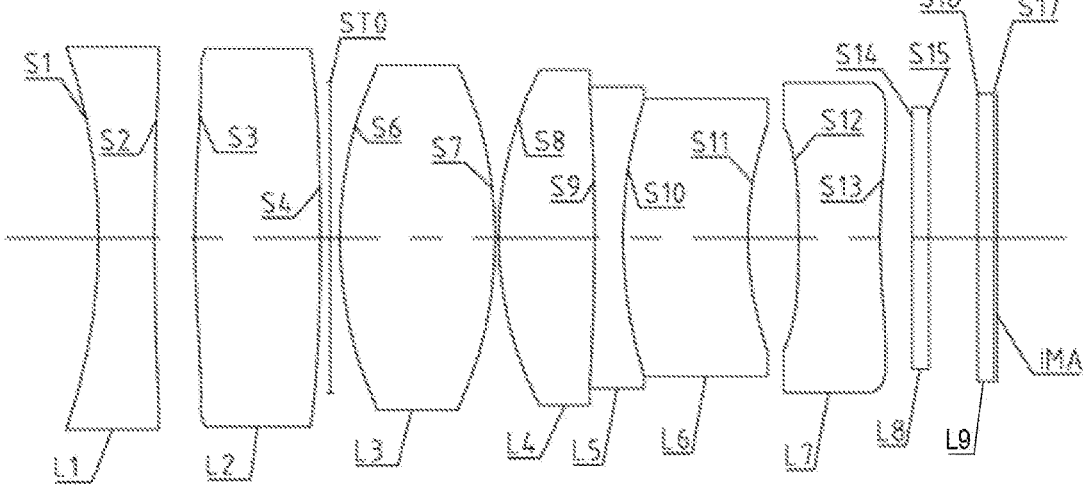
FIG. 14 is a schematic structural diagram of an optical lens assembly according to Embodiment 14 of the present disclosure.

An optical lens assembly according to Embodiment 14 of the present disclosure is described below with reference to FIG. 14. FIG. 14 is a schematic structural diagram of the optical lens assembly according to Embodiment 14 of the present disclosure.

As shown in FIG. 14, the optical lens assembly includes, sequentially along an optical axis from a first side to a second side, a first lens L1, a second lens L2, a third lens L3, a fourth lens L4, a fifth lens L5, a sixth lens L6 and a seventh lens L7.

The first lens L1 is a concave-concave lens having a negative refractive power, a first-side surface S1 of the first lens L1 is a concave surface, and a second-side surface S2 of the first lens L1 is a concave surface. The second lens L2 is a convex-convex lens having a positive refractive power, a first-side surface S3 of the second lens L2 is a convex surface, and a second-side surface S4 of the second lens L2 is a convex surface. The third lens L3 is a convex-convex lens having a positive refractive power, a first-side surface S6 of the third lens L3 is a convex surface, and a second-side surface S7 of the third lens L3 is a convex surface. The fourth lens L4 is a convex-convex lens having a positive refractive power, a first-side surface S8 of the fourth lens L4 is a convex surface, and a second-side surface S9 of the fourth lens L4 is a convex surface. The fifth lens L5 is a concave-concave lens having a negative refractive power, a first-side surface S9 of the fifth lens L5 is a concave surface, and a second-side surface S10 of the fifth lens L5 is a concave surface. The sixth lens L6 is a convex-concave lens having a negative refractive power, a first-side surface S10 of the sixth lens L6 is a convex surface, and a second-side surface S11 of the sixth lens L6 is a concave surface. The seventh lens L7 is a concave-concave lens having a negative refractive power, a first-side surface S12 of the seventh lens L7 is a concave surface, and a second-side surface S13 of the seventh lens L7 is a concave surface.

The optical lens assembly may further include a diaphragm STO, and the diaphragm STO may be disposed between the second lens L2 and the third lens L3 to increase the image plane. When the optical lens assembly is used for projection, light from the image source plane sequentially passes through the surfaces from S17 to S1 and is finally projected to a target object (not shown).

Table 27 shows a radius of curvature R, a thickness/ distance d, a refractive index N and an abbe number Vd of each lens of the optical lens assembly in Embodiment 14. Table 28 shows the conic coefficients and the high-order coefficients applicable to the aspheric surfaces in Embodiment 14. Here, the surface type of each aspheric surface may be defined using the formula (1) given in Embodiment 1.

TABLE 27

| surface number | radius of curvature R (mm) | thickness/ distance d (mm) | refractive index N | abbe number Vd |
|---|---|---|---|---|
| S1 | −19.0793 | 1.7875 | 1.63 | 35.71 |
| S2 | 111.5874 | 1.3000 | | |
| S3 | 33.4753 | 4.0013 | 1.68 | 31.09 |
| S4 | −89.1446 | 0.3124 | | |
| STO | infinite | 0.3030 | | |
| S6 | 13.3291 | 4.9855 | 1.44 | 95.10 |
| S7 | −13.3291 | 0.1000 | | |
| S8 | 11.7852 | 3.0546 | 1.59 | 61.25 |
| S9 | −69.9739 | 0.9000 | 1.69 | 31.16 |
| S10 | 14.7909 | 4.0013 | 1.69 | 53.35 |
| S11 | 10.9365 | 1.6202 | | |
| S12 | −100.5267 | 2.5910 | 1.68 | 31.09 |
| S13 | 17.7577 | 1.0000 | | |
| S14 | infinite | 0.5500 | 1.52 | 64.21 |
| S15 | infinite | 1.5745 | | |
| S16 | infinite | 0.5000 | 1.52 | 64.21 |
| S17 | infinite | 0.1250 | | |
| IMA | infinite | | | |

TABLE 28

| surface number | k | A4 | A6 | A8 | A10 | A12 | A14 | A16 |
|---|---|---|---|---|---|---|---|---|
| S3 | −44.8893 | −1.5794E−04 | −2.3734E−06 | 1.4243E−07 | −2.4197E−09 | −2.1340E−10 | −1.8971E−12 | 2.5803E−13 |
| S4 | 85.0915 | 2.1366E−05 | −6.0288E−06 | 1.0343E−07 | −2.2060E−09 | 1.2274E−10 | 1.4285E−12 | −8.9050E−14 |
| S12 | 111.7484 | −2.4503E−03 | 4.1702E−05 | −6.5126E−06 | 3.0800E−07 | 9.6824E−09 | −1.5437E−09 | 4.5133E−11 |
| S13 | 7.6602 | −1.4217E−03 | −2.6528E−05 | 5.9593E−06 | −5.0747E−07 | 2.5369E−08 | −4.9914E−10 | −2.2879E−12 |

Embodiment 15

Figure 15:
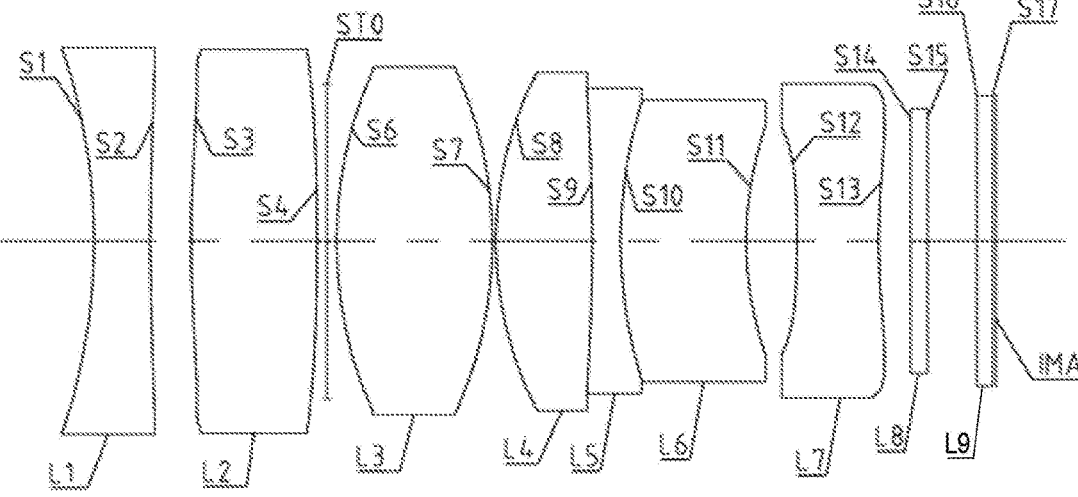
FIG. 15 is a schematic structural diagram of an optical lens assembly according to Embodiment 15 of the present disclosure.

An optical lens assembly according to Embodiment 15 of the present disclosure is described below with reference to FIG. 15. FIG. 15 is a schematic structural diagram of the optical lens assembly according to Embodiment 15 of the present disclosure.

As shown in FIG. 15, the optical lens assembly includes, sequentially along an optical axis from a first side to a second side, a first lens L1, a second lens L2, a third lens L3, a fourth lens L4, a fifth lens L5, a sixth lens L6 and a seventh lens L7.

The first lens L1 is a concave-concave lens having a negative refractive power, a first-side surface S1 of the first lens L1 is a concave surface, and a second-side surface S2 of the first lens L1 is a concave surface. The second lens L2 is a convex-convex lens having a positive refractive power, a first-side surface S3 of the second lens L2 is a convex surface, and a second-side surface S4 of the second lens L2 is a convex surface. The third lens L3 is a convex-convex lens having a positive refractive power, a first-side surface S6 of the third lens L3 is a convex surface, and a second-side surface S7 of the third lens L3 is a convex surface. The fourth lens L4 is a convex-convex lens having a positive refractive power, a first-side surface S8 of the fourth lens L4 is a convex surface, and a second-side surface S9 of the fourth lens L4 is a convex surface. The fifth lens L5 is a concave-concave lens having a negative refractive power, a first-side surface S9 of the fifth lens L5 is a concave surface, and a second-side surface S10 of the fifth lens L5 is a concave surface. The sixth lens L6 is a convex-concave lens having a negative refractive power, a first-side surface S10 of the sixth lens L6 is a convex surface, and a second-side surface S11 of the sixth lens L6 is a concave surface. The seventh lens L7 is a concave-concave lens having a negative refractive power, a first-side surface S12 of the seventh lens L7 is a concave surface, and a second-side surface S13 of the seventh lens L7 is a concave surface.

The optical lens assembly may further include a diaphragm STO, and the diaphragm STO may be disposed between the second lens L2 and the third lens L3 to increase Alternatively, the optical lens assembly may further include an optical filter L8 having a first-side surface S14 and a second-side surface S15, and the optical filter L8 may be used to correct color deviations. Alternatively, the optical lens assembly may further include a protective glass L9 having a first-side surface S16 and a second-side surface S17, and the protective glass L9 may be used to protect an image sensing chip IMA at an image plane and/or an image source plane. When the optical lens assembly is used for photography, light from an object sequentially passes through the surfaces S1-S17 and finally forms an image on the image plane. When the optical lens assembly is used for projection, light from the image source plane sequentially passes through the surfaces from S17 to S1 and is finally projected to a target object (not shown).

Table 29 shows a radius of curvature R, a thickness/distance d, a refractive index N and an abbe number Vd of each lens of the optical lens assembly in Embodiment 15. Table 30 shows the conic coefficients and the high-order coefficients applicable to the aspheric surfaces in Embodiment 15. Here, the surface type of each aspheric surface may be defined using the formula (1) given in Embodiment 1.

TABLE 29

| surface number | radius of curvature R (mm) | thickness/ distance d (mm) | refractive index N | abbe number Vd |
|---|---|---|---|---|
| S1 | −19.0781 | 1.7881 | 1.63 | 35.71 |
| S2 | 111.5874 | 1.3000 | | |
| S3 | 33.4707 | 4.0012 | 1.68 | 31.09 |
| S4 | −89.1451 | 0.3124 | | |
| STO | infinite | 0.3030 | | |
| S6 | 13.3291 | 4.9855 | 1.44 | 95.10 |
| S7 | −13.3291 | 0.1000 | | |
| S8 | 11.7851 | 3.0546 | 1.59 | 61.25 |
| S9 | −70.0000 | 0.9000 | 1.69 | 31.16 |
| S10 | 14.8402 | 4.0013 | 1.69 | 53.35 |
| S11 | 10.9367 | 1.6202 | | |
| S12 | −100.5267 | 2.5911 | 1.68 | 31.09 |
| S13 | 17.7586 | 1.0000 | | |
| S14 | infinite | 0.5500 | 1.52 | 64.21 |
| S15 | infinite | 1.5745 | | |
| S16 | infinite | 0.5000 | 1.52 | 64.21 |
| S17 | infinite | 0.1250 | | |
| IMA | infinite | | | |

TABLE 30

| surface number | k | A4 | A6 | A8 | A10 | A12 | A14 | A16 |
|---|---|---|---|---|---|---|---|---|
| S3 | −44.8980 | −1.5795E−04 | −2.3734E−06 | 1.4245E−07 | −2.4191E−09 | −2.1338E−10 | −1.8971E−12 | 2.5802E−13 |
| S4 | 85.0699 | 2.1373E−05 | −6.0288E−06 | 1.0342E−07 | −2.2064E−09 | 1.2274E−10 | 1.4286E−12 | −8.9015E−14 |
| S12 | 111.7484 | −2.4504E−03 | 4.1699E−05 | −6.5126E−06 | 3.0800E−07 | 9.6824E−09 | −1.5437E−09 | 4.5141E−11 |
| S13 | 7.6593 | −1.4217E−03 | −2.6531E−05 | 5.9593E−06 | −5.0747E−07 | 2.5369E−08 | −4.9912E−10 | −2.2876E−12 | emergent rays, thereby ensuring the light amount. For example, the diaphragm STO may be disposed at a position near the middle between the second lens L2 and the third lens L3.

Embodiment 16

Figure 16:
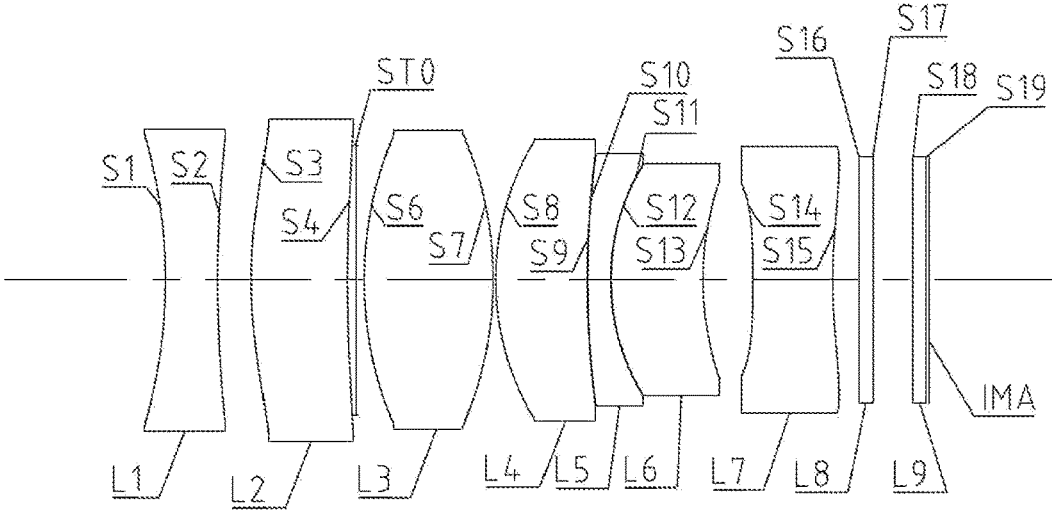
FIG. 16 is a schematic structural diagram of an optical lens assembly according to Embodiment 16 of the present disclosure.

An optical lens assembly according to Embodiment 16 of the present disclosure is described below with reference to FIG. 16. FIG. 16 is a schematic structural diagram of the optical lens assembly according to Embodiment 16 of the present disclosure.

As shown in FIG. 16, the optical lens assembly includes, sequentially along an optical axis from a first side to a second side, a first lens L1, a second lens L2, a third lens L3, a fourth lens L4, a fifth lens L5, a sixth lens L6 and a seventh lens L7.

The first lens L1 is a concave-concave lens having a negative refractive power, a first-side surface S1 of the first lens L1 is a concave surface, and a second-side surface S2 of the first lens L1 is a concave surface. The second lens L2 is a convex-concave lens having a positive refractive power, a first-side surface S3 of the second lens L2 is a convex surface, and a second-side surface S4 of the second lens L2 is a concave surface. The third lens L3 is a convex-convex lens having a positive refractive power, a first-side surface S6 of the third lens L3 is a convex surface, and a second-side surface S7 of the third lens L3 is a convex surface. The fourth lens L4 is a convex-concave lens having a positive refractive power, a first-side surface S8 of the fourth lens L4 is a convex surface, and a second-side surface S9 of the fourth lens L4 is a concave surface. The fifth lens L5 is a convex-concave lens having a negative refractive power, a first-side surface S10 of the fifth lens L5 is a convex surface, and a second-side surface S11 of the fifth lens L5 is a concave surface. The sixth lens L6 is a convex-concave lens having a positive refractive power, a first-side surface S12 of the sixth lens L6 is a convex surface, and a second-side surface S13 of the sixth lens L6 is a concave surface. The seventh lens L7 is a concave-concave having a negative refractive power, a first-side surface S14 of the seventh lens L7 is a concave surface, and a second-side surface S15 of the seventh lens L7 is a concave surface.

Table 31 shows a radius of curvature R, a thickness/distance d, a refractive index N and an abbe number Vd of each lens of the optical lens assembly in Embodiment 16. Table 32 shows the conic coefficients and the high-order coefficients applicable to the aspheric surfaces in Embodiment 16. Here, the surface type of each aspheric surface may be defined using the formula (1) given in Embodiment 1.

TABLE 31

| surface number | radius of curvature R (mm) | thickness/ distance d (mm) | refractive index N | abbe number Vd |
|---|---|---|---|---|
| S1 | −19.6921 | 1.9977 | 1.63 | 35.70 |
| S2 | 50.7814 | 1.3000 | | |
| S3 | 19.3855 | 3.6768 | 1.68 | 31.10 |
| S4 | 58.8745 | 0.3124 | | |
| STO | infinite | 0.3301 | | |
| S6 | 14.2056 | 4.9617 | 1.44 | 95.10 |
| S7 | −14.2056 | 0.1000 | | |
| S8 | 10.3555 | 3.4962 | 1.59 | 61.20 |
| S9 | 36.5383 | 0.0050 | 1.54 | 56.10 |
| S10 | 36.5383 | 0.9000 | 1.69 | 31.20 |
| S11 | 8.5607 | 0.0050 | 1.54 | 56.10 |
| S12 | 8.5607 | 3.5422 | 1.69 | 53.30 |
| S13 | 11.6616 | 1.9201 | | |
| S14 | −115.0595 | 3.0458 | 1.68 | 31.10 |
| S15 | 18.1402 | 1.0000 | | |
| S16 | infinite | 0.5500 | 1.52 | 64.20 |
| S17 | infinite | 1.5534 | | |
| S18 | infinite | 0.5000 | 1.52 | 64.20 |
| S19 | infinite | 0.125 | | |
| IMA | infinite | | | |

TABLE 32

| surface number | k | A4 | A6 | A8 | A10 | A12 | A14 | A16 |
|---|---|---|---|---|---|---|---|---|
| S3 | −2.1907 | −8.0339E−05 | −4.2526E−06 | 1.1678E−09 | 1.8612E−09 | −7.1812E−12 | −2.7891E−12 | 6.1277E−14 |
| S4 | −112.5630 | 5.3348E−05 | −4.3750E−06 | 5.9617E−08 | −1.3891E−09 | 1.0210E−10 | −2.5134E−12 | 2.5355E−14 |
| S14 | 111.7484 | −1.9511E−03 | 1.1417E−05 | −2.7185E−06 | 1.4740E−07 | 9.2394E−10 | −4.5250E−10 | 1.1557E−11 |
| S15 | 3.8345 | −1.1148E−03 | −9.1450E−06 | 4.8271E−06 | −4.7667E−07 | 2.3900E−08 | −5.2999E−10 | 2.9502E−12 |

The optical lens assembly may further include a diaphragm STO, and the diaphragm STO may be disposed between the second lens L2 and the third lens L3 to increase emergent rays, thereby ensuring the Luminous flux. For example, the diaphragm STO may be disposed at a position near the second-side surface S4 of the second lens L2 between the second lens L2 and the third lens L3.

Alternatively, the optical lens assembly may further include an optical filter L8 having a first-side surface S16 and a second-side surface S17, and the optical filter L8 may be used to correct color deviations. Alternatively, the optical lens assembly may further include a protective glass L9 having a first-side surface S18 and a second-side surface S19, and the protective glass L9 may be used to protect an image sensing chip IMA at an image plane and/or an image source plane. When the optical lens assembly is used for photography, light from an object sequentially passes through the surfaces S1-S19 and finally forms an image on the image plane. When the optical lens assembly is used for projection, light from the image source plane sequentially passes through the surfaces from S19 to S1 and is finally projected to a target object (not shown).

Embodiment 17

Figure 17:
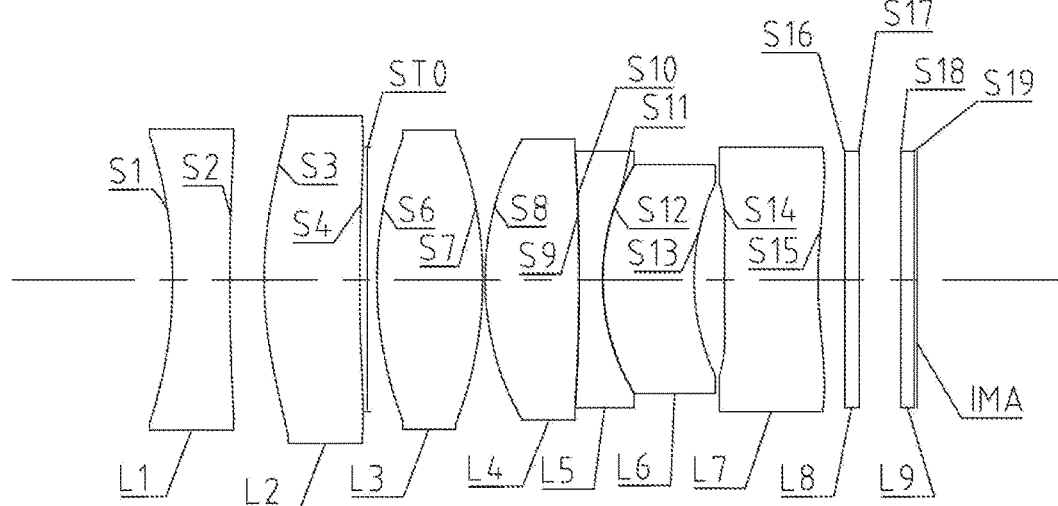
FIG. 17 is a schematic structural diagram of an optical lens assembly according to Embodiment 17 of the present disclosure.

An optical lens assembly according to Embodiment 17 of the present disclosure is described below with reference to FIG. 17. FIG. 17 is a schematic structural diagram of the optical lens assembly according to Embodiment 17 of the present disclosure.

As shown in FIG. 17, the optical lens assembly includes, sequentially along an optical axis from a first side to a second side, a first lens L1, a second lens L2, a third lens L3, a fourth lens L4, a fifth lens L5, a sixth lens L6 and a seventh lens L7.

The first lens L1 is a concave-concave lens having a negative refractive power, a first-side surface S1 of the first lens L1 is a concave surface, and a second-side surface S2 of the first lens L1 is a concave surface. The second lens L2 is a convex-concave lens having a positive refractive power, a first-side surface S3 of the second lens L2 is a convex surface, and a second-side surface S4 of the second lens L2 is a concave surface. The third lens L3 is a convex-convex lens having a positive refractive power, a first-side surface S6 of the third lens L3 is a convex surface, and a second-side surface S7 of the third lens L3 is a convex surface. The fourth lens L4 is a convex-convex lens having a positive refractive power, a first-side surface S8 of the fourth lens L4 is a convex surface, and a second-side surface S9 of the fourth lens L4 is a convex surface. The fifth lens L5 is a concave-concave lens having a negative refractive power, a first-side surface S10 of the fifth lens L5 is a concave surface, and a second-side surface S11 of the fifth lens L5 is a concave surface. The sixth lens L6 is a convex-concave lens having a positive refractive power, a first-side surface S12 of the sixth lens L6 is a convex surface, and a second-side surface S13 of the sixth lens L6 is a concave surface. The seventh lens L7 is a convex-concave lens having a negative refractive power, a first-side surface S14 of the seventh lens L7 is a convex surface, and a second-side surface S15 of the seventh lens L7 is a concave surface.

The optical lens assembly may further include a diaphragm STO, and the diaphragm STO may be disposed between the second lens L2 and the third lens L3 to increase emergent rays, thereby ensuring the light amount. For example, the diaphragm STO may be disposed at a position near the second-side surface S4 of the second lens L2 between the second lens L2 and the third lens L3.

Alternatively, the optical lens assembly may further include an optical filter L8 having a first-side surface S16 and a second-side surface S17, and the optical filter L8 may be used to correct color deviations. Alternatively, the optical lens assembly may further include a protective glass L9 having a first-side surface S18 and a second-side surface S19, and the protective glass L9 may be used to protect an image sensing chip IMA at an image plane and/or an image source plane. When the optical lens assembly is used for photography, light from an object sequentially passes through the surfaces S1-S19 and finally forms an image on the image plane. When the optical lens assembly is used for projection, light from the image source plane sequentially passes through the surfaces from S19 to S1 and is finally projected to a target object (not shown).

Table 33 shows a radius of curvature R, a thickness/distance d, a refractive index N and an abbe number Vd of each lens of the optical lens assembly in Embodiment 17. Table 34 shows the conic coefficients and the high-order coefficients applicable to the aspheric surfaces in Embodiment 17. Here, the surface type of each aspheric surface may be defined using the formula (1) given in Embodiment 1.

TABLE 33

| surface number | radius of curvature R (mm) | thickness/distance d (mm) | refractive index N | abbe number Vd |
|---|---|---|---|---|
| S1 | −17.5430 | 2.1900 | 1.63 | 35.71 |
| S2 | 88.2265 | 1.3000 | | |
| S3 | 15.9139 | 3.6768 | 1.68 | 31.09 |
| S4 | 83.5400 | 0.3124 | | |

TABLE 33-continued

| surface number | radius of curvature R (mm) | thickness/distance d (mm) | refractive index N | abbe number Vd |
|---|---|---|---|---|
| STO | infinite | 0.3501 | | |
| S6 | 15.3266 | 4.0659 | 1.44 | 95.10 |
| S7 | −15.3266 | 0.1000 | | |
| S8 | 10.9973 | 3.5900 | 1.59 | 61.25 |
| S9 | −80.4208 | 0.0050 | 1.54 | 56.11 |
| S10 | −80.4208 | 0.9000 | 1.69 | 31.16 |
| S11 | 8.5607 | 0.0050 | 1.54 | 56.11 |
| S12 | 8.5607 | 3.5122 | 1.69 | 53.35 |
| S13 | 8.8341 | 1.1668 | | |
| S14 | 42.5869 | 3.5939 | 1.68 | 31.09 |
| S15 | 18.7052 | 1.0000 | | |
| S16 | infinite | 0.5500 | 1.52 | 64.21 |
| S17 | infinite | 1.6211 | | |
| S18 | infinite | 0.5000 | 1.52 | 64.21 |
| S19 | infinite | 0.125 | | |
| IMA | infinite | | | |

TABLE 34

| surface number | k | A4 | A6 | A8 | A10 | A12 | A14 | A16 |
|---|---|---|---|---|---|---|---|---|
| S3 | −1.1813 | −5.0216E−05 | −3.5999E−06 | 1.1111E−08 | 1.1125E−09 | −1.7696E−11 | −1.8265E−12 | 4.1969E−14 |
| S4 | −25.0730 | 5.9839E−05 | −5.0378E−06 | 1.0997E−07 | −1.0455E−09 | 3.3510E−11 | −5.3830E−12 | 1.0101E−13 |
| S14 | 111.7484 | −1.7139E−03 | −1.4895E−06 | −4.7634E−06 | 1.9798E−07 | 4.7660E−09 | −9.1351E−10 | 1.9392E−11 |
| S15 | 8.8839 | −8.0227E−04 | −5.0540E−05 | 6.4224E−06 | −5.2212E−07 | 2.2518E−08 | −4.0837E−10 | 1.1992E−12 |

Embodiment 18

Figure 18:
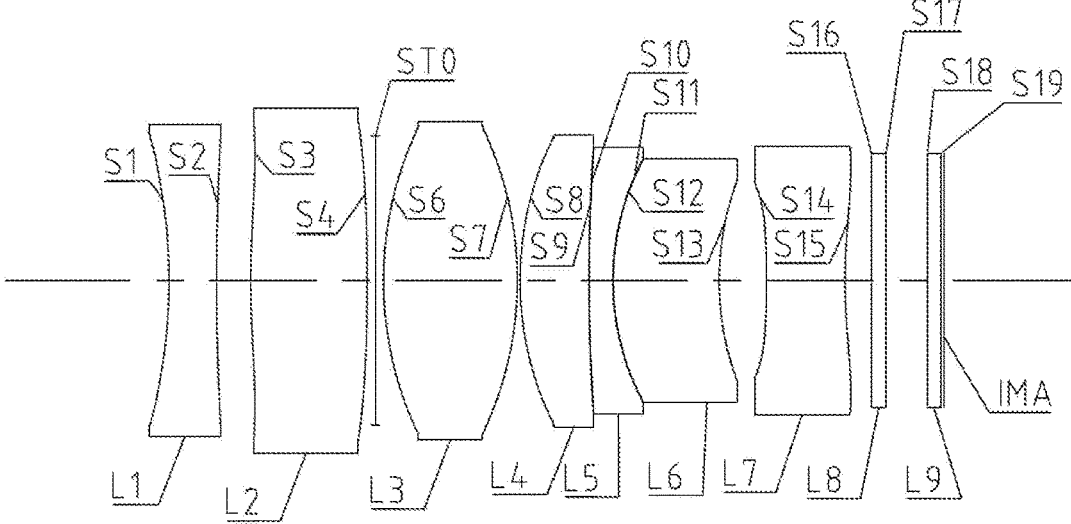
FIG. 18 is a schematic structural diagram of an optical lens assembly according to Embodiment 18 of the present disclosure.

An optical lens assembly according to Embodiment 18 of the present disclosure is described below with reference to FIG. 18. FIG. 18 is a schematic structural diagram of the optical lens assembly according to Embodiment 18 of the present disclosure.

As shown in FIG. 18, the optical lens assembly includes, sequentially along an optical axis from a first side to a second side, a first lens L1, a second lens L2, a third lens L3, a fourth lens L4, a fifth lens L5, a sixth lens L6 and a seventh lens L7.

The first lens L1 is a concave-concave lens having a negative refractive power, a first-side surface S1 of the first lens L1 is a concave surface, and a second-side surface S2 of the first lens L1 is a concave surface. The second lens L2 is a convex-convex lens having a positive refractive power, a first-side surface S3 of the second lens L2 is a convex surface, and a second-side surface S4 of the second lens L2 is a convex surface. The third lens L3 is a convex-convex lens having a positive refractive power, a first-side surface S6 of the third lens L3 is a convex surface, and a second-side surface S7 of the third lens L3 is a convex surface. The fourth lens L4 is a convex-concave lens having a positive refractive power, a first-side surface S8 of the fourth lens L4 is a convex surface, and a second-side surface S9 of the fourth lens L4 is a concave surface. The fifth lens L5 is a convex-concave lens having a negative refractive power, a first-side surface S10 of the fifth lens L5 is a convex surface, and a second-side surface S11 of the fifth lens L5 is a concave surface. The sixth lens L6 is a convex-concave lens having a positive refractive power, a first-side surface S12 of the sixth lens L6 is a convex surface, and a second-side surface S13 of the sixth lens L6 is a concave surface. The seventh lens L7 is a concave-concave lens having a negative refractive power, a first-side surface S14 of the seventh lens L7 is a concave surface, and a second-side surface S15 of the seventh lens L7 is a concave surface.

The optical lens assembly may further include a diaphragm STO, and the diaphragm STO may be disposed between the second lens L2 and the third lens L3 to increase emergent rays, thereby ensuring the light amount. For example, the diaphragm STO may be disposed at a position near the middle between the second lens L2 and the third lens L3.

Alternatively, the optical lens assembly may further include an optical filter L8 having a first-side surface S16 and a second-side surface S17, and the optical filter L8 may be used to correct color deviations. Alternatively, the optical lens assembly may further include a protective glass L9 having a first-side surface S18 and a second-side surface S19, and the protective glass L9 may be used to protect an image sensing chip IMA at an image plane and/or an image source plane. When the optical lens assembly is used for photography, light from an object sequentially passes through the surfaces S1-S19 and finally forms an image on the image plane. When the optical lens assembly is used for projection, light from the image source plane sequentially passes through the surfaces from S19 to S1 and is finally projected to a target object (not shown).

Table 35 shows a radius of curvature R, a thickness/distance d, a refractive index N and an abbe number Vd of each lens of the optical lens assembly in Embodiment 18. Table 36 shows the conic coefficients and the high-order coefficients applicable to the aspheric surfaces in Embodiment 18. Here, the surface type of each aspheric surface may be defined using the formula (1) given in Embodiment 1.

TABLE 35

| surface number | radius of curvature R (mm) | thickness/ distance d (mm) | refractive index N | abbe number Vd |
|---|---|---|---|---|
| S1 | −20.9581 | 1.7881 | 1.63 | 35.71 |
| S2 | 92.2112 | 1.3000 | | |
| S3 | 40.2022 | 4.3666 | 1.68 | 31.09 |
| S4 | −82.3384 | 0.3124 | | |
| STO | infinite | 0.3030 | | |
| S6 | 13.4062 | 5.0580 | 1.44 | 95.10 |
| S7 | −13.4062 | 0.1000 | | |
| S8 | 12.2341 | 2.5808 | 1.59 | 61.25 |
| S9 | 72.4279 | 0.0050 | 1.54 | 56.11 |
| S10 | 72.4279 | 0.9000 | 1.69 | 31.16 |
| S11 | 9.7957 | 0.0050 | 1.54 | 56.11 |
| S12 | 9.7957 | 4.0023 | 1.69 | 53.35 |
| S13 | 10.8460 | 1.7836 | | |
| S14 | −90.0012 | 2.9486 | 1.68 | 31.09 |
| S15 | 18.3105 | 1.0000 | | |
| S16 | infinite | 0.5500 | 1.52 | 64.21 |
| S17 | infinite | 1.5584 | | |
| S18 | infinite | 0.5000 | 1.52 | 64.21 |
| S19 | infinite | 0.125 | | |
| IMA | infinite | | | |

TABLE 36

| surface number | k | A4 | A6 | A8 | A10 | A12 | A14 | A16 |
|---|---|---|---|---|---|---|---|---|
| S3 | −5.7771 | −1.2627E−04 | −6.5743E−06 | 8.4729E−08 | 1.0802E−10 | −5.2545E−11 | 7.7215E−13 | 1.7635E−14 |
| S4 | 143.0531 | −4.3451E−05 | −2.8959E−06 | 1.5907E−07 | −2.5967E−09 | 4.9007E−11 | −1.1080E−12 | 9.3629E−15 |
| S14 | 111.7484 | −1.7822E−03 | 1.9339E−05 | −6.3505E−06 | 3.1841E−07 | 1.1122E−08 | −1.3752E−09 | 2.5376E−11 |
| S15 | 8.9881 | −1.2525E−03 | −1.0655E−05 | 5.0871E−06 | −5.3065E−07 | 2.4910E−08 | −4.8680E−10 | 2.1057E−12 |

Embodiment 19

Figure 19:
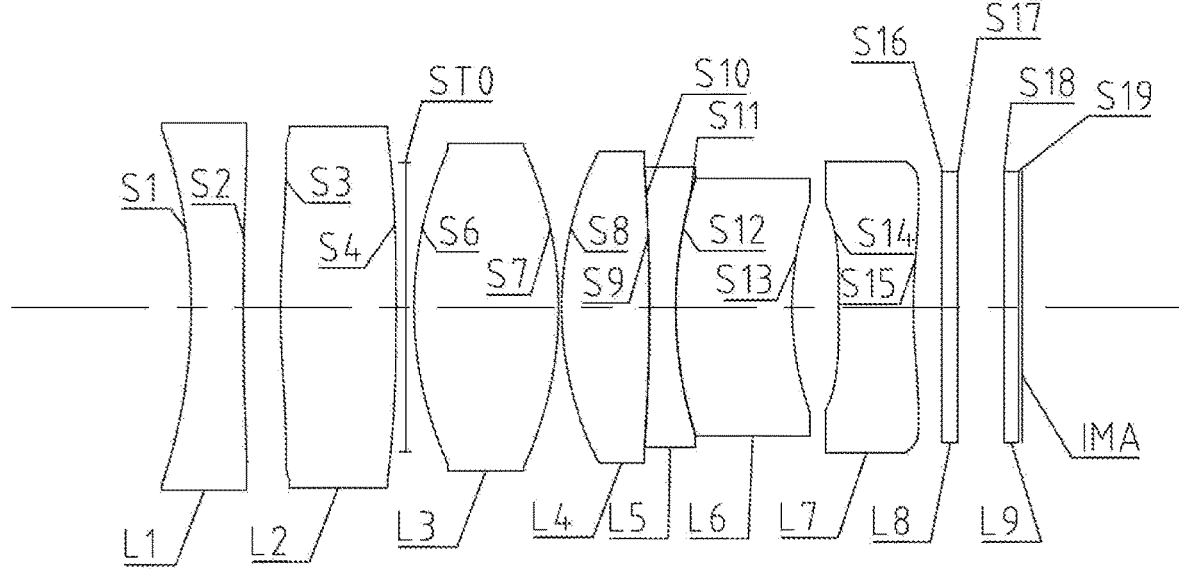
FIG. 19 is a schematic structural diagram of an optical lens assembly according to Embodiment 19 of the present disclosure.

An optical lens assembly according to Embodiment 19 of the present disclosure is described below with reference to FIG. 19. FIG. 19 is a schematic structural diagram of the optical lens assembly according to Embodiment 19 of the present disclosure.

As shown in FIG. 19, the optical lens assembly includes, sequentially along an optical axis from a first side to a second side, a first lens L1, a second lens L2, a third lens L3, a fourth lens L4, a fifth lens L5, a sixth lens L6 and a seventh lens L7.

The first lens L1 is a concave-concave lens having a negative refractive power, a first-side surface S1 of the first lens L1 is a concave surface, and a second-side surface S2 of the first lens L1 is a concave surface. The second lens L2 is a convex-convex lens having a positive refractive power, a first-side surface S3 of the second lens L2 is a convex surface, and a second-side surface S4 of the second lens L2 is a convex surface. The third lens L3 is a convex-convex lens having a positive refractive power, a first-side surface S6 of the third lens L3 is a convex surface, and a second-side surface S7 of the third lens L3 is a convex surface. The fourth lens L4 is a convex-convex lens having a positive refractive power, a first-side surface S8 of the fourth lens L4 is a convex surface, and a second-side surface S9 of the fourth lens L4 is a convex surface. The fifth lens L5 is a concave-concave lens having a negative refractive power, a first-side surface S10 of the fifth lens L5 is a concave surface, and a second-side surface S11 of the fifth lens L5 is a concave surface. The sixth lens L6 is a convex-concave lens having a negative refractive power, a first-side surface S12 of the sixth lens L6 is a convex surface, and a second-side surface S13 of the sixth lens L6 is a concave surface. The seventh lens L7 is a concave-concave lens having a negative refractive power, a first-side surface S14 of the seventh lens L7 is a concave surface, and a second-side surface S15 of the seventh lens L7 is a concave surface.

The optical lens assembly may further include a diaphragm STO, and the diaphragm STO may be disposed between the second lens L2 and the third lens L3 to increase emergent rays, thereby ensuring the light amount. For example, the diaphragm STO may be disposed at a position near the middle between the second lens L2 and the third lens L3.

Alternatively, the optical lens assembly may further include an optical filter L8 having a first-side surface S16 and a second-side surface S17, and the optical filter L8 may be used to correct color deviations. Alternatively, the optical lens assembly may further include a protective glass L9 having a first-side surface S18 and a second-side surface S19, and the protective glass L9 may be used to protect an image sensing chip IMA at an image plane and/or an image source plane. When the optical lens assembly is used for photography, light from an object sequentially passes through the surfaces S1-S19 and finally forms an image on the image plane. When the optical lens assembly is used for projection, light from the image source plane sequentially passes through the surfaces from S19 to S1 and is finally projected to a target object (not shown).

Table 37 shows a radius of curvature R, a thickness/distance d, a refractive index N and an abbe number Vd of each lens of the optical lens assembly in Embodiment 19. Table 38 shows the conic coefficients and the high-order coefficients applicable to the aspheric surfaces in Embodiment 19. Here, the surface type of each aspheric surface may be defined using the formula (1) given in Embodiment 1.

TABLE 37

| surface number | radius of curvature R (mm) | thickness/ distance d (mm) | refractive index N | abbe number Vd |
|---|---|---|---|---|
| S1 | −19.0781 | 1.7881 | 1.63 | 35.71 |
| S2 | 111.5874 | 1.3000 | | |
| S3 | 33.4707 | 4.0012 | 1.68 | 31.09 |
| S4 | −89.1451 | 0.3124 | | |
| STO | infinite | 0.3030 | | |
| S6 | 13.3291 | 4.9855 | 1.44 | 95.10 |
| S7 | −13.3291 | 0.1000 | | |
| S8 | 11.7851 | 3.0546 | 1.59 | 61.25 |
| S9 | −70.0000 | 0.0050 | 1.54 | 56.11 |
| S10 | −70.0000 | 0.9000 | 1.69 | 31.16 |
| S11 | 14.8402 | 0.0050 | 1.54 | 56.11 |
| S12 | 14.8402 | 4.0013 | 1.69 | 53.35 |
| S13 | 10.9367 | 1.6202 | | |
| S14 | −100.5267 | 2.5911 | 1.68 | 31.09 |
| S15 | 17.7586 | 1.0000 | | |
| S16 | infinite | 0.5500 | 1.52 | 64.21 |
| S17 | infinite | 1.5745 | | |
| S18 | infinite | 0.5000 | 1.52 | 64.21 |
| S19 | infinite | 0.125 | | |
| IMA | infinite | | | |

TABLE 38

| surface number | k | A4 | A6 | A8 | A10 | A12 | A14 | A16 |
|---|---|---|---|---|---|---|---|---|
| S3 | −44.8980 | −1.5795E−04 | −2.3734E−06 | 1.4245E−07 | −2.4191E−09 | −2.1338E−10 | −1.8971E−12 | 2.5802E−13 |
| S4 | 85.0699 | 2.1373E−05 | −6.0288E−06 | 1.0342E−07 | −2.2064E−09 | 1.2274E−10 | 1.4286E−12 | −8.9015E−14 |
| S14 | 111.7484 | −2.4504E−03 | 4.1699E−05 | −6.5126E−06 | 3.0800E−07 | 9.6824E−09 | −1.5437E−09 | 4.5141E−11 |
| S15 | 7.6593 | −1.4217E−03 | −2.6531E−05 | 5.9593E−06 | −5.0747E−07 | 2.5369E−08 | −4.9912E−10 | −2.2876E−12 |

In summary, Embodiments 1-7 respectively satisfy the relationships shown in the following table 39. In Table 39, the units of TTL, F, H, ENPD, F3, F4, F5, F45, R1, R2, R6, R7, d1, d4, d5, dn, dm, D41, SAG41 and BFL are millimeters (mm), and the unit of FOV is degrees (°).

TABLE 39

| Conditional expression/ Embodiment | Embodiment 1 | Embodiment 2 | Embodiment 3 | Embodiment 4 | Embodiment 5 | Embodiment 6 | Embodiment 7 |
|---|---|---|---|---|---|---|---|
| TTL | 31.37 | 29.16 | 32.02 | 32.33 | 31.66 | 30.61 | 31.46 |
| F | 15.23 | 14.26 | 15.87 | 16.06 | 15.33 | 14.16 | 15.36 |
| H | 7.99 | 7.45 | 8.36 | 8.50 | 8.16 | 7.55 | 8.03 |
| FOV | 30 | 30 | 30 | 30 | 30 | 30 | 30 |
| ENPD | 9.17 | 8.49 | 9.45 | 9.56 | 9.12 | 8.43 | 8.77 |
| F3 | 17.88 | 21.34 | 20.94 | 22.42 | 21.30 | 20.52 | 16.23 |
| F4 | 14.03 | 16.62 | 15.83 | 14.57 | 15.58 | 10.98 | 17.31 |
| F5 | −9.57 | −11.09 | −10.62 | −9.30 | −10.40 | −6.33 | −9.79 |
| F45 | −83.38 | −113.84 | −80.12 | −59.92 | −79.32 | −30.03 | −36.93 |
| dn | 4.80 | 5.42 | 4.80 | 5.53 | 4.80 | 5.30 | 5.98 |
| dm | 3.50 | 3.50 | 3.50 | 3.50 | 3.50 | 3.50 | 3.44 |
| D41 | 6.04 | 6.38 | 6.17 | 6.10 | 6.14 | 5.96 | 5.20 |
| SAG41 | 2.33 | 2.76 | 2.48 | 2.13 | 2.51 | 2.07 | 1.27 |
| BFL | 3.47 | 2.81 | 4.12 | 4.43 | 3.76 | 2.32 | 3.62 |
| TTL/F | 2.06 | 2.15 | 2.02 | 2.01 | 2.07 | 2.16 | 2.05 |
| TTL/H/FOV | 0.131 | 0.137 | 0.128 | 0.127 | 0.129 | 0.135 | 0.131 |
| VD3 + VD4 | 123.8 | 155.5 | 154.6 | 156.4 | 156.4 | 142.2 | 147.1 |
| (FOV × F)/H | 57.15 | 57.44 | 56.95 | 56.67 | 56.32 | 56.26 | 57.35 |
| BFL/TTL | 0.11 | 0.09 | 0.13 | 0.14 | 0.12 | 0.08 | 0.11 |
| |F4/F5| | 1.47 | 1.50 | 1.49 | 1.57 | 1.50 | 1.74 | 1.77 |
| |F3/F| | 1.17 | 1.50 | 1.32 | 1.40 | 1.39 | 1.45 | 1.06 |
| |F45/F| | 5.48 | 7.98 | 5.05 | 3.73 | 5.18 | 2.12 | 2.40 |
| |R1/F| | 1.29 | 1.42 | 1.02 | 0.97 | 1.08 | 1.07 | 1.16 |
| dn/dm | 1.37 | 1.55 | 1.37 | 1.58 | 1.37 | 1.51 | 1.74 |
| R1/(R2 + d1) | 0.55 | 0.45 | 0.52 | 0.55 | 0.53 | 0.32 | 0.54 |
| (d4 + d5)/TTL | 0.15 | 0.18 | 0.15 | 0.17 | 0.15 | 0.17 | 0.19 |
| F/ENPD | 1.66 | 1.68 | 1.68 | 1.68 | 1.68 | 1.68 | 1.75 |
| arctan(SAG41/D41) | 21.12 | 23.40 | 21.91 | 19.28 | 22.24 | 19.16 | 13.71 |
| |R6/R7| | 0.82 | 1.00 | 1.00 | 1.00 | 1.00 | 0.95 | 1.86 |
| |(H F × θ)/(F × θ)| | 0.0030 | 0.0020 | 0.0066 | 0.0115 | 0.0178 | 0.0190 | 0.0005 |

Embodiments 8-19 respectively satisfy the relationships shown in the following tables 40-1, 40-2 and 40-3. In Tables 40-1, 40-2 and 40-3, the units of TTL, F, F1, F2, F3, F4, F5, F6, F7, SAG61, SAG62, D61, D62, D, BFL, R6, R7, H, F456, EPD, d4, d5, d6, Ti10, d46, F45, T and d7 are millimeters (mm), the unit of FOV is degrees (°), and the units of θ1 and θ2 are radians.

TABLE 40-1

| Conditional expression | Embodiment | | | |
| | Embodiment 8 | Embodiment 9 | Embodiment 10 | Embodiment 11 |
|---|---|---|---|---|
| TTL | 28.700 | 29.303 | 28.594 | 28.554 |
| F | 14.460 | 14.517 | 14.277 | 14.331 |
| FOV | 31.000 | 31.000 | 31.000 | 31.000 |
| F1 | −22.209 | −22.313 | −23.965 | −23.078 |
| F2 | 37.651 | 40.579 | 28.232 | 28.026 |
| F3 | 17.034 | 17.133 | 18.304 | 18.239 |
| F4 | 22.105 | 23.301 | 16.499 | 16.615 |
| F5 | −15.463 | −16.350 | −11.025 | −11.120 |
| F6 | 32.567 | 31.586 | 66.203 | 63.387 |
| F7 | −21.874 | −22.623 | −56.050 | −51.777 |
| SAG61 | 1.248 | 1.259 | 1.190 | 1.217 |
| SAG62 | 0.643 | 0.643 | 0.798 | 0.808 |
| D61 | 8.903 | 8.938 | 8.709 | 8.797 |
| D62 | 7.566 | 7.636 | 7.300 | 7.381 |
| Vd3 | 95.100 | 95.100 | 95.100 | 95.100 |
| Vd4 | 61.248 | 61.248 | 61.248 | 61.248 |
| D | 11.195 | 11.230 | 11.177 | 11.147 |
| BFL | 3.750 | 3.728 | 3.818 | 3.796 |
| R6 | 14.141 | 14.206 | 15.350 | 15.327 |
| R7 | −14.141 | −14.206 | −15.350 | −15.327 |
| H | 8.063 | 8.049 | 8.122 | 8.103 |

TABLE 40-1-continued

| Conditional expression | Embodiment 8 | Embodiment 9 | Embodiment 10 | Embodiment 11 |
|---|---|---|---|---|
| | | Embodiment | | |
| F456 | 65.442 | 59.239 | −155.388 | −182.582 |
| EPD | 8.790 | 8.825 | 8.679 | 8.712 |
| d4 | 3.468 | 3.496 | 3.572 | 3.590 |
| d5 | 0.900 | 0.900 | 0.900 | 0.900 |
| d6 | 3.512 | 3.512 | 3.512 | 3.512 |
| Ti10 | 12.010 | 12.209 | 11.926 | 12.069 |
| d46 | 0.900 | 0.900 | 0.900 | 0.900 |
| θ1 | 0.097 | 0.099 | 0.102 | 0.103 |
| θ2 | 0.097 | 0.098 | 0.102 | 0.102 |
| F45 | −105.675 | −114.562 | −60.346 | −61.545 |
| d7 | 2.892 | 3.048 | 3.457 | 3.594 |
| N4 | 1.589 | 1.589 | 1.589 | 1.589 |
| N5 | 1.689 | 1.689 | 1.689 | 1.689 |
| N6 | 1.694 | 1.694 | 1.694 | 1.694 |
| T | 7.881 | 7.908 | 7.984 | 8.002 |
| TTL/F | 1.985 | 2.019 | 2.003 | 1.993 |
| (SAG61/D61)/(SAG62/D62) | 1.649 | 1.674 | 1.250 | 1.264 |
| Vd3 + Vd4 | 156.348 | 156.348 | 156.348 | 156.348 |
| D/H/θ | 2.566 | 2.579 | 2.543 | 2.543 |
| \|F4/F5\| | 1.430 | 1.425 | 1.497 | 1.494 |
| BFL/TTL | 0.131 | 0.127 | 0.134 | 0.133 |
| \|R6/R7\| | −1.000 | −1.000 | −1.000 | −1.000 |
| (FOV × F)/H | 55.594 | 55.912 | 54.492 | 54.825 |
| \|F456/F\| | 4.526 | 4.081 | 10.884 | 12.741 |
| F/EPD | 1.645 | 1.645 | 1.645 | 1.645 |
| (d4 + d5 + d6)/TTL | 0.275 | 0.270 | 0.279 | 0.280 |
| Ti10/TTL | 0.418 | 0.417 | 0.417 | 0.423 |
| d46/TTL | 0.031 | 0.031 | 0.031 | 0.032 |
| θ2/θ1 | 1.0000 | 0.9899 | 1.0000 | 0.9903 |
| \|F45/F\| | 7.3081 | 7.8915 | 4.2268 | 4.2946 |
| \|F6/F\| | 2.2522 | 2.1757 | 4.6371 | 4.4232 |
| d7/TTL | 0.1008 | 0.1040 | 0.1209 | 0.1259 |
| (N6 − N4)/(N5 − N4) | 1.050 | 1.050 | 1.050 | 1.050 |
| T − (d4 + d5 + d6) | 0.000 | 0.000 | 0.000 | 0.000 |

TABLE 40-2

| Conditional expression | Embodiment 12 | Embodiment 13 | Embodiment 14 | Embodiment 15 |
|---|---|---|---|---|
| | | Embodiment | | |
| TTL | 29.134 | 29.177 | 28.706 | 28.707 |
| F | 14.435 | 14.887 | 13.819 | 13.818 |
| FOV | 31.000 | 31.000 | 31.000 | 31.000 |
| F1 | −26.938 | −26.982 | −25.765 | −25.764 |
| F2 | 39.421 | 39.942 | 35.940 | 35.936 |
| F3 | 16.218 | 16.243 | 16.141 | 16.141 |
| F4 | 24.423 | 24.522 | 17.310 | 17.311 |
| F5 | −16.321 | −16.445 | −17.545 | −17.594 |
| F6 | 52.884 | 56.703 | −105.067 | −103.124 |
| F7 | −22.478 | −21.928 | −21.797 | −21.798 |
| SAG61 | 1.153 | 1.141 | 0.695 | 0.693 |
| SAG62 | 0.670 | 0.677 | 0.625 | 0.625 |
| D61 | 9.188 | 9.176 | 8.961 | 8.962 |
| D62 | 7.559 | 7.546 | 7.286 | 7.286 |
| Vd3 | 95.100 | 95.100 | 95.100 | 95.100 |
| Vd4 | 61.248 | 61.248 | 61.248 | 61.248 |
| D | 11.261 | 11.232 | 12.349 | 12.350 |
| BFL | 3.774 | 3.733 | 3.750 | 3.750 |
| R6 | 13.389 | 13.406 | 13.329 | 13.329 |
| R7 | −13.389 | −13.406 | −13.329 | −13.329 |
| H | 8.085 | 8.048 | 8.060 | 8.060 |
| F456 | 1117.170 | −42666.000 | 2000.660 | 1997.930 |
| EPD | 8.775 | 9.050 | 8.401 | 8.400 |
| d4 | 2.596 | 2.581 | 3.055 | 3.055 |
| d5 | 0.900 | 0.900 | 0.900 | 0.900 |
| d6 | 4.016 | 4.002 | 4.001 | 4.001 |
| Ti10 | 12.519 | 12.468 | 11.962 | 11.962 |
| d46 | 0.900 | 0.900 | 0.900 | 0.900 |
| θ1 | 0.095 | 0.095 | 0.094 | 0.094 |
| θ2 | 0.095 | 0.094 | 0.094 | 0.094 |
| F45 | −71.786 | −72.818 | 129.895 | 127.616 |
| d7 | 2.935 | 2.949 | 2.591 | 2.591 |

TABLE 40-2-continued

| Conditional expression | Embodiment | | | |
| | Embodiment 12 | Embodiment 13 | Embodiment 14 | Embodiment 15 |
| --- | --- | --- | --- | --- |
| N4 | 1.589 | 1.589 | 1.589 | 1.589 |
| N5 | 1.689 | 1.689 | 1.689 | 1.689 |
| N6 | 1.694 | 1.694 | 1.694 | 1.694 |
| T | 7.512 | 7.483 | 7.956 | 7.956 |
| TTL/F | 2.018 | 1.960 | 2.077 | 2.077 |
| (SAG61/D61)/(SAG62/D62) | 1.415 | 1.385 | 0.905 | 0.902 |
| Vd3 + Vd4 | 156.348 | 156.348 | 156.348 | 156.348 |
| D/H/θ | 2.574 | 2.579 | 2.832 | 2.832 |
| |F4/F5| | 1.496 | 1.491 | 0.987 | 0.984 |
| BFL/TTL | 0.130 | 0.128 | 0.131 | 0.131 |
| |R6/R7| | −1.000 | −1.000 | −1.000 | −1.000 |
| (FOV × F)/H | 55.348 | 57.342 | 53.151 | 53.148 |
| |F456/F| | 77.392 | 2866.067 | 144.774 | 144.585 |
| F/EPD | 1.645 | 1.645 | 1.645 | 1.645 |
| (d4 + d5 + d6)/TTL | 0.258 | 0.256 | 0.277 | 0.277 |
| Ti10/TTL | 0.430 | 0.427 | 0.417 | 0.417 |
| d46/TTL | 0.031 | 0.031 | 0.031 | 0.031 |
| θ2/θ1 | 1.0000 | 0.9895 | 1.0000 | 1.0000 |
| |F45/F| | 4.9730 | 4.8915 | 9.3996 | 9.2352 |
| |F6/F| | 3.6635 | 3.8090 | 7.6029 | 7.4628 |
| d7/TTL | 0.1007 | 0.1011 | 0.0903 | 0.0903 |
| (N6 − N4)/(N5 − N4) | 1.050 | 1.050 | 1.050 | 1.050 |
| T − (d4 + d5 + d6) | 0.000 | 0.000 | 0.000 | 0.000 |

TABLE 40-3

| Conditional expression | Embodiment | | | |
| | Embodiment 16 | Embodiment 17 | Embodiment 18 | Embodiment 19 |
| --- | --- | --- | --- | --- |
| TTL | 29.321 | 28.564 | 29.187 | 28.717 |
| F | 14.464 | 14.317 | 14.871 | 13.803 |
| FOV | 35.600 | 35.600 | 35.600 | 35.600 |
| F1 | −22.313 | −23.078 | −26.982 | −25.764 |
| F2 | 40.577 | 28.026 | 39.942 | 35.936 |
| F3 | 17.133 | 18.239 | 16.242 | 16.141 |
| F4 | 23.301 | 16.615 | 24.522 | 17.311 |
| F5 | −16.350 | −11.120 | −16.445 | −17.594 |
| F6 | 31.500 | 63.387 | 56.703 | −103.124 |
| F7 | −22.623 | −51.777 | −21.928 | −21.798 |
| SAG61 | 1.250 | 1.214 | 1.138 | 0.691 |
| SAG62 | 0.638 | 0.807 | 0.676 | 0.623 |
| D61 | 8.910 | 8.790 | 9.166 | 8.951 |
| D62 | 7.606 | 7.376 | 7.538 | 7.278 |
| Vd3 | 95.100 | 95.100 | 95.100 | 95.100 |
| Vd4 | 61.200 | 61.248 | 61.248 | 61.248 |
| D | 11.198 | 11.139 | 11.222 | 12.355 |
| BFL | 3.728 | 3.796 | 3.7334 | 3.7495 |
| R6 | 14.206 | 15.327 | 13.406 | 13.329 |
| R7 | −14.206 | −15.327 | −13.406 | −13.329 |
| H | 9.378 | 9.402 | 9.352 | 9.378 |
| F456 | 58.965 | −183.291 | −115201.000 | 1930.310 |
| EPD | 8.793 | 8.704 | 9.040 | 8.391 |
| d4 | 3.496 | 3.590 | 2.581 | 3.055 |
| d5 | 0.900 | 0.900 | 0.900 | 0.900 |
| d6 | 3.542 | 3.512 | 4.002 | 4.001 |
| Ti10 | 12.236 | 12.069 | 12.468 | 11.962 |
| d46 | 0.910 | 0.910 | 0.910 | 0.910 |
| θ1 | 0.124 | 0.129 | 0.117 | 0.113 |
| θ2 | 0.099 | 0.102 | 0.094 | 0.094 |
| F45 | 22.563 | 26.815 | 28.166 | 25.188 |
| d7 | 3.046 | 3.594 | 2.949 | 2.591 |
| N4 | 1.589 | 1.589 | 1.589 | 1.589 |
| N5 | 1.690 | 1.689 | 1.689 | 1.689 |
| N6 | 1.690 | 1.694 | 1.694 | 1.694 |
| T | 7.948 | 8.012 | 7.493 | 7.966 |
| TTL/F | 2.027 | 1.995 | 1.963 | 2.080 |
| (SAG61/D61)/(SAG62/D62) | 1.674 | 1.263 | 1.385 | 0.902 |
| Vd3 + Vd4 | 156.300 | 156.348 | 156.348 | 156.348 |
| D/H/θ | 1.922 | 1.907 | 1.931 | 2.120 |
| |F4/F5| | 1.425 | 1.494 | 1.491 | 0.984 |
| BFL/TTL | 0.127 | 0.133 | 0.128 | 0.131 |
| |R6/R7| | 1.000 | 1.000 | 1.000 | 1.000 |

TABLE 40-3-continued

| | Embodiment | | | |
|---|---|---|---|---|
| Conditional expression | Embodiment 16 | Embodiment 17 | Embodiment 18 | Embodiment 19 |
| (FOV × F)/H | 54.907 | 54.211 | 56.607 | 52.398 |
| \|F456/F\| | 4.077 | 12.802 | 7746.949 | 139.847 |
| F/EPD | 1.645 | 1.645 | 1.645 | 1.645 |
| (d4 + d5 + d6)/TTL | 0.271 | 0.280 | 0.256 | 0.277 |
| Ti10/TTL | 0.417 | 0.423 | 0.427 | 0.417 |
| d46/TTL | 0.031 | 0.032 | 0.031 | 0.032 |
| θ2/θ1 | 0.7952 | 0.7934 | 0.8038 | 0.8336 |
| \|F45/F\| | 1.5600 | 1.8729 | 1.8941 | 1.8248 |
| \|F6/F\| | 2.1779 | 4.4273 | 3.8131 | 7.4711 |
| d7/TTL | 0.1039 | 0.1258 | 0.1010 | 0.0902 |
| (N6 − N4)/(N5 − N4) | 1.000 | 1.046 | 1.046 | 1.046 |
| T − (d4 + d5 + d6) | 0.010 | 0.010 | 0.010 | 0.010 |

The present disclosure further provides an electronic device, which may include the optical lens assembly according to the above embodiments of the present disclosure and an imaging element used to convert an optical image formed by the optical lens assembly into an electrical signal. The electronic device may be an independent electronic device such as a detection distance camera, or may be an imaging module integrated into, for example, a detection distance device. In addition, the electronic device may be an independent imaging device such as a vehicle-mounted camera, or may be an imaging module integrated into, for example, a driving assistance system.

The foregoing is only a description for the preferred embodiments of the present disclosure and the applied technical principles. It should be appreciated by those skilled in the art that the scope of the present disclosure is not limited to the technical solution formed by the particular combination of the above technical features. The scope should also cover other technical solutions formed by any combination of the above technical features or equivalent features thereof without departing from the concept of the present disclosure, for example, technical solutions formed by replacing the features disclosed in the present disclosure with (but not limited to) technical features with similar functions.

What is claimed is:

1. An optical lens assembly, comprising, sequentially along an optical axis from an object side to an image side:
a first lens, having a negative refractive power, an object-side surface of the first lens being a concave surface;
a second lens, having a positive refractive power, an object-side surface of the second lens being a convex surface;
a third lens, having a positive refractive power, an object-side surface of the third lens being a convex surface, and an image-side surface of the third lens being a convex surface;
a fourth lens, having a positive refractive power, an object-side surface of the fourth lens being a convex surface;
a fifth lens, having a negative refractive power, an image-side surface of the fifth lens being a concave surface;
a sixth lens, having a refractive power; and
a seventh lens, having a negative refractive power,
wherein a number of lenses having refractive powers in the optical lens assembly is seven, and the optical lens assembly satisfies:

$(N6-N4)/(N5-N4) \leq 2$, and $1 \leq dn/dm \leq 2$, wherein N4 is a refractive index of the fourth lens, N5 is a refractive index of the fifth lens, N6 is a refractive index of the sixth lens, dn is a maximal center thickness in a center thickness of the second lens, a center thickness of the third lens, and a sum of center thicknesses of the fourth lens and the fifth lens, and dm is a minimal center thickness in the center thickness of the second lens, the center thickness of the third lens, and the sum of the center thicknesses of the fourth lens and the fifth lens.

2. The optical lens assembly according to claim 1, wherein the second lens and the seventh lens have aspheric surfaces, and an image-side surface of the seventh lens has at least one inflection point; or
an image-side surface of the first lens is a convex or concave surface; or
an image-side surface of the second lens is a concave or convex surface; or
an image-side surface of the fourth lens is a concave or convex surface; or
an object-side surface of the fifth lens is a convex or concave surface; or
an object-side surface of the sixth lens is a convex surface, and an image-side surface of the sixth lens is a concave surface; or
the object-side surface of the sixth lens is a concave surface, and the image-side surface of the sixth lens is a convex surface; or
the object-side surface of the sixth lens is a concave surface, and the image-side surface of the sixth lens is a concave surface, or
the fourth lens and the fifth lens are cemented to form a cemented lens; or
the fourth lens, the fifth lens and the sixth lens are cemented to form a cemented lens.

3. The optical lens assembly according to claim 1, wherein the optical lens assembly satisfies: $1.216 \leq dn/dm \leq 1.74$.

4. The optical lens assembly according to claim 1, wherein the optical lens assembly satisfies: $1.56 \leq |F45/F| \leq 9.3996$, wherein F is a total effective focal length of the optical lens assembly, and F45 is an effective focal length of a cemented lens formed by cementing the fourth lens and the fifth lens.

5. The optical lens assembly according to claim 1, wherein the optical lens assembly satisfies: $0.119 \leq (d4+d5)/TTL \leq 0.19$, wherein d4 is the center thickness of the fourth lens on the optical axis, d5 is the center thickness of the fifth lens on the optical axis, and TTL is a distance on the optical axis from a center of the object-side surface of the first lens to an image plane of the optical lens assembly.

6. The optical lens assembly according to claim 1, wherein the optical lens assembly satisfies:

$0.08 \leq BFL/TTL \leq 0.140$; or $1.96 \leq TTL/F \leq 2.16$; or $0.085 \leq TTL/H/FOV \leq 0.137$; or $52.398° \leq (FOV \times F)/H \leq 57.44°$; or $0.001 \leq |(H - F \times \theta)/(F \times \theta)| \leq 0.093$; or $1.907 \leq D/H/\theta \leq 2.832$; or $0.7934 \leq \theta2/\theta1 \leq 1$; or $1.645 \leq F/ENPD \leq 1.75$, wherein BFL is a distance on the optical axis from a center of an image-side surface of the seventh lens to an image plane of the optical lens assembly, TTL is a distance on the optical axis from a center of the object-side surface of the first lens to the image plane of the optical lens assembly, F is a total effective focal length of the optical lens assembly, FOV is a maximal field-of-view of the optical lens assembly, H is an image height corresponding to the maximal field-of-view of the optical lens assembly, θ is a maximal field-of-view of the optical lens assembly with a radian as a unit, θ1 is a radian value of an angle between an incident ray of a central chief ray of an edge field of view of the optical lens assembly before reaching the sixth lens and the optical axis, θ2 is a radian value of an angle between an emergent ray of the central chief ray at the edge field of view of the optical lens assembly after passing the sixth lens and the optical axis, and ENPD is an entrance pupil diameter of the optical lens assembly.

7. The optical lens assembly according to claim 1, wherein
the optical lens assembly satisfies:

$0.984 \leq |F4/F5| \leq 1.77$; or $1.06 \leq |F3/F| \leq 1.5$; or $4.077 \leq |F456/F| \leq 7746.949$; or $1.316 \leq |F6/F| \leq 7.6029$, wherein F3 is an effective focal length of the third lens, F4 is an effective focal length of the fourth lens, F5 is an effective focal length of the fifth lens, F6 is an effective focal length of the sixth lens, F is a total effective focal length of the optical lens assembly, and F456 is a combined focal length of the fourth lens, the fifth lens and the sixth lens.

8. The optical lens assembly according to claim 1, wherein
the optical lens assembly satisfies:

$0.97 \leq |R1/F| \leq 1.457$; or $0.168 \leq |R1/(R2+d1)| \leq 0.55$; or $0.82 \leq |R6/R7| \leq 1.86$; or $0.256 \leq (d4+d5+d6)/TTL \leq 0.343$; or $0.348 \leq Ti10/TTL \leq 0.43$; or $d46/TTL \leq 0.05$; or $T - (d4+d5+d6) \leq 0.02$; or $0.05 \leq d7/TTL \leq 0.1258$; or $0.902 \leq (SAG61/D61)/(SAG62/D62) \leq 1.674$; or $13.71 \leq arctan(SAG41/D41) \leq 23.4$; or $123.8 \leq Vd3+Vd4 \leq 156.4$; or $(N6-N4)/(N5-N4) \leq 1.263$.

wherein F is a total effective focal length of the optical lens assembly, R1 is a radius of curvature of the object-side surface of the first lens, R2 is a radius of curvature of an image-side surface of the first lens, d1 is a center thickness of the first lens on the optical axis, R6 is a radius of curvature of the object-side surface of the third lens, R7 is a radius of curvature of the image-side surface of the third lens, d4 is a center thickness of the fourth lens on the optical axis, d5 is a center thickness of the fifth lens on the optical axis, d6 is a center thickness of the sixth lens on the optical axis, d7 is a center thickness of the seventh lens on the optical axis, d46 is a spacing distance on the optical axis from a center of an image-side surface of the fourth lens to a center of an object-side surface of the sixth lens, T is a distance from a center of the first-side surface of the fourth lens to a center of the second-side surface of the sixth lens on the optical axis, TTL is a distance on the optical axis from a center of the object-side surface of the first lens to an image plane of the optical lens assembly, Ti10 is a distance on the optical axis from a center of the object-side surface of the sixth lens to the image plane of the optical lens assembly, SAG61 is a sagittal height at a maximal aperture of an object-side surface of the sixth lens, D61 is a diameter of the maximal aperture of the object-side surface of the sixth lens, SAG62 is a sagittal height at a maximal aperture of an image-side surface of the sixth lens, D62 is a diameter of the maximal aperture of the image-side surface of the sixth lens, SAG41 is a sagittal height at a maximal aperture of the object-side surface of the fourth lens, D41 is a semi-diameter of a maximal aperture of the object-side surface of the fourth lens corresponding to a maximal field-of-view of the optical lens assembly, Vd3 is an abbe number of the third lens, Vd4 is an abbe number of the fourth lens.

9. The optical lens assembly according to claim 1, wherein the optical lens assembly satisfies:

$0.05 \leq BFL/TTL \leq 0.140$; or $1.96 \leq TTL/F \leq 2.5$; or $0.085 \leq TTL/H/FOV \leq 0.7$; or $45° \leq (FOV \times F)/H \leq 57.44°$.

wherein BFL is a distance on the optical axis from a center of an image-side surface of the seventh lens to an image plane of the optical lens assembly, TTL is a distance on the optical axis from a center of the object-side surface of the first lens to the image plane of the optical lens assembly, F is a total effective focal length of the optical lens assembly, FOV is a maximal field-of-view of the optical lens assembly, and His an image height corresponding to the maximal field-of-view of the optical lens assembly.

10. The optical lens assembly according to claim 1, wherein the optical lens assembly satisfies:

$$0.984 \leq |F4/F5| \leq 2.5; \text{ or}$$

$$1 \leq |F3/F| \leq 2; \text{ or}$$

$$1 \leq |F45/F| \leq 10; \text{ or}$$

$$|F456/F| \geq 2; \text{ or}$$

$$|F6/F| \leq 10,$$

wherein F3 is an effective focal length of the third lens, F4 is an effective focal length of the fourth lens, F5 is an effective focal length of the fifth lens, F6 is an effective focal length of the sixth lens, F is a total effective focal length of the optical lens assembly, F45 is an effective focal length of a cemented lens formed by cementing the fourth lens and the fifth lens, and F456 is a combined focal length of the fourth lens, the fifth lens and the sixth lens.

11. The optical lens assembly according to claim 1, wherein the optical lens assembly satisfies:

$$0.5 \leq \text{\_}R1/F| \leq 2; \text{ or}$$

$$0.1 \leq |R1/(R2+d1)| \leq 1; \text{ or}$$

$$0.5 \leq |R6/R7| \leq 2,$$

wherein F is a total effective focal length of the optical lens assembly, R1 is a radius of curvature of the object-side surface of the first lens, R2 is a radius of curvature of an image-side surface of the first lens, R6 is a radius of curvature of the object-side surface of the third lens, R7 is a radius of curvature of the image-side surface of the third lens, and d1 is a center thickness of the first lens on the optical axis.

12. The optical lens assembly according to claim 1, wherein the optical lens assembly satisfies:

$$0.119 \leq (d4+d5)/TTL \leq 0.3; \text{ or}$$

$$0.1 \leq (d4+d5+d6)/TTL \leq 0.4; \text{ or}$$

$$0.2 \leq Ti10/TTL \leq 0.6; \text{ or}$$

$$d46/TTL \leq 0.05; \text{ or}$$

$$T-(d4+d5+d6) \leq 0.03; \text{ or}$$

$$0.05 \leq d7/TTL \leq 0.2,$$

wherein d4 is a center thickness of the fourth lens on the optical axis, d5 is a center thickness of the fifth lens on the optical axis, do is a center thickness of the sixth lens on the optical axis, d7 is a center thickness of the seventh lens on the optical axis, d46 is a spacing distance on the optical axis from a center of an image-side surface of the fourth lens to a center of an object-side surface of the sixth lens, T is a distance from a center of the first-side surface of the fourth lens to a center of the second-side surface of the sixth lens on the optical axis, TTL is a distance on the optical axis from a center of the object-side surface of the first lens to an image plane of the optical lens assembly, and Ti10 is a distance on the optical axis from a center of the object-side surface of the sixth lens to the image plane of the optical lens assembly.

13. The optical lens assembly according to claim 1, wherein the optical lens assembly satisfies:

$$(SAG61/D61)/(SAG62/D62) \leq 2.5; \text{ or}$$

$$\arctan(SAG41/D41) \leq 30,$$

wherein SAG61 is a sagittal height at a maximal aperture of an object-side surface of the sixth lens, D61 is a diameter of the maximal aperture of the object-side surface of the sixth lens, SAG62 is a sagittal height at a maximal aperture of an image-side surface of the sixth lens, D62 is a diameter of the maximal aperture of the image-side surface of the sixth lens, SAG41 is a sagittal height at a maximal aperture of the object-side surface of the fourth lens, and D41 is a semi-diameter of a maximal aperture of the object-side surface of the fourth lens corresponding to a maximal field-of-view of the optical lens assembly.

14. The optical lens assembly according to claim 1, wherein the optical lens assembly satisfies:

$$|(H-F \times \theta)/(F \times \theta)| \leq 0.2; \text{ or}$$

$$1.907 \leq D/H/\theta \leq 3; \text{ or}$$

$$\theta 2/\theta 1 \leq 2,$$

wherein θ is a maximal field-of-view of the optical lens assembly with a radian as a unit, F is a total effective focal length of the optical lens assembly, His an image height corresponding to a maximal field-of-view of the optical lens assembly, D is a diameter of a maximal aperture of the object-side surface of the first lens corresponding to the maximal field-of-view of the optical lens assembly, θ1 is a radian value of an angle between an incident ray of a central chief ray of an edge field of view of the optical lens assembly before reaching the sixth lens and the optical axis, and θ2 is a radian value of an angle between an emergent ray of the central chief ray at the edge field of view of the optical lens assembly after passing the sixth lens and the optical axis.

15. The optical lens assembly according to claim 1, wherein the optical lens assembly satisfies:

$$1.645 \leq F/ENPD \leq 2; \text{ or}$$

$$100 \leq Vd3+Vd4 \leq 156.4,$$

wherein F is a total effective focal length of the optical lens assembly, ENPD is an entrance pupil diameter of the optical lens assembly, Vd3 is an abbe number of the third lens, Vd4 is an abbe number of the fourth lens.

16. An optical lens assembly, comprising, sequentially along an optical axis from an object side to an image side:
   a first lens, having a negative refractive power, an object-side surface of the first lens being a concave surface;
   a second lens, having a positive refractive power, an object-side surface of the second lens being a convex surface, and an image-side surface of the second lens being a concave surface;
   a third lens, having a positive refractive power, an object-side surface of the third lens being a convex surface, and an image-side surface of the third lens being a convex surface;
   a fourth lens, having a positive refractive power, an object-side surface of the fourth lens being a convex surface;

a fifth lens, having a negative refractive power, an image-side surface of the fifth lens being a concave surface;

a sixth lens, having a refractive power; and a seventh lens, having a negative refractive power, wherein a number of lenses having refractive powers in the optical lens assembly is seven, and the fourth lens and the fifth lens are cemented, wherein the optical lens assembly satisfies: $(N6-N4)/(N5-N4)\leq2$, N4 is a refractive index of the fourth lens, N5 is a refractive index of the fifth lens, and N6 is a refractive index of the sixth lens.

17. The optical lens assembly according to claim 16, wherein the second lens and the seventh lens have aspheric surfaces, and an image-side surface of the seventh lens has at least one inflection point; or an image-side surface of the first lens is a convex or concave surface; or an image-side surface of the second lens is a concave or convex surface; or an image-side surface of the fourth lens is a concave or convex surface; or an object-side surface of the fifth lens is a convex or concave surface; or an object-side surface of the sixth lens is a convex surface, and an image-side surface of the sixth lens is a concave surface; or the object-side surface of the sixth lens is a concave surface, and the image-side surface of the sixth lens is a convex surface; or the object-side surface of the sixth lens is a concave surface, and the image-side surface of the sixth lens is a concave surface, or the fourth lens, the fifth lens and the sixth lens are cemented.

18. The optical lens assembly according to claim 16, wherein the optical lens assembly satisfies: $1.216\leq dn/dm\leq1.74$, wherein dn is a maximal center thickness in a center thickness of the second lens, a center thickness of the third lens, and a sum of center thicknesses of the fourth lens and the fifth lens, and dm is a minimal center thickness in the center thickness of the second lens, the center thickness of the third lens, and the sum of the center thicknesses of the fourth lens and the fifth lens.

19. The optical lens assembly according to claim 16, wherein the optical lens assembly satisfies: $1.56\leq|F45/F|\leq9.3996$, wherein F is a total effective focal length of the optical lens assembly, and F45 is an effective focal length of a cemented lens formed by cementing the fourth lens and the fifth lens.

20. The optical lens assembly according to claim 16, wherein the optical lens assembly satisfies: $0.119\leq(d4+d5)/TTL\leq0.19$, wherein d4 is a center thickness of the fourth lens on the optical axis, d5 is a center thickness of the fifth lens on the optical axis, and TTL is a distance on the optical axis from a center of the object-side surface of the first lens to an image plane of the optical lens assembly.

21. The optical lens assembly according to claim 16, wherein the optical lens assembly satisfies:

$0.08\leq BFL/TTL\leq0.140$; or $1.96\leq TTL/F\leq2.16$; or $0.085\leq TTL/H/FOV\leq0.137$; or $52.398°\leq(FOV\times F)/H\leq57.44°$; or $0.001\leq|(H-F\times\theta)/(F\times\theta)|\leq0.093$; or $1.907\leq D/H/\theta\leq2.832$; or $0.7934\leq\theta2/\theta1\leq1$; or $1.645\leq F/ENPD\leq1.75$, wherein BFL is a distance on the optical axis from a center of an image-side surface of the seventh lens to an image plane of the optical lens assembly, TTL is a distance on the optical axis from a center of the object-side surface of the first lens to the image plane of the optical lens assembly, F is a total effective focal length of the optical lens assembly, FOV is a maximal field-of-view of the optical lens assembly, H is an image height corresponding to the maximal field-of-view of the optical lens assembly, D is a diameter of a maximal aperture of the object-side surface of the first lens corresponding to the maximal field-of-view of the optical lens assembly, $\theta$ is a maximal field-of-view of the optical lens assembly with a radian as a unit, $\theta1$ is a radian value of an angle between an incident ray of a central chief ray of an edge field of view of the optical lens assembly before reaching the sixth lens and the optical axis, $\theta2$ is a radian value of an angle between an emergent ray of the central chief ray at the edge field of view of the optical lens assembly after passing the sixth lens and the optical axis, and an entrance pupil diameter of the optical lens assembly, and ENPD is an entrance pupil diameter of the optical lens assembly.

22. The optical lens assembly according to claim 16, wherein the optical lens assembly satisfies:

$0.984\leq|F4/F5|\leq1.77$; or $1.06\leq|F3/F|\leq1.5$; or $4.077\leq|F456/F|\leq7746.949$; or $1.316\leq|F6/F|\leq7.6029$, wherein F3 is an effective focal length of the third lens, F4 is an effective focal length of the fourth lens, F5 is an effective focal length of the fifth lens, F6 is an effective focal length of the sixth lens, F is a total effective focal length of the optical lens assembly, and F456 is a combined focal length of the fourth lens, the fifth lens and the sixth lens.

23. The optical lens assembly according to claim 16, wherein the optical lens assembly satisfies:

$0.97\leq|R1/F|\leq1.457$; or $0.168\leq|R1/(R2+d1)|\leq0.55$; or $0.82\leq|R6/R7|\leq1.86$; or $0.256\leq(d4+d5+d6)/TTL\leq0.343$; or $0.348\leq Ti10/TTL\leq0.43$; or $d46/TTL\leq0.05$; or $T-(d4+d5+d6)\leq0.02$; or $0.05\leq d7/TTL\leq0.1258$; or $0.902\leq(SAG61/D61)/(SAG62/D62)\leq1.674$; or $13.71\leq\arctan(SAG41/D41)\leq23.4$; or $123.8 \le Vd3+Vd4 \le 156.4$; or $(N6-N4)/(N5-N4) \le 1.263$, wherein F is a total effective focal length of the optical lens assembly, R1 is a radius of curvature of the object-side surface of the first lens, R2 is a radius of curvature of an image-side surface of the first lens, d1 is a center thickness of the first lens on the optical axis, R6 is a radius of curvature of the object-side surface of the third lens, R7 is a radius of curvature of the image-side surface of the third lens, d4 is a center thickness of the fourth lens on the optical axis, d5 is a center thickness of the fifth lens on the optical axis, d6 is a center thickness of the sixth lens on the optical axis, d7 is a center thickness of the seventh lens on the optical axis, d46 is a spacing distance on the optical axis from a center of an image-side surface of the fourth lens to a center of an object-side surface of the sixth lens, T is a distance from a center of the first-side surface of the fourth lens to a center of the second-side surface of the sixth lens on the optical axis, TTL is a distance on the optical axis from a center of the object-side surface of the first lens to an image plane of the optical lens assembly, Ti10 is a distance on the optical axis from a center of the object-side surface of the sixth lens to the image plane of the optical lens assembly, SAG61 is a sagittal height at a maximal aperture of an object-side surface of the sixth lens, D61 is a diameter of the maximal aperture of the object-side surface of the sixth lens, SAG62 is a sagittal height at a maximal aperture of an image-side surface of the sixth lens, D62 is a diameter of the maximal aperture of the image-side surface of the sixth lens, SAG41 is a sagittal height at a maximal aperture of the object-side surface of the fourth lens, D41 is a semi-diameter of a maximal aperture of the object-side surface of the fourth lens corresponding to a maximal field-of-view of the optical lens assembly, Vd3 is an abbe number of the third lens, and Vd4 is an abbe number of the fourth lens.

24. The optical lens assembly according to claim 16, wherein the optical lens assembly satisfies:

$0.05 \le BFL/TTL \le 0.140$; or $1.96 \le TTL/F \le 2.5$; or $0.085 \le TTL/H/FOV \le 0.7$; or $45° \le (FOV \times F)/H \le 57.44°$ wherein BFL is a distance on the optical axis from a center of an image-side surface of the seventh lens to an image plane of the optical lens assembly, TTL is a distance on the optical axis from a center of the object-side surface of the first lens to the image plane of the optical lens assembly, F is a total effective focal length of the optical lens assembly, FOV is a maximal field-of-view of the optical lens assembly, and His an image height corresponding to the maximal field-of-view of the optical lens assembly.

25. The optical lens assembly according to claim 16, wherein the optical lens assembly satisfies:

$0.984 \le |F4/F5| \le 2.5$; or $1 \le |F3/F| \le 2$; or $1 \le |F45/F| \le 10$; or $|F456/F| \ge 2$; or $|F6/F| \le 10$, wherein F3 is an effective focal length of the third lens, F4 is an effective focal length of the fourth lens, F5 is an effective focal length of the fifth lens, F6 is an effective focal length of the sixth lens, F is a total effective focal length of the optical lens assembly, F45 is an effective focal length of a cemented lens formed by cementing the fourth lens and the fifth lens, and F456 is a combined focal length of the fourth lens, the fifth lens and the sixth lens.

26. The optical lens assembly according to claim 16, wherein the optical lens assembly satisfies:

$0.5 \le |R1/F| \le 2$; or $0.1 \le R1/(R2+d1)| \le 1$; or $0.5 \le |R6/R7| \le 2$, wherein F is a total effective focal length of the optical lens assembly, R1 is a radius of curvature of the object-side surface of the first lens, R2 is a radius of curvature of an image-side surface of the first lens, R6 is a radius of curvature of the object-side surface of the third lens, R7 is a radius of curvature of the image-side surface of the third lens, and d1 is a center thickness of the first lens on the optical axis.

27. The optical lens assembly according to claim 16, wherein the optical lens assembly satisfies:

$0.119 \le (d4+d5)/TTL \le 0.3$; or $0.1 \le (d4+d5+d6)/TTL \le 0.4$; or $0.2 \le Ti10/TTL \le 0.6$; or $d46/TTL \le 0.05$; or $T-(d4+d5+d6) \le 0.03$; or $0.05 \le d7/TTL \le 0.2$, or $1 \le dn/dm \le 2$, wherein d4 is a center thickness of the fourth lens on the optical axis, d5 is a center thickness of the fifth lens on the optical axis, d6 is a center thickness of the sixth lens on the optical axis, d7 is a center thickness of the seventh lens on the optical axis, d46 is a spacing distance on the optical axis from a center of an image-side surface of the fourth lens to a center of an object-side surface of the sixth lens, TTL is a distance on the optical axis from a center of the object-side surface of the first lens to an image plane of the optical lens assembly, and Ti10 is a distance on the optical axis from a center of the object-side surface of the sixth lens to the image plane of the optical lens assembly; dn is a maximal center thickness in a center thickness of the second lens, a center thickness of the third lens, and a sum of center thicknesses of the fourth lens and the fifth lens, and dm is a minimal center thickness in the center thickness of the second lens, the center thickness of the third lens, and the sum of the center thicknesses of the fourth lens and the fifth lens.

28. The optical lens assembly according to claim 16, wherein the optical lens assembly satisfies:

$(SAG61/D61)/(SAG62/D62) \le 2.5$; or $\arctan(SAG41/D41) \le 30$, wherein SAG61 is a sagittal height at a maximal aperture of an object-side surface of the sixth lens, D61 is a diameter of the maximal aperture of the object-side surface of the sixth lens, SAG62 is a sagittal height at a maximal aperture of an image-side surface of the sixth lens, D62 is a diameter of the maximal aperture of the image-side surface of the sixth lens, SAG41 is a sagittal height at a maximal aperture of the object-side surface of the fourth lens, and D41 is a semi-diameter of a maximal aperture of the object-side surface of the fourth lens corresponding to a maximal field-of-view of the optical lens assembly.

29. The optical lens assembly according to claim 16, wherein the optical lens assembly satisfies:

$$|(H-F\times\theta)/(F\times\theta)|\leq 0.2; \text{ or}$$

$$1.907\leq D/H/\theta\leq 3; \text{ or}$$

$$\theta 2/\theta 1\leq 2,$$

wherein θ is a maximal field-of-view of the optical lens assembly with a radian as a unit, F is a total effective focal length of the optical lens assembly, His an image height corresponding to a maximal field-of-view of the optical lens assembly, D is a diameter of a maximal aperture of the object-side surface of the first lens corresponding to the maximal field-of-view of the optical lens assembly, θ1 is a radian value of an angle between an incident ray of a central chief ray of an edge field of view of the optical lens assembly before reaching the sixth lens and the optical axis, and θ2 is a radian value of an angle between an emergent ray of the central chief ray at the edge field of view of the optical lens assembly after passing the sixth lens and the optical axis.

30. The optical lens assembly according to claim 16, wherein the optical lens assembly satisfies:

$$1.645\leq F/ENPD\leq 2; \text{ or}$$

$$100\leq Vd3+Vd4\leq 156.4,$$

wherein F is a total effective focal length of the optical lens assembly, ENPD is an entrance pupil diameter of the optical lens assembly, Vd3 is an abbe number of the third lens, and Vd4 is an abbe number of the fourth lens.

31. An electronic device, comprising:

an optical lens assembly; and an imaging element used to convert an optical image formed by the optical lens assembly into an electrical signal, wherein the optical lens assembly comprises, sequentially along an optical axis from an object side to an image side:

a first lens, having a negative refractive power, an object-side surface of the first lens being a concave surface;

a second lens, having a positive refractive power, an object-side surface of the second lens being a convex surface;

a third lens, having a positive refractive power, an object-side surface of the third lens being a convex surface, and an image-side surface of the third lens being a convex surface;

a fourth lens, having a positive refractive power, an object-side surface of the fourth lens being a convex surface;

a fifth lens, having a negative refractive power, an image-side surface of the fifth lens being a concave surface;

a sixth lens, having a refractive power; and a seventh lens, having a negative refractive power, wherein a number of lenses having refractive powers in the optical lens assembly is seven, and the optical lens assembly satisfies:

$$(N6-N4)/(N5-N4)\leq 2, \text{ and}$$

$$1\leq dn/dm\leq 2,$$

wherein N4 is a refractive index of the fourth lens, N5 is a refractive index of the fifth lens, N6 is a refractive index of the sixth lens, dn is a maximal center thickness in a center thickness of the second lens, a center thickness of the third lens, and a sum of center thicknesses of the fourth lens and the fifth lens, and dm is a minimal center thickness in the center thickness of the second lens, the center thickness of the third lens, and the sum of the center thicknesses of the fourth lens and the fifth lens.

* * * * *